US009760341B2

(12) United States Patent
Bharatia

(10) Patent No.: US 9,760,341 B2
(45) Date of Patent: *Sep. 12, 2017

(54) SYSTEMS AND METHODS FOR DECLARATIVE APPLICATIONS

(71) Applicant: Veeral Bharatia, Plano, TX (US)

(72) Inventor: Veeral Bharatia, Plano, TX (US)

(*) Notice: Subject to any disclaimer, the term of this patent is extended or adjusted under 35 U.S.C. 154(b) by 218 days.

This patent is subject to a terminal disclaimer.

(21) Appl. No.: 14/804,058

(22) Filed: Jul. 20, 2015

(65) Prior Publication Data

US 2015/0324172 A1 Nov. 12, 2015

Related U.S. Application Data

(63) Continuation of application No. 13/919,978, filed on Jun. 17, 2013, now Pat. No. 9,116,716.

(60) Provisional application No. 61/663,606, filed on Jun. 24, 2012.

(51) Int. Cl.
*G06F 9/44* (2006.01)

(52) U.S. Cl.
CPC .............. *G06F 8/20* (2013.01); *G06F 9/4421* (2013.01); *G06F 9/4438* (2013.01)

(58) Field of Classification Search
CPC ....................................................... G06F 9/44
USPC ................................................ 717/115–119
See application file for complete search history.

(56) References Cited

U.S. PATENT DOCUMENTS

| 5,315,709 | A | 5/1994 | Alston, Jr. et al. |
| 5,513,127 | A * | 4/1996 | Gard ........................ H04L 41/24 |
| | | | 709/223 |
| 5,809,297 | A | 9/1998 | Kroenke |
| 5,873,094 | A | 2/1999 | Talatik |
| 6,182,277 | B1 * | 1/2001 | DeGroot ................... G06F 8/24 |
| | | | 717/115 |
| 7,669,226 | B2 | 2/2010 | Bhide |
| 8,250,112 | B2 | 8/2012 | Leff |
| 2005/0203958 | A1 | 9/2005 | Mitchell |
| 2008/0235682 | A1 | 9/2008 | Oren |
| 2010/0088672 | A1 | 4/2010 | Langworthy |

(Continued)

OTHER PUBLICATIONS

Oracle White Paper ("An Introduction to Oracle SQL Developer Data Modeler"), Jun. 2009.*

(Continued)

*Primary Examiner* — Jae Jeon

(74) *Attorney, Agent, or Firm* — Pillsbury Winthrop Shaw Pittman LLP

(57) ABSTRACT

Embodiments of the disclosure are directed to systems and methods to process a declaratively-specified computer application by interpreting a structure and a behavior specification. Application data items are interpreted using a processing concrete model based on the structure specification. Application functionality is provided by processing the application data items in accordance to the behavior specification. The application information may further be used in an embodiment of the disclosure to perform additional processing and provide an added functionality. Various embodiments of the disclosure allow additional functions for declarative application such as performing domain activities, accessing data items, transferring application data, storing data and milestones and rendering data items.

20 Claims, 21 Drawing Sheets

(56) References Cited

U.S. PATENT DOCUMENTS

2012/0084074 A1* 4/2012 Chronister ........ G06F 17/30616
704/9
2012/0233182 A1 9/2012 Baudel

OTHER PUBLICATIONS

Anonymous, Declarative programming at http://en.wikipedia.org/wiki/Declarative_programming, 00:50, May 7, 2013.
Bill Dwight, Procedural or Declarative Development? on SD Times at http://sdt.bz/26742.
J.W.Lloyd, Practical Advantages of Declarative Programming, in Joint Conference on Declarative Programming, GULP-PRODE'94.
Anonymous, Leaky abstraction at http://en.wikipedia.org/wiki/Leaky_abstraction, 17:59, May 10, 2013.
Oscar Nierstrasz, Dennis Tsichritzis; Object-Oriented Software Composition: Chapter 1; pp. 3-28, Prentice Hall 1995, ISBN 0-13-220674-9.
Alexander Bohm, Carl-Christian Kanne, Guido Moerkotte; Demaq: A Foundation for Declarative XML Message Processing; 3rd Biennial CIDR, Jan. 7-10, 2007,Asilomar,California,USA.
Yupeng Fu, Kian Win Ong; The SQL-based All-Declarative Forward Web Application Development Framework; 5th Biennial CIDR, Jan. 9-12, 2011, Asilomar,California,USA.
Joan Peckham, Fred Maryanski; Semantic Data Models; ACM Computing Surveys, Sep. 1988, vol. 20, No. 3.
Sheldon A. Borkin; Data Model Equivalence; VLDB '78 Proceedings of the fourth international conference on Very Large Data Bases, pp. 526-534, vol. 4.
Dave Thomas; UML—Unified or Universal Modeling Language?; Journal of Object Technology, Jan.-Feb. 2003, vol. 2, No. 1.
Ranga Vemuri; Comet Project: Hardware/Software Cosynthesis for DSP Systems; The RASSP Digest, Sep. 1996, vol. 3.
International Search Report and Written Opinion of the International Searching Authority (Dec. 2, 2013).

* cited by examiner

```
<xs:schema xmlns:xs="http://www.w3.org/2001/XMLSchema"                    801
    elementFormDefault="qualified" attributeFormDefault="unqualified"
    targetNamespace="urn:com:example:location"
    xmlns:loc="urn:com:example:location">
    <xs:complexType name="Address">           8011
        <xs:attribute name="streetNumber" type="xs:string"/>
        <xs:attribute name="street" type="xs:string" use="required"/>
        <xs:attribute name="unit" type="xs:string"/>
        <xs:attribute name="city" type="xs:string" use="required"/>
        <xs:attribute name="state" type="xs:string"/>
        <xs:attribute name="zip" type="xs:string"/>
    </xs:complexType>

<xs:complexType name="InternationalAddress">      8012
        <xs:complexContent>
            <xs:extension base="loc:Address">
                <xs:attribute name="country" type="xs:string" use="required"/>
                <xs:attribute name="countryCode" type="xs:string"/>
            </xs:extension>
        </xs:complexContent>
    </xs:complexType>
<xs:schema>

<xs:schema xmlns:xs="http://www.w3.org/2001/XMLSchema"                    802
    elementFormDefault="qualified" attributeFormDefault="unqualified"
    xmlns:loc="urn:com:example:location"
    targetNamespace="urn:com:example:bidauction" xmlns:bd="urn:com:example:bidauction">
    <xs:complexType name="Listing">           8021
        <xs:sequence>
            <xs:element name="address" type="loc:Address"/>
        </xs:sequence>
        <xs:attribute name="minPrice" type="xs:decimal" use="required"/>
        <xs:attribute name="expires" type="xs:dateTime" use="required"/>
        <xs:attribute name="listId" type="xs:string" use="required"/>
    </xs:complexType>

<xs:complexType name="Bid">               8022
        <xs:attribute name="listId" type="xs:string" use="required"/>
        <xs:attribute name="bidPrice" type="xs:decimal" use="required"/>
        <xs:attribute name="email" type="xs:string" use="required"/>
        <xs:attribute name="contact" type="xs:string"/>
        <xs:attribute name="bidAt" type="xs:dateTime"/>
    </xs:complexType>

<xs:complexType name="BidResponse">       8023
        <xs:attribute name="bidId" type="xs:string" use="required"/>
        <xs:attribute name="listId" type="xs:string" use="required"/>
        <xs:attribute name="bidAt" type="xs:dateTime" use="required"/>
        <xs:attribute name="status" type="xs:string" use="required"/>
    </xs:complexType>
<xs:schema>
```

FIG. 11

```
package com.example.location;                    821 public class Address            8211
{
    private String      streetNumber;
    private String      street;
    private String      unit;
    private String      city;
    private String      state;
    private String      zip;
    ...
}
package com.example.location;                    8212
public class InternationalAddress extends Address
{
    private String      country;
    private String      countryCode;
    ...
} package com.example.bidauction;                  822 public class Listing            8221
{
    private com.example.location.Address  address;
    private java.math.BigDecimal          minPrice;
    private java.util.Date                expires;
    private Long                          listId;
    ...
} package com.example.bidauction;
public class Bid                8222
{
    private Long                    listId;
    private java.math.BigDecimal    bidPrice;
    private String                  email;
    private String                  contact;
    private java.util.Date          bidAt;
    ...
} package com.example.bidauction;
public class BidResponse        8223
{
    private Long            bidId;
    private Long            listId;
    private java.util.Date  bidAt;
    private String          status;
    ...
}
```

FIG. 13

-- Location Tables: 831

CREATE TABLE tloc_address ( 8311
    addr_id bigserial,
    street_num varchar(32),
    street varchar(256) NOT NULL,
    unit varchar(32),
    city varchar(128) NOT NULL,
    state varchar(128),
    zip varchar(32),
    PRIMARY KEY (addr_id));

CREATE TABLE tloc_intladdress ( 8312
    addr_id bigint NOT NULL,
    country varchar(64),
    country_code varchar(16) NOT NULL,
    PRIMARY KEY (addr_id));

-- Bid Auction Tables: 832

CREATE TABLE tdb_listing ( 8321
    list_id bigserial,
    address bigint,
    min_price decimal(38, 2) NOT NULL,
    expires timestamp NOT NULL,
    PRIMARY KEY (list_id));
ALTER TABLE tdb_listing
ADD FOREIGN KEY (address) REFERENCES tloc_address(addr_id);

CREATE TABLE tbd_bid ( 8322
    bid_id bigserial,
    list_id bigint NOT NULL,
    bid_price decimal(38, 2) NOT NULL,
    email varchar(512) NOT NULL,
    contact varchar(1024),
    bid_at timestamp NOT NULL,
    PRIMARY KEY (bid_id));
ALTER TABLE tbd_bid
ADD FOREIGN KEY (list_id) REFERENCES tdb_listing(list_id);

CREATE TABLE tbd_bidresp ( 8323
    resp_id bigserial,
    bid_id bigint NOT NULL,
    status varchar(512) NOT NULL,
    PRIMARY KEY (bid_id));
ALTER TABLE tbd_bidresp
ADD FOREIGN KEY (bid_id) REFERENCES tbd_bid(bid_id);

FIG. 14

```
<xs:schema xmlns:xs="http://www.w3.org/2001/XMLSchema"                     ⌒⌒ 841
    elementFormDefault="qualified" attributeFormDefault="unqualified"
    targetNamespace="urn:com:example:location"
    xmlns:loc="urn:com:example:location">
  <xs:complexType name="Address">        ⌒⌒ 8411
      <xs:attribute name="streetNumber" type="xs:string"/>
      <xs:attribute name="street" type="xs:string" use="required"/>
      <xs:attribute name="unit" type="xs:string"/>
      <xs:attribute name="city" type="xs:string" use="required"/>
      <xs:attribute name="state" type="xs:string"/>
      <xs:attribute name="zip" type="xs:string"/>
  </xs:complexType>
  <xs:complexType name="InternationalAddress">       ⌒⌒ 8412
      <xs:complexContent>
          <xs:extension base="loc:Address">
              <xs:attribute name="country" type="xs:string" use="required"/>
              <xs:attribute name="countryCode" type="xs:string"/>
          </xs:extension>
      </xs:complexContent>
  </xs:complexType>
<xs:schema>

<xs:schema xmlns:xs="http://www.w3.org/2001/XMLSchema"          ⌒⌒ 842
    elementFormDefault="qualified" attributeFormDefault="unqualified"
    xmlns:loc="urn:com:example:location"
    targetNamespace="urn:com:example:bidauction" xmlns:bd="urn:com:example:bidauction">
  <xs:complexType name="Listing">     ⌒⌒ 8421
      <xs:sequence>
          <xs:element name="address" type="loc:Address"/>
      </xs:sequence>
      <xs:attribute name="minPrice" type="xs:decimal" use="required"
          fractionDigit="2" totalDigits="38"/>
      <xs:attribute name="expires" type="xs:dateTime" use="required"/>
      <xs:attribute name="listId" type="xs:long"/>
  </xs:complexType>
  <xs:complexType name="Bid">      ⌒⌒ 8422
      <xs:attribute name="listId" type="xs:long" use="required"/>
      <xs:attribute name="bidPrice" type="xs:decimal" use="required"
          fractionDigit="2" totalDigits="38"/>
      <xs:attribute name="email" type="xs:string" use="required"/>
      <xs:attribute name="contact" type="xs:string"/>
      <xs:attribute name="bidAt" type="xs:dateTime"/>
  </xs:complexType>
  <xs:complexType name="BidResponse">       ⌒⌒ 8423
      <xs:attribute name="bidId" type="xs:long" use="required"/>
      <xs:attribute name="listId" type="xs:long" use="required"/>
      <xs:attribute name="bidAt" type="xs:dateTime" use="required"/>
      <xs:attribute name="status" type="xs:string" use="required"/>
  </xs:complexType>
<xs:schema>
```

FIG. 15

```
<xs:schema xmlns:xs="http://www.w3.org/2001/XMLSchema"                    851
    elementFormDefault="qualified" attributeFormDefault="unqualified"
    targetNamespace="urn:com:example:location"
    xmlns:loc="urn:com:example:location">
  <xs:complexType name="Address">... </xs:complexType>                    8511
  <xs:complexType name="InternationalAddress">...</xs:complexType>
<xs:schema>                                                                8512

<xs:schema xmlns:xs="http://www.w3.org/2001/XMLSchema"                    853
    elementFormDefault="qualified" attributeFormDefault="unqualified"
    targetNamespace="urn:com:example:purpose:access"
    xmlns:purl="urn:com:example:purpose:access">
  <xs:complexType name="Valuation">                                       8531
      <xs:attribute name="price" type="xs:decimal" use="required"/>
      <xs:attribute name="currency" type="xs:string" use="required"/>
      <xs:attribute name="rate" type="xs:decimal"/>
      <xs:attribute name="rateAt" type="xs:dateTime"/>
  </xs:complexType>
<xs:schema>

<xs:schema xmlns:xs="http://www.w3.org/2001/XMLSchema"                    852
    elementFormDefault="qualified" attributeFormDefault="unqualified"
    xmlns:loc="urn:com:example:location"
    xmlns:purl="urn:com:example:purpose:access"
    targetNamespace="urn:com:example:bidauction" xmlns:bd="urn:com:example:bidauction">

<xs:complexType name="Listing">                                       8521
        <xs:sequence>
            <xs:element name="address" type="loc:Address"/>
        </xs:sequence>
        <xs:attribute name="minPrice" type="purl:Valuation" use="required"/>
        <xs:attribute name="expires" type="xs:dateTime" use="required"/>
    </xs:complexType>

<xs:complexType name="Bid">                                           8522
        <xs:sequence>
            <xs:element name="listing" type="bd:Listing"/>
        </xs:sequence>
        <xs:attribute name="listId" type="xs:long" use="required"/>
        <xs:attribute name="bidPrice" type="purl:Valuation" use="required"/>
        <xs:attribute name="email" type="xs:string" use="required"/>
        <xs:attribute name="bidAt" type="xs:dateTime"/>
    </xs:complexType>
<xs:schema>
```

FIG. 16

SYSTEMS AND METHODS FOR DECLARATIVE APPLICATIONS

CROSS-REFERENCE TO RELATED APPLICATIONS

This application is a continuation of U.S. patent application Ser. No. 13/919,978 filed Jun. 17, 2013 which claims the benefit of U.S. provisional patent application No. 61/663,606, filed Jun. 24, 2012, the benefit of each of which is claimed hereby, and each of which is incorporated herein by reference in its entirety.

FEDERALLY SPONSORED RESEARCH

Not Applicable

SEQUENCE LISTING, A TABLE, OR A COMPUTER PROGRAM LISTING COMPACT DISC

Not Applicable

BACKGROUND

A computer application offers a specific set of functionality to its users. It is typically implemented as a programming logic using one or more high-level programming languages and operating on a data model representing the application data. The application implementation demands substantial skill and effort. Moreover, such implementation offers a preconceived functionality. Adding new application functionality typically may not be possible without substantial effort and understanding of existing implementation. The application implementation depends on a specific data model and cannot accommodate changes to this data model without further development. Moreover, when application functionality is implemented as reusable modules, such reuse may be possible when a module user and module implementation use same or syntactically similar data models.

An application's data snapshot represents state of application at a particular instance. A stimulus or activity of interest triggers processing in the application and may change the state of application. Unless mandated by the application's functionality, typical applications do not explicitly store application's data snapshot or data relevant to these triggers. This prevents access to the trigger data, access to information on factors that contribute to an application data item, how application data items undergo changes and assume a specific value. Method and reason for performing a specific application processing is buried in application implementation and is often not readily available for such analysis. As a result, when a new unexpected functionality is needed, it is typically not possible to tailor application processing—either using new adjunct modules or performing post-processing of application stored information. In order to conduct a comprehensive interpretation of the application state, it becomes necessary to have an intimate knowledge of how application functionality is implemented. This leads to special-purpose implementation and demands substantial skill and effort.

Applications can also be defined and implemented using a behavior modeling language. Examples of such languages include Business Process Model and Notation (BPMN), Business Process Execution Language (BPEL), Unified Modeling Language (UML), Specification and Description Language (SDL), Petri-Net, Flowchart languages. A behavior modeled using such a language is represented typically using a precise data model. Consequently, a precise interpretation of the behavior becomes necessary and such an implementation is not tolerant of abstract or imprecise information. Moreover, apart from reducing the implementation complexity for certain types of applications, these systems still suffer from problems described above for applications implemented using high-level programming languages.

Declarative programming paradigm abstracts a task specification by specifying what needs to be done instead of how a task may be performed. A declarative programming evaluation engine determines how such task may be performed and then performs the task. A declarative evaluation engine however suffers from problem of a leaky abstraction, whereby the engine abstracting algorithmic complexity implements the details such that it affects program viability. Declarative specification becomes too vague for the declarative evaluation engine to offer effective processing that meets reasonable processing and performance requirements. Although successful to solve some problems in specific areas, the declarative abstraction alone cannot meet application requirements across diverse application functionality in diverse domains and with diverse performance requirements.

Automation tools are available for certain applications, where an application designer uses a set of tools to automatically derive implementations for certain application functions based on inputs like target data model, target implementation technology, performance requirements, target application function specific metadata. These tools enable application designer to manage a limited set of application functionality. Moreover, such tools may also enable adapting the implementations to some changes in inputs. However, such tools typically automate a small set of application functionality and may perform application processing in a constrained execution environment. Often the automatic implementation constitutes a small percentage of overall application implementation. The constrained execution environment often severely limits the feasibility of such solutions to meet diverse application processing and performance requirements. Except for faring better with certain data model changes for a limited subset of application functionality, these applications still suffer from problems described above for applications implemented using high-level programming languages. Although successful to solve some problems in specific areas, the task of developing tools to automatically generate diverse application functionality applicable across diverse application domains, if at all possible, involves substantial complexity, skill and effort.

There are applications that enable its users to perform a specific task or a specific category of tasks such that the user provides information on what needs to be done, typically by using a specific set of commands. However, such applications require a special-purpose implementation that is meant to perform only that specific task. In spite of allowing its users to declaratively specify the task, such applications cannot support diverse application functionality across different application domains. If at all possible to support diverse application functionality, the special-purpose implementation becomes substantially complex, demands great skill and effort and suffers from problems described above for applications implemented using high-level programming languages.

Special-purpose declarative languages enable its users to perform a specific task or a specific category of tasks.

Applications based on such languages perform only the specified task and cannot support diverse application functionality across different application domains.

Some technologies attempt to allow development of technology independent application models and enable transformation that cause application to be processed using a specific technology or a vendor implementation. However, the technology or vendor independence may often not be a primary concern. Ability to use the application to meet diverse requirements, sometimes for different purposes that may evolve over time, often requires modification of the application model, supporting technology implementations or both. Such modification requires thorough understanding of the underlying application semantics, supporting technology implementations or both and may demand substantial skill and effort. Moreover, such technology often provides transformations that may be intractable and may be inflexible to solve problems that cannot be readily represented using supported input application models. Adding new application functionality and handling processing for different purposes not supported by the technology or technology tooling vendors, if possible, typically cannot be accommodated without additional development which suffer from problems described above for applications implemented using high-level programming languages.

The above information is presented as background information only to assist with an understanding of the present disclosure. No determination has been made, and no assertion is made, as to whether any of the above might be applicable as Prior Art with regard to the present disclosure.

BRIEF SUMMARY

An aspect of the present disclosure is to address at least the above-mentioned problems, disadvantages or both and to provide at least the advantages described below. Consistent with embodiments of the disclosure, systems and methods are provided for declarative applications.

In one embodiment, a system and method is provided to implement a declarative application represented as a structure specification and a behavior specification. The structure specification represents a general data model. The behavior specification is based on the general data model represented by the structure specification. The system and method includes interpreting the general data model from the structure specification, interpreting the behavior specification, identifying a behavior component in behavior specification and processing the behavior component using a behavior component implementation as specified by the behavior specification. The behavior component implementation performs a purpose-oriented processing of the behavior component by using a processing concrete data model derivable from the general data model, interpreting the application data items using the processing concrete model and processing the application data items as specified by the behavior component. Any nested behavior components that are part of the behavior component are also processed using a purpose-oriented processing suitable for the nested behavior component.

In another embodiment, a system and method is provided to derive a persistence concrete model from the general data model and use this concrete model to persist application data items. Moreover, the system and method is provided to identify and persist application milestone information.

In another embodiment, a system and method is provided to derive an access concrete model from the general data model and use this concrete model to enable access to the application data items and application milestone information. The data represented by application data items and application milestone information can be used by additional processors to perform additional processing that was not designed by the application. Moreover, the application data items and application milestones information when considered along with the application's structure specification and behavior specification provides an understanding about application processing logic. This knowledge provides an additional processor with a substantial basis for processing within or outside the realm of original designed application functionality.

In another embodiment, a system and method is provided to derive a transfer concrete model from the general data model and use this concrete model to import the application data items and additional application data into the system or export the application data items and additional application data from the system.

In another embodiment, a system and method is provided to use additional purpose-oriented specifications that enable customization and control over various aspects of application processing.

In another embodiment, a system and method is provided to use a general data model to specify an application behavior and perform the application behavior processing using a match based on generalizations in the general data model to data model used by an implementation. The system and method is provided to use an implementation that exhibit behavior using criteria in addition to the application behavior specification.

In another embodiment, a system and method is provided to declaratively generate views that enable viewing information represented by application data items. The generated views may be interactive to allow a user to conduct various operations on data represented by application data items.

The various embodiments can include, exclude or both different aspects, features, or advantages, or any combination thereof, where applicable. In addition, the various embodiments described in the present disclosure can combine one or more aspects or features of other embodiments of the present disclosure.

Other aspects, advantages and salient features of the disclosure will become apparent to those skilled in the art from the following detailed description, which taken in conjunction with the annexed drawings, discloses exemplary embodiments of the disclosure. It should be understood that both the foregoing general description and the following detailed description are exemplary and explanatory only and are not restrictive of the disclosure, as claimed.

BRIEF DESCRIPTION OF THE DRAWINGS

One or more embodiments of the present disclosure are illustrated by way of example and not limitation in the figures of the accompanying drawings, in which like references indicate similar elements and in which:

FIG. 11 illustrates part of a structure specification example that represents a general data model;

FIG. 13 illustrates part of a processing concrete model example;

FIG. 14 illustrates part of a persistence concrete model example;

FIG. 15 illustrates part of an transfer concrete model example;

FIG. 16 illustrates part of an access concrete model example;

DETAILED DESCRIPTION

Figure 1:
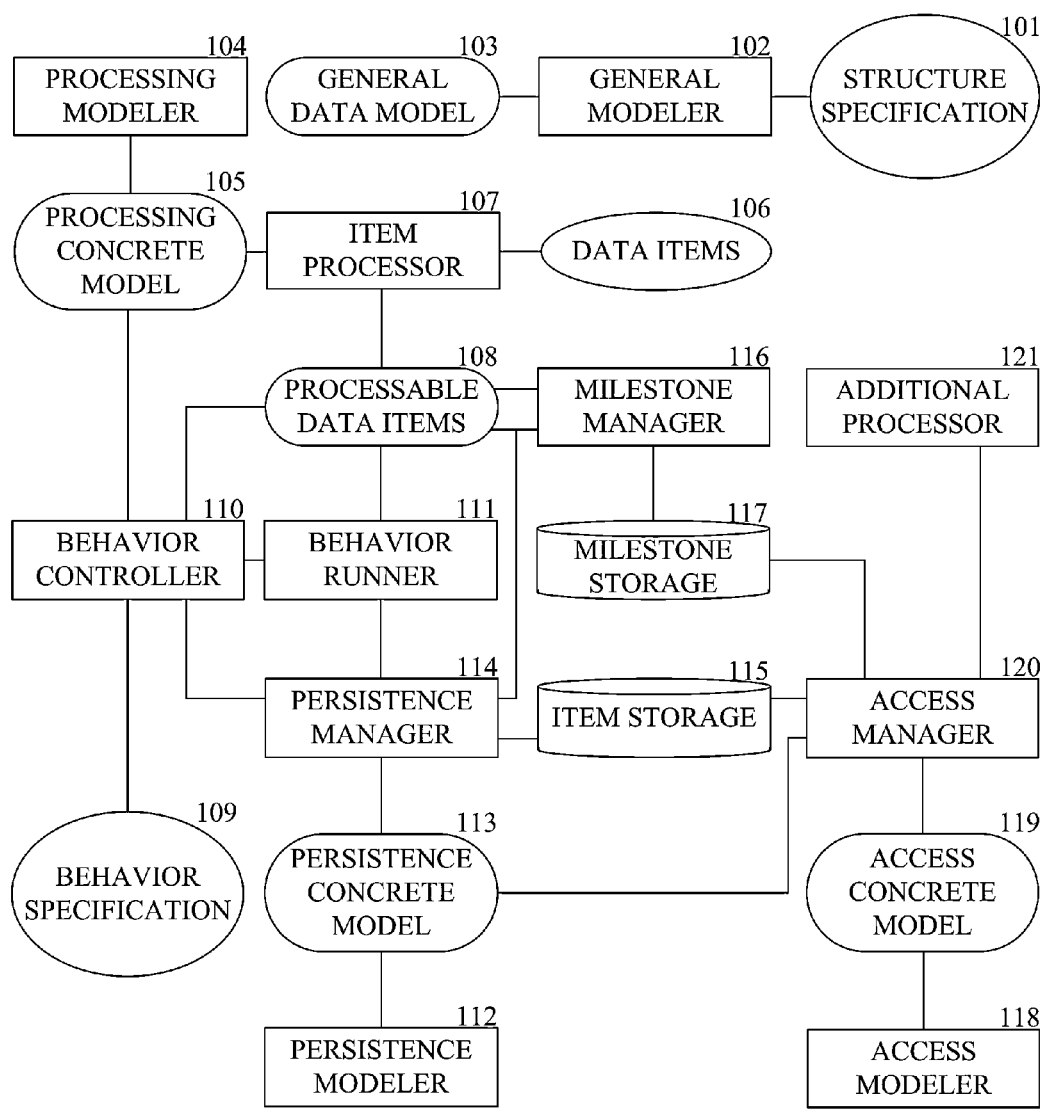
FIG. 1 illustrates a block diagram of an embodiment of a system for declarative applications consistent with the present disclosure, with the boxes 104, 112 and 118 filled in Grey color, indicating that they may refer to the general data model 103. Moreover, all rectangular boxes may refer to data items 106, purpose-oriented data items, purpose-oriented specifications, other specifications and data models as required by their implementation.

The following detailed description of embodiments of the present disclosure refers to the accompanying drawings. Where appropriate, the same reference numbers in different drawings refer to the same or elements that perform a similar function.

References in this specification to "an embodiment", "one embodiment", "another embodiment", or the like, means that the particular feature, structure, technique or characteristic described is included in at least one embodiment of the present disclosure. Occurrences of such phrases in this specification do not necessarily all refer to the same embodiment. The techniques and mechanisms described herein may be embodied in several forms and manners. The disclosure may, however, be embodied in many different forms and should not be construed as limited to the embodiments set forth herein.

Unless specifically stated otherwise, it is appreciated that throughout the specification discussions utilizing terms such as "processing", "computing", "rendering", "determining", "identifying", "running", "executing" or the like, refer to the action and/or processes of a computer or computing system or similar electronic computing device or a group of such devices, that manipulate and/or transform data represented as physical, such as electronic, quantities into other data similarly represented as physical quantities. In a similar manner, the term "processor" may refer to any device, group of devices or portion of a device that processes electronic data, e.g. from registers and/or memory to transform that electronic data into other electronic data that, e.g. may be stored in registers and/or memory. A "computer", "computing machine", "computing platform", "computing device" may include one or more processors. An "implementation" is a computer-readable program or part of a computer-readable program that implements one or more functionality representative of a required work.

The disclosure is made in connection with the following additional definitions. It must be understood that these terms and their described meanings are intended to provide a thorough understanding of present disclosure and not intended to limit the scope of the present disclosure.

An application performs one or more tasks by running on a computing device.

Data and information may often be used interchangeably. Typically, data becomes information when it is interpreted and takes on a meaning.

Domain is a field or scope of knowledge, activity or specialization.

A construct is a syntactically allowable part of a representation that may be used in accordance with the rules of representation language.

Data model is a representation of data that may describe various aspects such as structure and relationships between data.

Data model component is a component or portion of a data model. A data model component is typically represented using one or more constructs offered by a data model representation language.

A generalization for a data modeling aspect is used when all details of the data modeling aspect cannot be ascertained.

A precise data modeling aspect is a data modeling aspect where all details of the data modeling aspect can be ascertained.

General data model is a data model that may use a generalization when a precise data modeling aspect cannot be ascertained.

Concrete data model is a data model with zero or more generalizations resolved and models data so that it becomes suitable for one or more specific concrete purpose. The term concrete model may be used interchangeably with the term concrete data model.

Precise data model component is a data model component comprising of precise data modeling aspects.

General data model component is a data model component with one or more generalizations.

Structure specification is a specification that represents a general data model. Such specification may represent various aspects of data model such as structure and relationships of domain resources for an application.

Behavior is the response of system to various inputs, stimuli, information or other contributing factors in context with a specific application.

Behavior specification is a specification that describes the behavior of application. A behavior component is a component or portion of behavior. A behavior component is typically represented using one or more constructs offered by the behavior specification language. A behavior component is specified in the behavior specification. A behavior component may be interchangeably referred as a behavior component specification. A behavior component implementation is an implementation of the behavior component.

Action primitive is a construct in behavior specification that represents a predefined unit of work.

Purpose-oriented specification is a specification that describes requirements for a specific purpose.

An application domain represents areas of interest in which the application operates. The application domain contains actors that use the application to perform work. These actors work on various aspects of the application domain. The application functions in context with artifacts and entities in the domain. These actors, artifacts and entities shall henceforth be termed as domain resources (or resources for short). A domain resource may be represented in the application as an application data item. The application data items can be represented using a general data model and include any data accessible to the application such as application stimuli, triggers, inputs and domain resources. The application data item may itself be composed, reference or both additional application data items. Irrespective of whether an application data is actually represented as an application data item, the application data that can be represented as the application data item may be interpreted as the application data item. In order for the application to work with domain resources, it is necessary to identify these domain resources. The resource identity may be explicit or represented implicitly by the context in which the resource gets used.

In one embodiment of the disclosure, a declarative application is an application with application functionality designed using a structure specification for describing data model of the application and a behavior specification for describing behavior of the application. A declarative application system uses these structure and behavior specifications to offer the designed application functionality. In addition to these specifications, a declarative application may use special purpose-oriented specifications to guide, customize and control various aspects of application processing. It may become apparent to those skilled in the art that a specification, unless explicitly stated otherwise, represents not only physical representation(s) of the described information but also the information described by the specification irrespective of how such information is represented.

The structure specification, the behavior specification or both may specify the application processing based on a specific implementation technology, a specific implementation, a specific platform or any combination thereof in one embodiment of the disclosure. The specifications may use constructs offered by the specification language to take advantage of features offered by the implementation technology, the implementation, or the platform or any combination thereof that processes the application. The application processing may use a purpose-oriented specification to handle processing for a specific purpose. In another embodiment, the structure specification, the behavior specification or both may specify the application processing independent of specific implementation technology, specific implementation and platform. The application processing may use a purpose-oriented specification to handle processing for a specific purpose.

Refer now to FIG. 1, which illustrates a block diagram of an embodiment of a declarative application system. Various components of the block diagram may be referred in this disclosure in their singular or plural form depending on the context in which they may be referred in this disclosure. Moreover, components illustrated in this block diagram may be referred at various places in the disclosure without an explicit reference to FIG. 1. Structure specification 101 represents a general data model of the application. Structure specification 101 is designed to represent the application data items necessary to offer the application's functionality. A general data model specified by the structure specification uses a generalization where a data modeling aspect cannot be a precise data modeling aspect. There are various reasons why data modeling aspects cannot be precise data modeling aspects including, but not limited to, absence of knowledge about all possible resources in the domain, expanding the scope of application domain or specific application functionality in future, retain modeling flexibility to account for unforeseen future data model components, reuse of data model components with generalizations prevalent in the application domain.

General modeler 102 interprets structure specification 101 to derive general data model 103. General data model 103, represented by structure specification 101, uses generalizations and thereby supports a much larger set of application data items truly representative of a modeled domain, by eliminating modeling constraints that cannot be ascertained. In one embodiment, the structure specification 101 is represented using a standard or proprietary data modeling language, extensions to standard data modeling language, result of running a software program or a program using an application programming interface. Some examples of data modeling languages that can be used to represent structure specification 101 include XML-based technologies, Entity-Relation (ER) Model, Resource Description Framework (RDF), Web Ontology Language (OWL), Xforms, Unified Modeling Language (UML), Abstract Syntax Notation One (ASN.1), Service Data Objects (SDO), WS-Resource (WSRF), Augmented Backus-Naur Form (ABNF), Domain specific languages (DSL), high level programming languages such as Java, C, C++ and Javascript. In another embodiment, general data model 103 may be represented using another standard or proprietary data modeling language(s) similar to the structure specification languages. The declarative application system may interpret general data model 103 represented by the structure specification language, and represent it using the high-level programming language(s) that are used to implement the declarative application system of this embodiment.

A data model specification represents a data model and therefore in this detailed description, unless explicitly stated otherwise, the term data model specification may be used in lieu of the data model and vice-versa. The terms qualified with "general" and "generic" in this disclosure represent the same concepts and may be used interchangeably in this disclosure. Therefore, generic data model may be used interchangeably with general data model and generic data model component may be used interchangeably with general data model component in this disclosure.

The declarative application system processes one or more application data items as designed by the behavior specification of the declarative application. The behavior specification defines processing of one or more application data items such that the processing causes declaratively-specified computer application to offer required application functionality. In one embodiment, a snapshot of data related to the declarative application, can be interpreted as a state of declarative application, representative of the processing status of the declarative application. In this embodiment, processing of the application behaviors results in various application specific work such as transforming the application data and performing specific actions as defined by the behavior specification, thereby transforming the state of this declarative application. Such declarative application state transformations cause the declarative application to exhibit specified behavior. In this embodiment, the behavior specification does not explicitly describe the declarative application states or any transformations thereof. In another embodiment, the behavior specification may explicitly describe some or all such declarative application states and define behavior(s) to transform these declarative application states.

When a general data model has no generalizations it is a concrete model. Moreover, when a resolution of generalizations in a general data model is not required for a specific purpose, the general-model could be used as a concrete model for that purpose. Such a concrete model is a special case of a general data model whereby no resolution of generalizations is required and henceforth, no special consideration is necessary for this special case. In an embodiment, a concrete model can be obtained from general data model 103 by resolving all generalizations. In another embodiment, a concrete model can be obtained from general data model 103 by resolving the generalizations as and when necessary. Ability to resolve generalization when necessary enables adapting the applications to their deployment environments. In another embodiment, a concrete model M derived from general data model L can serve as a general data model M. A concrete model N may be derived from this general model M.

In one embodiment, a purpose-oriented concrete data model represents information necessary for performing a task for a specific purpose, whereas a general data model represents information that may be a true representation of the application data with generalizations for aspects that cannot be ascertained. A behavior specification may be built without concern for any concrete model, implementations based on specific concrete models or how generalizations are resolved in the general data model. A dynamic approach to matching the general data model to a purpose-oriented concrete data model and interpreting application data items to purpose-oriented data items and vice-versa becomes possible. This enables the declarative application system to dynamically select implementations for a purpose from a wider set of available implementations for the purpose and being more tolerant of data model mismatches. This relaxes requirement of having exact data type compatibility for using an implementation. Moreover, multiple ways to resolve generalizations in general data model and capability to add purpose specific information may enable deriving more than one possible purpose-oriented concrete model. This may enable using an alternative implementation for the purpose that may also handle an aspect that cannot be represented in the general data model.

Structure specification 101 represents general data model 103. General data model 103 may however also be explicitly represented using a representation other than structure specification 101. Having another representation of general data model 103 does not preclude structure specification 101 from representing general data model 103. It should therefore be understood in this disclosure that, unless stated otherwise, structure specification 101 may be used in lieu of general data model 103.

Application data items 106 include any data accessible to the application such as application stimuli, triggers, inputs and domain resources. The application data items 106 is such that it is possible to interpret the information of the domain resources represented by application data items 106 using general data model 103. If certain application data items represent information that cannot be interpreted using general data model 103, it may be necessary to transform that information such that it is amenable to interpretation using general data model 103. A processing modeler 104 transforms general data model 103 to derive a processing concrete model 105. Processing concrete model 105 represents a data model essential for processing application data items 106. Item processor 107 represents application data items 106 as processable data items 108. Processable data items 108 represent application data items amenable to application processing.

Processing concrete model 105 is represented using constructs offered by high-level programming language(s) that is used to implement a behavior processing implementation in one embodiment of this disclosure. An implementation of item processor 107 in this embodiment represents application data items 106 as processable data items 108 using data structures offered by this high-level programming language(s). It is also possible to use other representations, similar to ones used for structure specification representation, for processing concrete model 105, wherein processable data items 108 are suitable for declarative application processing. In another embodiment, there may be one or more processing concrete models 105 used by implementations to perform specific processing in the system. These processing concrete models 105 enable specific implementations to interpret application data items 106 as processable data items 108 in a form appropriate for specific implementations.

Behavior specification 109 represents the application behavior necessary to offer the application's functionality. The manner in which the behavior gets specified in behavior specification 109 depends on the behavior specification language used to represent the application functionality. Examples of some standard languages that can be used for behavior specification include Business Process Model and Notation (BPMN), Business Process Execution Language (BPEL), Unified Modeling Language (UML), XML Process Definition Language (XPDL), Domain Specific Languages (DSL), Web Services Flow Language (WSFL), Specification and Description Language (SDL), Petri-Net, Flowchart languages, Scripting Languages, Expert System Shell languages.

In one embodiment, behavior specification 109 comprises one or more behavior components representing a unit of work such that the processing of the behavior components is controlled as specified by the behavior specification language. In another embodiment, behavior specification 109 may be specified using standard or proprietary processing specification languages, proprietary extensions to the standard languages or proprietary processing specification languages, a result of running a software program or a program using an application programming interface. It is possible to provide behavior or behavior components using special-purpose implementation(s) based on this disclosure. Such implementation(s) may also be referenced by behavior specification 109. Irrespective of how behavior is specified, a data model may be required to specify the behavior details.

The behavior details describe various aspects of behavior processing such as application data item(s) 106 that participate in the behavior, criteria when various behavior components become relevant, data necessary for various behavior component processing. In this embodiment, the behavior details are specified using general data model 103. Behavior processing may be done using one or more implementations in this embodiment using one or more concrete models as amenable for specific behavior processing implementation(s).

Behavior processing transforms one or more application data items as defined by a behavior specification in another embodiment of this disclosure. An application data item in this embodiment may represent physical objects or substances in the application's domain. Transformation of application data items by behavior processing in this embodiment represents transformation of one or more aspects of physical objects or substances in accordance to the behavior specification, thereby offering an application functionality representative of specific transformation of physical objects or substances as specified in the behavior specification.

Behavior specification 109 can impart specific traits to the application including but not limited to procedural, reactive, adaptive, rule-oriented, knowledge-oriented and probabilistic. In one embodiment, an application exhibits one or more application traits simultaneously, and in doing so, uses behavior specification 109 defined with one or more behavior specification languages. Moreover, behavior specification 109 can define various aspects of application functionality including aspects necessary to meet specific technology requirements, business rules and policies. For example, in an e-commerce application, it is possible to define that a minor customer should never be able to conduct operations on a tobacco-based product; and an on-line customer support representative is brought in to chat with customer when a purchase activity exceeds 2 minutes.

A procedural behavior trait is defined in behavior specification 109, by stimuli that produce outputs, actions or both based on a predefined procedural logic in one embodiment of this disclosure. The stimuli and procedural logic are defined in behavior specification 109 using constructs offered by the behavior specification language. For a given stimuli in a specific application state, the procedural logic operates to completion, thereby exhibiting the required procedural behavior.

A reactive behavior trait is defined in behavior specification 109 by including cause-effect definitions for use cases that require the reactive trait in one embodiment of this disclosure. In this embodiment, the cause is described by a stimuli specification that defines when to trigger the specified effects. The stimuli specification may define criteria to match application data items 106, such criteria being defined using general data model 103. Rules for conducting such a match and rules to determine the resulting effects may be defined by the behavior specification language. For example, in BPMN, a start message event specification defines an event that is awaited to launch a specific process whereas an interrupting boundary message event specification defines an event that interrupts an ongoing activity and processes actions for this specified event. In another embodiment, a special purpose data model, derived from general data model 103, may be used for defining the stimuli specification and matching the application data items to stimuli. Such a special purpose data model may offer mechanisms amenable to stimuli specification and matching application data items 106 in accordance to rules defined by a behavior specification language(s). The effect for a specific cause is defined by the behavior specification using constructs offered by the behavior specification language. The effect defines actions that may be taken in response to the cause thereby accomplishing the application functionality. For example, a BPMN process awaits a specific stimulus, specified as a BPMN start event, and once the expected start event occurs, rest of the process logic accomplishes functionality designed for that process.

A rule-oriented behavior trait is defined in behavior specification 109 in one embodiment. The rule-oriented behavior trait is defined by specific behavior components that get executed if one or more criterion defined by a rule is satisfied. A rule defines criteria for various aspects of application processing such as domain resource criteria, business criteria, policies to be enforced, technical or performance requirements to be met. A behavior component specifies action(s) to be taken when corresponding rule is satisfied. In one embodiment, using a rule-based behavior specification language, whole or part of application functionality is designed by defining rules and actions to be taken when such rules are satisfied. In another embodiment, an expert system may be used to implement the rule-oriented behavior trait. In yet another embodiment, the rule-matching and identifying the actions to be taken, is delegated to a rule-engine that provides guidance on behavior components to be processed. It may be noted that additional embodiments are possible to represent and implement rule-oriented behavior.

An adaptive behavior trait is defined in behavior specification 109 by a set of adaptive behavior components in one embodiment; each adaptive behavior component comprises a precondition and actions to be taken if the precondition is satisfied. The precondition, expressed using constructs available in the behavior specification language, defines when the defined behavior component is applicable. The precondition may be satisfied when state of one or more application data items 106 in the application meet the requirements for the precondition. The actions associated with the precondition are defined by the behavior specification using constructs offered by the behavior specification language. These actions manipulate the application status to offer an adaptive functionality. An adaptive behavior may be offered by using actions that affect the matching method or criteria for preconditions. For example, an adaptive application using an artificial neural network learns by adjusting the weights along network connections.

A knowledge-oriented behavior trait is defined in behavior specification 109 by defining a set of behavior components in one embodiment; each behavior component gets executed in direct consultation with a knowledge-base. A knowledge-base represents knowledge required to guide the application processing using a knowledge-oriented technology. A knowledge-oriented technology based on one or more types of reasoning such as reasoning used for constraint solving, expert systems, cognitive systems, machine learning, case-based reasoning, procedural reasoning, description logic reasoning and reasoning for other logic types, may enable processing of a behavior component aided by a knowledge-base. In one embodiment, the knowledge represented by the knowledge-base is used to infer additional information about the application data items, application status or both, thereby formulating a knowledge-oriented perception of the application status, interpreting and manipulating application data items or both. The processing specification may describe behavior component processing such that behavior components or aspects used to define the behavior components or both may be automatically computed in consultation with a knowledge-base, thereby offering systems that can adapt processing using a knowledge-base. Behavior processing may also be aided by a knowledge-base allowing application functionality involving handling actions that depend on application state under guidance from a knowledge-base.

It is possible to have a processing specification in an embodiment to process a behavior component aided by a knowledge-base to infer, compute or both additional behavior component aspects, thereby offering the application functionality and meet specific objectives. Inferences from a knowledge base may aid in creating, refining or both data modeling aspects of the general data model used by the behavior component in this embodiment. The generalizations in the general data model used by the behavior component in this embodiment may be resolved and a purpose-oriented concrete model may be created, refined or both using inferences from a knowledge-base. It may be noted that additional embodiments are possible to represent, implement or both behavior components whose processing is aided by a knowledge base.

A probabilistic behavior trait is defined in behavior specification 109 in one embodiment by defining one or more behavior components whose processing is performed using probabilistic reasoning techniques. A processing specification may describe probabilistic conditions related to such behavior components. The probability computation is performed using a probabilistic reasoning technology suitable these behavior components. A probabilistic reasoning technique may handle uncertainty using methods such as Bayesian inference, multi-valued logic based reasoning and reasoning using connectionist forms like neural networks. Probabilistic criteria and their evaluation may be described using the general data model. The probabilistic reasoning technique may involve making decision to process the behavior component using a probabilistic decision engine. In another embodiment, the probabilistic reasoning is delegated to a probabilistic reasoning engine that may decide on when the behavior component require processing and how probabilistic aspects of the behavior component may be handled. In one embodiment, the processing specification represents processing of a behavior processing using probabilistic reasoning to compute additional behavior components, additional behavior component aspects or both, thereby offering the application functionality and meet specific objectives. It may be noted that additional embodiments are possible to represent the processing specification for probabilistic behavior components, implement processing for probabilistic behavior components, or both.

Consider an embodiment represented by FIG. 1. Behavior controller 110 interprets behavior specification 109 and conducts application processing such that the application functionality is realized as defined by behavior specification 109. Behavior controller 110 in this embodiment is implemented to interpret the behavior specification languages and support behavior language specific mechanisms necessary for processing the declarative application. The behavior specification language defines a set of constructs and rules for interpreting these constructs. Behavior controller 110 in this embodiment provides an implementation that can interpret these constructs for an application's behavior specification and process the specified behavior as per the rules defined by the behavior specification language.

For example, BPMN specification defines a start message event construct that enables defining a process which is launched when a specific message is received by the system. An implementation of behavior controller 110 that supports BPMN behavior specification enables behavior controller 110 to interpret that a process may be launched when the specified message is received by the system. Moreover, this implementation shall also enable creation and management of a new BPMN process and maintain information necessary to manage this BPMN process. The BPMN process itself comprises additional logic specified using BPMN specific constructs. These BPMN specific constructs are supported by the implementation and the process logic execution is performed in accordance to the rules defined by BPMN specification language.

Behavior controller 110 interprets behavior specification 109 and processes behavior specified in behavior specification 109 in one embodiment of this disclosure. Behavior controller 110 identifies behavior components specified in behavior specification 109. The behavior specification language may offer various constructs to define such behavior components. Moreover, behavior specification 109 uses general data model represented by structure specification 101 to specify behavior component details. In another embodiment, interpreting a behavior specification 109, behavior specification using general data model 103, represented by structure specification 101, corresponds to an illustrative algorithm of following sequence of steps: obtaining behavior specification; obtaining behavior components specified in behavior specification using constructs supported by the behavior specification language, the details of obtained behavior components are interpreted using data model components of general data model 103.

Behavior controller 110 processes the behavior as specified in the behavior specification in accordance to the rules of the behavior specification language(s) used to define the behavior specification in one embodiment of this disclosure. As a part of this processing, behavior controller implementation 110 identifies a behavior component specified in behavior specification that requires processing. In another embodiment, identifying a behavior component in behavior specification for processing the application behavior corresponds to an illustrative algorithm of following sequence of steps: determining the possible behavior components that may require processing in accordance to the rules of the behavior specification language; determining which possible behavior component is ready for processing and selecting a behavior component that is ready for processing based on the specified behavior and in accordance to the rules of the behavior specification language. Behavior controller 101 identifies the behavior component and processes this behavior component.

Figure 21:
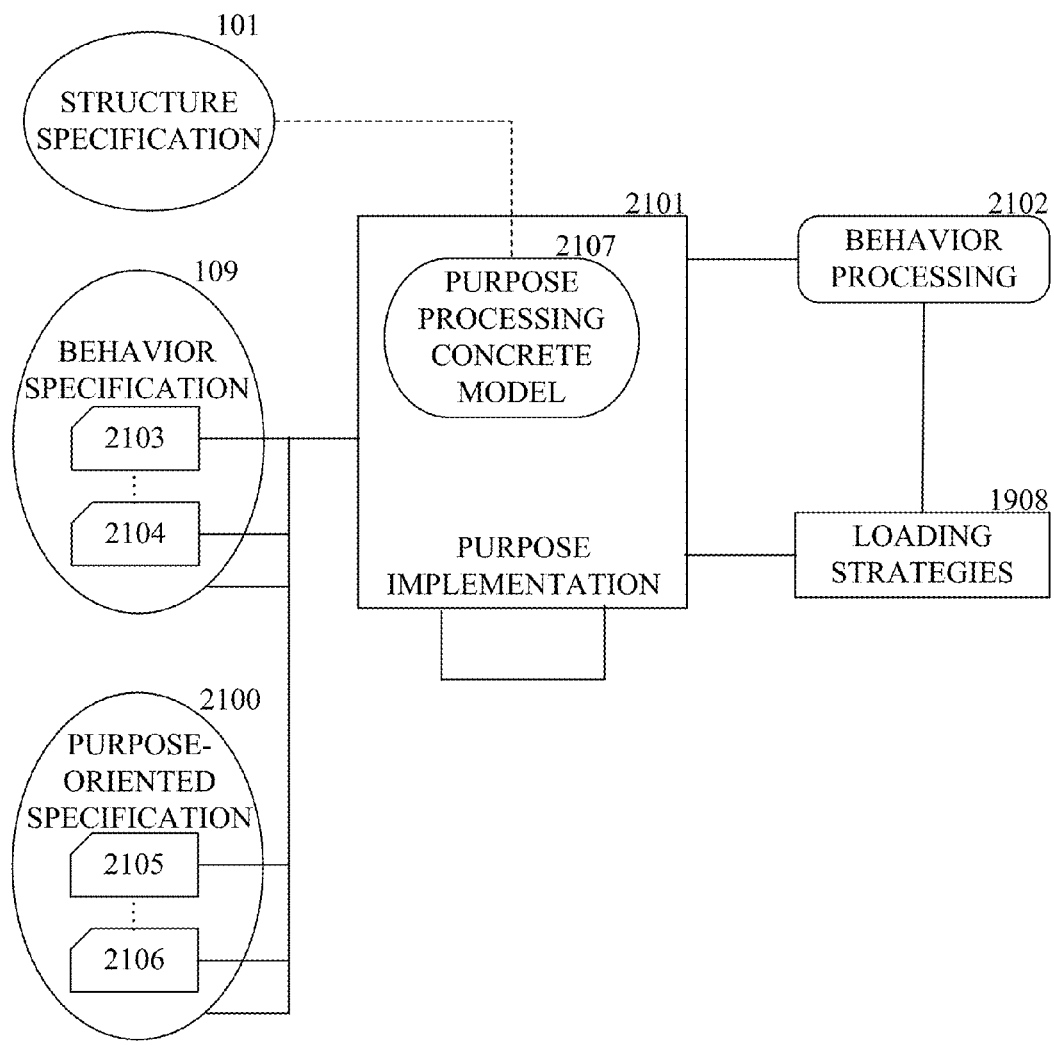
FIG. 21 illustrates behavior processing using purpose-oriented implementation.

Behavior controller 110 uses one or more behavior runner 111 to process a behavior component specified in a behavior in one embodiment of this disclosure. Although represented as a separate component in FIG. 1, unless explicitly mentioned otherwise, behavior runner 111 may be construed as an integral part of behavior controller 110 meant to perform specific task as controlled by behavior controller 110. Behavior runner 111 may be represented by behavior controller 110 in this disclosure. Behavior controller 110 performs a purpose-oriented processing on the behavior component as illustrated in FIG. 21 and using components illustrated in FIG. 1. The behavior component has a specific purpose in the behavior specification, and a behavior component implementation appropriate for this specific purpose, may be used to process this behavior component.

Behavior controller 110 performing the behavior processing in this embodiment is illustrated as behavior processing 2102. Behavior processing 2102 uses a loading strategy 1908 to identify and obtain a behavior component implementation—a purpose implementation 2101 that is suitable to process a behavior component such as 2103. Behavior component implementation 2101 is based on a processing concrete model 2107 that is derivable from structure specification 101 or general data model 103. This enables interpretation of an application data item 106 as a processable data items 108 illustrated in FIG. 1, using processing concrete data model 2107, and as suitable for processing by behavior component implementation 2101. Behavior component implementation 2101 uses processable data items 108 to process behavior component 2103 as specified by behavior specification 109. It must be noted that processing concrete model 2107 is similar to processing concrete model 105 illustrated in FIG. 1 except it is meant for a specific purpose representative of the behavior component. Different behavior component implementations may use different processing concrete models. The behavior component implementations may use item processor 107 to interpret application data item 106 to processable data item 108 illustrated in FIG. 1. In another embodiment, processing concrete model 105 may be same for an implementation of behavior controller 110 and all behavior component implementations.

A behavior component may comprise other nested behavior components in another embodiment. Behavior component implementation 2101 obtains an instance of behavior component implementation 2101 suitable for the nested behavior component. The nested behavior component is processed similarly using purpose-oriented processing under the control of the parent behavior processing implementation 2101.

Behavior controller 110 implementation may also process additional behavior language constructs in accordance to the rules of the behavior specification language in another embodiment. Such processing may require a processing concrete model 105 that enables an implementation of behavior controller 110 to interpret application data item 106 to processable data item 108.

Behavior component implementation 2101, in another embodiment, may use a purpose-oriented specification 2100 or a purpose-oriented specification component such as 2105 to perform a customized purpose-oriented processing, the customized purpose being specified by purpose-oriented specification 2100.

The behavior component implementation interprets application data item 106 using processing concrete model 2107 by requesting behavior processing 2102 to provide application data item 106 as processable data item 108 in another embodiment. Behavior processing 2102 obtains processable data item 108 using item processor 107 and processing concrete model 2107 for the specified application data item 106.

Behavior component implementation 2101 may process behavior component 2103 using one or more other internal processing concrete models to process behavior component 2103 in another embodiment. Behavior component implementation 2101 may map processable data item 108 to internal processing concrete models or use internal processing concrete models that are derivable from general data model 103 or structure specification 101 and use the internal processing concrete model to obtain processable data item 108. For example, one internal processing concrete model can be used for computing mathematical expressions and another internal processing concrete model can be used for enforcing accessing-control for information to be rendered to users. In another embodiment, the behavior component is the entire behavior specification 109. Here, the behavior component implementation is a custom implementation that provides special processing for the entire application and as specified by behavior specification 109. It is also possible to have an embodiment where the behavior component implementation processes the behavior component in additional ways.

It may be noted that processable data items 108 represent an interpretation of application data items 106 as defined by processing concrete model 105. It may further be noted that in an embodiment, it is possible but not always necessary to retain processable data items 108 as long as there is a mechanism to obtain this data interpreted as processable data items 108 when necessary.

The behavior component may represent what processing is required whereas the behavior component implementation performs the actual processing. This makes the behavior declarative as the behavior specification specifies what processing is required and the declarative application system determines how to perform the processing.

The behavior processing implementation may process the behavior specification independent of how processing concrete model 105 resolves generalizations in general data model 103 in one embodiment. In another embodiment, the behavior processing implementation may process the behavior specification based on how processing concrete model 105 resolves generalizations in general data model 103. A specific resolution of generalization or addition of purpose specific information or both may result in information in processable data items 108 that enables processing of the behavior as appropriate to such resolution. In another embodiment, a behavior component implementation may not directly use the processing concrete model. Instead, the processing concrete model is derived using general data model 103 and the result of resolving generalizations in general data model 103, thereby providing the processing concrete model.

Identifying the behavior component implementation for purpose-oriented processing of the behavior component, in one embodiment, corresponds to an illustrative algorithm of the following sequence of steps: obtaining the details of behavior component specified in behavior specification; determining the match criteria that must be satisfied by a behavior component implementation to be able to process the behavior component; finding a behavior component implementation available for processing based on the match criteria, the behavior component implementation being based on a processing concrete model that is derivable from the general data model or structure specification. The behavior component may represent a specific purpose in the behavior specification and a behavior component implementation suitable for performing the purpose-oriented processing of the behavior component is identified. Such an illustrative algorithm may be used by a loading strategy 1908 to obtain a behavior component implementation for a behavior component. The step of obtaining details of behavior component and determining the match criteria may be optional if a predetermined behavior component implementation is to be used for a specific behavior component. The step of finding a behavior component implementation may be optionally combined with step of determining the match criteria and implemented using various mechanisms. Some examples of such mechanisms include mechanism based on a declaratively specification, search and matching using an automated reasoning or a special purpose implementation or any combination thereof.

Some examples of match criteria that can be used to identify a behavior component implementation include criteria for purpose of behavior component, criteria based on details of the behavior component, criteria for the required processing concrete model of the behavior component implementation, criteria for resolution of generalizations in the general data model to derive the required processing concrete model of the behavior component implementation, criteria for conditional matching using the application data items, criteria for a parent behavior component implementation processing a nested behavior component, platform criteria, technology criteria, performance criteria, policy criteria, business criteria, special criteria defined in a declarative specification, etc.

Identifying the behavior component implementation to perform purpose-oriented processing for a behavior component, in another embodiment, uses a predetermined behavior component implementation obtained during an application preparation step before the declarative application system processes the application behavior. The preparation step in this embodiment identifies the behavior component implementation. Furthermore, the preparation step identifies behavior component implementation using an algorithm similar to the algorithm used for identifying of the behavior component implementation performed during application processing for an embodiment that does not use the preparation step, with the exception that the match criteria may not be based on information such as application data items available only during processing of the application behavior. In another embodiment, the preparation step does not pre-determine the behavior component implementation but pre-determines some or all match criteria relevant to perform the matching and optionally additional information useful to perform the matching using the predetermined match criteria.

Since the behavior component details are defined using the general data model, the declarative application system uses a behavior component implementation based on a processing concrete model that is derivable from the general data model. As a result, unlike most conventional applications, a behavior component implementation may be based on a processing concrete model that may not match syntactically but match based on generalizations in the general data model. Moreover, unlike most conventional applications, the behavior specification implementation that processes a behavior component may exhibit a behavior specified declaratively by other match criteria described above. A behavior specification implementation may alter its processing concrete model provided it remains derivable from the general data model. A processing concrete model may enable the behavior component implementation to adapt a general data model with a processing specific aspect not specified by the general data model.

Executing the behavior component implementation to perform purpose-oriented processing of the behavior component, in one embodiment, corresponds to an illustrative algorithm of following sequence of steps: obtaining the behavior component implementation; providing the input needed for behavior component implementation as specified by the behavior component; instructing the behavior component implementation to process the behavior component as specified by the behavior specification; retrieving the result from the behavior processing implementation. The behavior component implementation is based on a processing concrete model and it processes an application data item interpreted using the processing concrete model, the processing concrete model being derivable from the general data model or structure specification, thereby enabling the behavior component implementation to operate on the application data items represented using the general data model.

The behavior component implementation, in another embodiment, may process the behavior component locally on one or more processors that are part of the declarative application system, remotely on one or more processors that may or may not be part of the declarative application system or both.

Executing the behavior component implementation to perform purpose-oriented processing of the behavior component, in another embodiment, comprises running the behavior component implementation; the behavior component implementation fetching any necessary input and application data item; interpreting the application data item using its processing concrete model as necessary and submitting any resulting output to the declarative application system.

There may be more than one behavior component implementations executing simultaneously in another embodiment. Such simultaneous execution may be required by the behavior specification. The behavior component implementation may perform processing wholly or partly in software, hardware, firmware or any combination thereof. Moreover, it may perform its processing aided by a processor that may not be part of the declarative application system.

Identifying a nested behavior component in the behavior component for purpose-oriented processing of the behavior component, in one embodiment, corresponds to an illustrative algorithm of following sequence of steps: determining the possible nested behavior components under the parent behavior component and may require processing in accordance to the rules of the behavior specification language; determining which possible nested behavior component is ready for processing and selecting a nested behavior component that is ready for processing based on the specified behavior and in accordance to the rules of the behavior specification language. The parent behavior component implementation identifies the nested behavior component.

The behavior component implementation P processes a behavior component with a nested behavior component in one embodiment. The nested behavior component implementation N may use a processing concrete model Nm that is different than processing concrete model Pm used by P. Both Nm and Pm are derivable from the general data model. If Pm and Nm allow direct interpretation from one concrete model to other, an application data item d available in P as Pd (interpreted in P as Pd using Pm), may be directly available to N as Nd by interpreting Pd using Nm. If Pm and Nm do not allow such interpretation, N processes d by first obtaining d and then interpreting d using Nm. If Nm is same as Pm, N may directly use Pd as Nd. In another embodiment, a behavior controller using a processing concrete model may provide processable data items to a behavior component implementation using the technique described above between the behavior component and nested behavior component.

In one embodiment of a declarative application system with one or more processors, the processing of a behavior component may be performed such that the processing is suitable for the role assumed by the processor in the declarative application system or independent of such role, the processing being performed either completely by a processor or collaboratively by one or more processors. In another embodiment, the identified behavior component implementation is cached and reused subsequently for similar behavior components. The relevancy of a previously cached result for a behavior component may be managed using mechanisms similar to ones used for the search and match techniques.

Behavior specification languages may support constructs that enable defining application specific work. Such a construct that is used to specify a predefined unit of work is referred henceforth as an action primitive. Some examples of such unit of work include perform domain actions, send or receive message, process data items and perform a computation. An action primitive is represented as a behavior component and may also be represented as a part of a behavior component. An action primitive specification may require specification of details. The specification of these details is done using a general data model. An action primitive represents an activity and therefore, the term action primitive may be used in lieu of an activity and vice-versa. For example, send message action primitive can be used to define an activity that sends a message to a specific domain actor. In order to support diverse application domains and diverse activities in each domain, behavior controller 110 in this embodiment uses behavior runner 111 to perform work as specified by activities or behavior components containing such activities. Behavior runner 111 in this embodiment uses an action primitive implementation that performs the actual work represented by the action primitive. This makes the declarative application system general-purpose by allowing processing of application with diverse action primitives.

Figure 19:
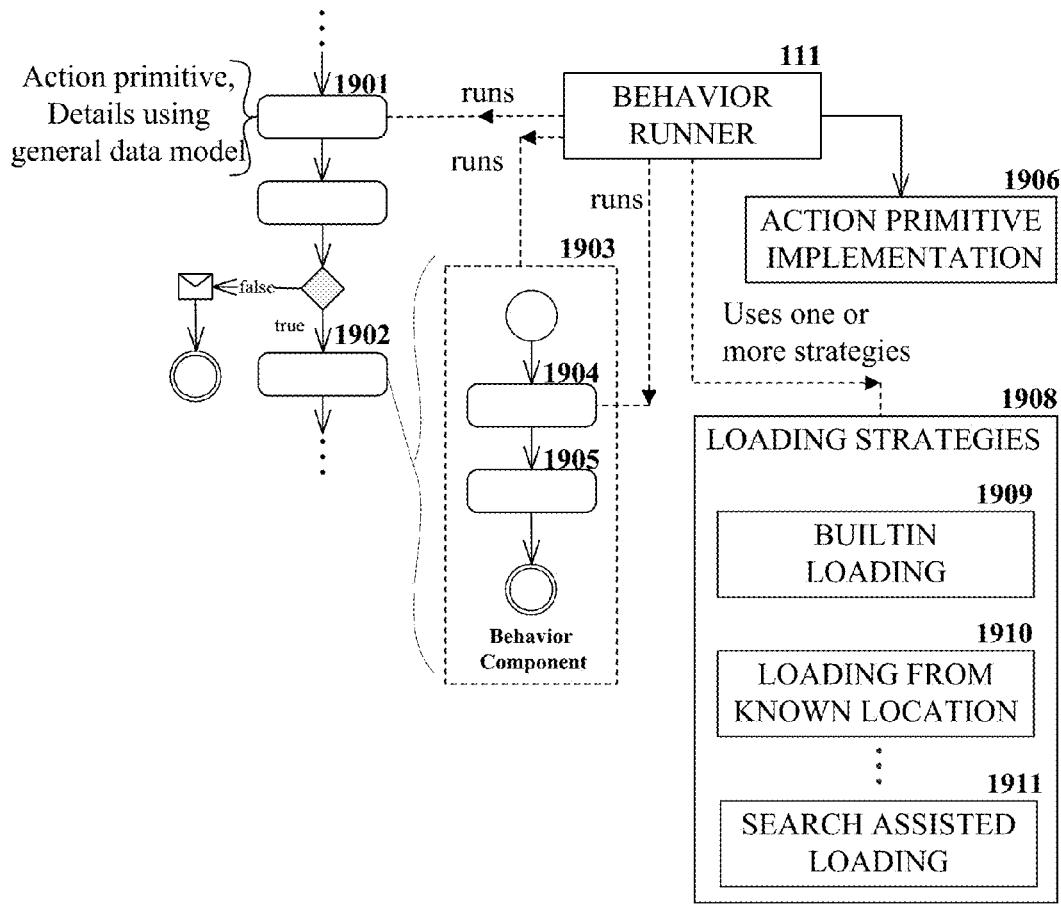
FIG. 19 illustrates an explanatory action primitive handling for an embodiment.

The FIG. 19 illustrates how a behavior component implementation such as action primitive implementation 1906, in an embodiment, may be made available to behavior runner 111. The behavior component implementation is identified and made available for behavior component processing using one or more loading strategies 1908. These loading strategies 1908 include built-in loading which loads a behavior component implementation for a known behavior component as part of the application's runtime system 1909, matching a behavior component using one or more criteria and loading a behavior component implementation from known location 1910—such loading often done as modules that are loaded into the system on demand, search assisted loading 1911 where a matching behavior component implementation is dynamically searched and loaded from a location accessible to the system. A behavior component implementation may require one or more associated implementations that are necessary to use the behavior component implementation. A behavior component implementation may delegate some or all processing of an activity to a remote service.

A behavior component implementation enables the declarative application system to perform processing that may typically not be part of the system. Identifying and using a behavior component implementation enhances the behavior processing capability of the system. Ability to support mechanisms that allow using behavior component implementations outside what is loaded initially onto the system further enhances the behavior processing capability of the system. A declarative application system may reuse behavior component implementations that are woven together declaratively in a behavior specification. This makes declarative application systems significantly easier to build once the behavior component implementations are available. The behavior component implementations are also simpler to build and maintain as they perform tasks that may be fairly limited in scope compared to conventional applications. Moreover, the behavior component implementation may allow a purpose-oriented specification and use purpose-oriented processing that further control how specific aspects of the behavior component processing are handled. For example, an activity that renders an application data item may allow a view specification that defines how a view generator may generate a view that can render an application data item to the user.

General data model allows building systems that may otherwise not be built, as most conventional applications may not use an incomplete or a general data models—a behavior component implementation uses a processing concrete model that may be derived from a general data model. The loading strategies 1908 find a matching behavior component implementation for a behavior component in behavior specification. The matching may be based on criteria such as the behavior component to be processed and additional criteria such as the match criteria described above to identify a behavior component implementation.

The resolution of generalizations in the general data model that is used to specify the behavior component details in one embodiment, serve as an additional criteria to determine the behavior component implementation capable of processing the behavior component. This enables identifying and making available behavior component implementations based also on how generalizations are resolved. For example, consider a send-message primitive for sending a message content specified using an application data item with a generalization on sensitivity. On resolving the generalization, it is determined that a specific instance of message content has high sensitivity. A send-message primitive implementation capable of encrypting the message content is matched and this implementation encrypts high sensitivity message content before sending it to a target entity. In this example, although the behavior specification does not explicitly include instructions to encrypt the message, an action primitive implementation, capable of encrypting the message, is matched based on how generalization was resolved.

The matching aspect of loading strategy 1908 may be customized in another embodiment using a purpose-oriented specification that describes the matching of behavior component implementation.

The behavior specification 109 is specified using more than one specification language in one embodiment. Consider that in addition to launching a process, it is also necessary to ensure that only specific users are allowed access to an application data item. The access-control requirement for the application data item can be defined using an access-control specification language. The access-control specification is a special purpose-oriented specification. Behavior controller 110, behavior runner 111 or both for this embodiment runs an action primitive implementation that can interpret and enforce the access-control requirements specified in the access-control specification for the relevant application data items. It is also possible to have an embodiment where behavior controller 110 uses an implementation based on this disclosure to process behavior constructs and behavior components specified by behavior specification 109 in accordance to rules supported by one or more behavior specification languages.

It may become apparent to those skilled in the art that such an implementation of behavior controller 110 offers advantages over conventional special purpose applications described in the background of this disclosure. Once an implementation for handling a specific behavior specification language construct and corresponding data model constructs is available, the declarative application system can be used to process applications that use the supported general data model constructs and behavior specification language constructs. Moreover, behavior component implementations may be added to support processing for behavior components when such behavior components are needed. Support for handling additional languages and enhancements to constructs for existing languages can be added as needed, thereby enabling a modular and pragmatic approach for product development.

Behavior specification 109 is interpreted by translating into instructions in one embodiment; such instructions may be processed by an implementation of behavior controller 110 to process behavior components as specified in behavior specification 109. In another embodiment, behavior specification 109 or any translation thereof is interpreted by translating it into a computer application program object code that when executed performs the purpose-oriented processing of behavior components as specified in behavior specification 109. Processing the behavior specified by behavior specification 109 is performed by executing this interpreted computer application program object code. Such translations may be wholly or partially automated. In another embodiment, behavior specification 109 or any translation thereof is interpreted by translating it wholly or partly into hardware that either independently, or in conjunction with software, performs the purpose-oriented processing of behavior components as specified in behavior specification 109.

A behavior processing as specified by behavior specification 109 in one embodiment comprises executing a specified flow of activities in response to an application trigger. Behavior controller 110 interprets behavior specification and controls flow of activities in this embodiment to meet the requirements of behavior specification 109. A behavior specification language may define constructs that control flow of activities. These constructs are interpreted and processed by behavior controller 110 in this embodiment to control flow of activities according to the rules of behavior specification language.

A behavior specification is defined by behavior specification language that supports action primitives in one embodiment. In this embodiment, representing a unit of work specified in behavior specification 109 by an action primitive corresponds to an illustrative algorithm of following sequence of steps: identifying the unit of work to be performed; selecting an action primitive that can represent this unit of work such that the action primitive details can be fully described using a data model that is derivable from general data model 103. The action primitive is a behavior component representing the unit of work in the behavior specification. An action primitive implementation is a behavior component implementation.

In another embodiment, identifying an action primitive implementation for extending behavior processing capability corresponds to the illustrative algorithm of identifying the behavior component implementation for purpose-oriented processing of the behavior component disclosed above in an embodiment, the behavior component being the action primitive whose action primitive implementation is being identified. Using an action primitive implementation for extending behavior processing capability corresponds to the illustrative algorithm of executing the behavior component implementation to perform purpose-oriented processing of the behavior component disclosed above in an embodiment. Moreover, an action primitive may be nested within another behavior component.

An action primitive is a behavior component and ability of the declarative application system to load action primitive implementations extends the behavior processing capability of the system. Moreover, the action primitive details are specified using the general data model. As a result, unlike most conventional applications, an action primitive implementation may be based on a processing concrete model that may not match syntactically but match based on generalizations in the general data model. Moreover, unlike most conventional applications, the action primitive implementation used to process an action primitive may exhibit a behavior specified declaratively by other match criteria described earlier in this disclosure.

Behavior specification 109 in another embodiment may be interpreted as a single behavior component as a whole. The processing of behavior for the application as specified by this behavior specification may be implemented wholly or partly using a custom behavior implementation for the application. The custom behavior implementation processes the application data items using processing concrete model 105 and as specified by behavior specification 109.

The FIG. 1 illustrates an embodiment of a declarative application system that is capable of persisting data items. However, it is possible to have an embodiment without the capability of persisting data items, whereby the declarative application system do not persist any data items. Among the many advantages offered by an application that works with persisted data items, some of the advantages are discussed here for an embodiment that supports persisting data items. The declarative application system can operate on large number of data items by moving data items between a processing memory and persistent data item storage. Moreover, persisted data items can be accessed to process the specified application behaviors as well as by an implementation to perform additional processing on these data items. Data items may be processed immediately in response to received stimulus or delayed for future processing. Persistence improves reliability of system by enabling saving critical data items.

One or more interpretations of saved data items is possible based on a persistence concrete model 113 derived from general data model 103 in this embodiment. Application data items 106 may include data items persisted in item storage 115 and made accessible to the application in an embodiment that is capable of persisting data items. It is possible to access persisted data items only when required. In another embodiment, such interpretation of persisted data items in item storage 115 may be done either directly by an implementation that understands persistence concrete model 113 or by using a view based on general data model 103. In another embodiment, an additional data item processing module can add functionality that may be independent of the designed application behavior or as an additional application specified behavior that may otherwise not be possible in an embodiment that does not support persistent data items.

In an embodiment that supports persisting data items, a persistence operation related to an application data item 106 comprises one or more operations such as to store, retrieve, update, query or process data represented by the application data item 106 that is stored in the item storage 115. Persistence modeler 112 transforms general data model 103 to persistence concrete model 113. Persistence concrete model 113 provides information essential for performing persistence related operations on the data items. A persistence manager 114 uses persistence concrete model 113 to persist and access the persisted data items in item storage 115. The data items are persisted in item storage 115 using suitable data storage and retrieval technologies. Some examples of item storage 115 include relational databases, document-oriented databases, object databases, XML databases, in-memory data storages, distributed data storages, data storages distributed across one or more networked data stores, data management technologies accessible across a network.

Item storage 115 described in this embodiment does not limit the type or number of data stores, topology of these data stores and the mechanisms to access data items stored in these data stores. Persistence manager 114 uses the mechanisms provided by the data storage and retrieval technology used by item storage 115 to perform persistence related operations on processable data items 108. This can be further explained by considering an embodiment that uses a processing concrete model 105 represented using Java classes, processable data items 108 represented as Java objects; a persistence concrete model 113 represented using SQL schema, each data item being stored in a relational database item storage 115 as one or more database rows in one or more database tables; persistence manager 114 maps data item operations between Java objects to SQL tables.

Processable data items 108 get persisted and fetched on-demand in another embodiment without a need to incorporate explicit persistence specific controls in the application behavior specification.

Performing a persistence operation related to application data items 106, in another embodiment, corresponds to an illustrative algorithm of following sequence of steps: identifying the type of operation to be performed; determining a mechanism provided by the data storage and retrieval technology used by item storage 115 that can perform this operation; obtaining a persistence specific representation for application data items 106 using persistence concrete model 113 required for the operation; performing the operation using the data storage and retrieval technology specific mechanism; obtaining application data items 106 from the retrieved data, using persistence concrete model 113, if necessary to obtain the application data items 106 from the retrieved data for the operation involving getting data from item storage 115. Persistence manager 114 in this embodiment implements such operations. In another embodiment, persistence manager 114 uses special-purpose implementations that handle various types of generalizations suitable for the data storage and retrieval technology specific mechanism.

A persistence operation related to an application data item 106 may also be performed in this embodiment by using a purpose-oriented representation of application data item 106, like processable data item 108 that represents application data item 106 using processing concrete model 105, if persistence concrete model 113 supports direct interpretation of data items with such purpose-oriented concrete model.

Unlike most conventional applications, a persistence concrete model may enable a persistence manager to adapt a general data model with a persistence specific aspect not specified by a general data model in an embodiment. It may resolve a generalization in the general data model such that the application data items may be adapted for persistence based on additional criteria. Consider an embodiment for a personal calendar application where meeting times in the general data model uses a generalization of representing meeting time as local time and timezone at meeting venue. The persistence manager resolves this generalization to store meeting time as UTC time and timezone, and ensures that the meeting application items undergo timezone conversion as part of resolving the generalization. This enables an additional processor to offer personal task manager functionality whereby a user may chronologically sort the meetings irrespective of meeting venue timezone. Meeting application general data model did not require UTC times. However, a suitable persistence concrete model may allow persisting the meeting application items such that it is suitable to support additional processing without affecting the meeting application's general data model. The persistence manager may also alter the persistence concrete model provided it remains derivable from the general data model.

The FIG. 1 illustrates an embodiment of a declarative application system that is capable of persisting application milestones. However, it is possible to have an embodiment without the capability of persisting application milestones, whereby the declarative application system do not persist any application milestones. An application milestone represents an occurrence of significance during the processing of application. The milestones represent points of interest in the application processing logic that may be critical for representing that the application as a whole, or one or more of its components, reached a specific status. For example, an activity that freezes a customer account for lack of payment in a customer management business process can represent a milestone signifying that the customer account is frozen and henceforth incapable of certain types of transactions. Capturing information about these milestones enables providing an understanding on what transpired in the application and putting these milestones in context with the behavior specification may provide a basis to reason why the milestone happened. This information is vital for computing—either in real-time or later for historical information processing.

Milestone manager 116 in this embodiment detects a milestone and persists the milestone information in milestone storage 117. A persistence operation related to an application milestone comprises one or more operation such as to store, retrieve, update, query or process data represented by the application milestone that is stored in milestone storage 117. Milestone manager 116 stores information necessary to represent that the application has reached a milestone, application processing information such as time the milestone was reached and additional data such as inputs, outputs, relevant application data items describing the application status and that is capable of providing a semantic interpretation of application status at the milestone.

The decision of how milestone manager determines what constitutes an application milestone and what gets stored for the application milestone is determined by the implementation of milestone manager 116 in this embodiment. The milestone manager 116 may store one or more relevant data items. The relevant data items are identified by the milestone manager 116; these relevant data items collectively represent the application status at the milestone.

The milestone manager uses the persistence manager 114 to persist processable data items 108 in one embodiment. In another embodiment, milestone manager 116 uses other mechanisms to determine relevant data items, persist the relevant data items and any additional milestone specific information in its own dedicated storage. Persistence manager 114 uses mechanisms provided by the data storage and retrieval technology used by milestone storage 117 to perform persistence related operations on the milestone. The persistence technologies that could be used for milestone storage 117 may be similar to the persistence technologies that could be used for item storage 115.

Performing a persistence operation related to an application milestone, in one embodiment, corresponds to an illustrative algorithm of following sequence of steps: identifying the type of operation to be performed, identifying a mechanism provided by the data storage and retrieval technology used by milestone storage 117 that can perform this operation, obtaining a persistence representation for application milestones required for the operation, performing the operation using the identified data storage and retrieval specific mechanism, obtaining application milestone from the persistence representation if necessary for operation involving getting application milestone from milestone storage 117. Milestone manager 116 in this embodiment implements these operations.

Different mechanisms may be used to detect the milestone and identify relevant data items in one embodiment. Moreover, it is possible to have more than one simultaneously active mechanism. One example mechanism comprises an application domain-specific milestone detection module, whereby the milestone definition, milestone detection and identification of relevant data items for the milestone is defined by an application domain-specific implementation. Another example mechanism uses a milestone specification, whereby the milestone definition, milestone detection and determination of milestone's relevant data items may be specified using constructs offered by the structure and the behavior specification languages. Furthermore, the mechanisms in this embodiment may use an implementation that may be customized by a purpose-oriented specification that specifies milestone relevant information such as milestone definition, detection of milestone and criteria to identify data items relevant for the milestones.

In another embodiment, reasoning application's current behavior, past behavior or both using structure specification, behavior specification and one or more application milestones corresponds to an illustrative algorithm of following sequence of steps: obtaining structure specification, behavior specification and one or more application milestones; identifying application data items for the application behavior related to the application milestones; reasoning based on state of the relevant application data items at application milestones and the specified behavior corresponding to these application milestones. The application milestones, the structure specification, or behavior specification, or any combination thereof in the first step may be obtained from a local declarative application system or another declarative application system allowing access for such information. Milestone manager 116 in this embodiment may perform such reasoning. Alternatively, additional processor 121 in this embodiment may perform such reasoning. Such additional processor 121 may also use special purpose reasoner(s) to perform such reasoning. In another embodiment, such reasoning may be part of another conventional or declarative application system that has the ability to obtain the structure specification, the behavior specification and one or more application milestones.

The FIG. 1 illustrates an embodiment of a declarative application system that is capable of providing access to data items for additional processors 121 and additional modules that may be part of the declarative application system. However, it is possible to have an embodiment that does not provide such access. In an embodiment that provides access to data items, it is possible to access persisted data items and milestone storage as illustrated in FIG. 1. Access modeler 118 obtains access concrete model 119 using general data model 103. Access concrete model 119 represents data model information essential for communicating with an entity requesting one or more access items, henceforth referred to as an accessor. The access items may include application data items 106 and application milestone information represented using access concrete model. Access manager 120 interprets access request using access concrete model 119. In this embodiment, access manager 120 may use information stored in item storage 115 and milestone storage 117 to handle the access request. Access manager 120 interprets the persisted data items stored in item storage 115 using persistence concrete model 113 and implements interfaces necessary to communicate with accessors in order to present a view for the access items.

Access manager 120 provides access to access items directly using processable data items 108 in another embodiment; these access items being loaded on demand using persistence manager 114.

Presenting a view for an access item, in another embodiment, corresponds to an illustrative algorithm of following sequence of steps: identifying the access items that are relevant for presenting a view; obtaining the relevant access items; obtaining an access representation by using access concrete model 119 and application data items 106 in the relevant access items; providing the access representation of the access items to accessor. Access manager 120 in this embodiment presents this view for the access items. It is also possible to have additional ways for accessors to access the access items.

An implementation of access manager 120 in one embodiment uses an access-control mechanism to present a view for access items by controlling access to the application data item. Such an access-control mechanism may be specified using an access-control specification that allows specifying access to the application data items. For example, employee's address information is accessible but employee's compensation information is not accessible to accessors. Unlike most conventional applications, an access concrete model may enable the access manager to adapt the general data model with an access specific aspect not specified by the general data model. The access manager may alter the access concrete model provided it remains derivable from the general data model. In another embodiment, access manager 120 uses special-purpose implementations that handle various types of generalizations suitable for accessing the access items.

The FIG. 1 illustrates an embodiment of a declarative application system with additional processors 121 that accesses application data items and application milestones to perform some work that may not have been designed by the application. However, it is possible to have an embodiment without any such additional processors. In an embodiment with additional processors there may be one or more additional processors 121 that may use access items to conduct an additional processing to provide an added functionality which is not specified by behavior specification 109, structure specification 101, or both. In one embodiment, additional processor 121 may consume the access item information in real-time by subscribing for such information. In another embodiment, additional processor 121 may also consume the access item information off-line or as historical data. Additional processor 121 may operate on the access item using structure specification 101 and behavior specification 109. It may be necessary for additional processor 121 to obtain the specifications from the declarative application system. Additional processor 121 augments the application functionality or offers a new functionality. Among other things, the declarative application system may enable an additional processor 121 to know what was processed by the application, when such processing happened and why such processing happened. Such mechanism of precise and in-depth information enables semantically rich additional processor 121 based applications.

In one embodiment for a sample real-estate auction application, typical functionality involves a customer bidding for a property and if property owner accepts the bid, the customer pays bid price to the property owner. General data model 103 enables representing information related to each real-estate property, bid and transaction including the property owner, customer, property location, bid price, transaction date. Moreover, each bid between the property owner and a customer along with its processing related information is available as application milestone. Additional processor 121 that is allowed access to this information can analyze the bids for real-estate deals of similar properties in an area and determine an optimum time to increase minimum bid price by an optimum amount to maximize returns for the property owner. Another additional processor 121 can look at the same information and determine optimum time and bid-price for a customer to bid, complete negotiations in minimum time and secure property for lowest price. The real-estate auction application of this embodiment was not designed to meet the tasks performed by these additional processors 121. In this embodiment, the comprehensive semantics inferred from the application data items and milestones can be augmented by additional knowledge not available to the real-estate application to offer new application functionality.

Using an access item to conduct an additional processing to provide an added functionality, in one embodiment, corresponds to an illustrative algorithm of following sequence of steps: obtaining access item and interpreting the access item using access concrete model 119; processing the interpreted access item for additional processing. Additional processor 121 in this embodiment performs such additional processing.

Figure 20:
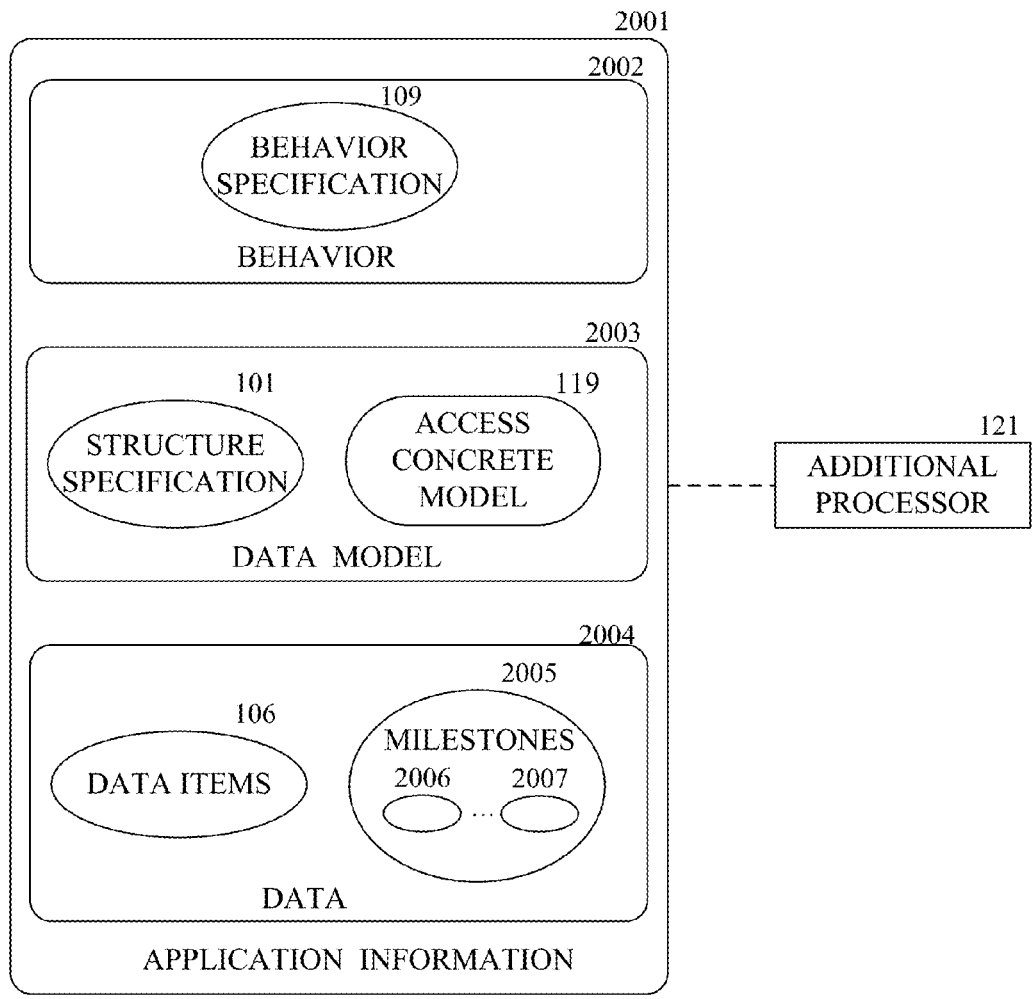
FIG. 20 illustrates main components of declarative application information that may be used for additional processing.

As illustrated in FIG. 20, one or more additional processors 121 in one embodiment use information from one or more declarative applications 2001 to augment functionality offered by the application behavior or provide totally different application functionality. Additional processor 121 may access some or all such illustrated components of declarative application information 2001. Moreover, it may also be possible for additional processor 121 to obtain other information pertinent to the application's processing from the declarative application processing system.

Additional processor 121 in this embodiment may interpret the application behavior using behavior specification 109 or information derived from behavior specification 109. Additional processor 121 may interpret the application data model using structure specification 101, a representation of access concrete model 119 or both. Additional processor 121 may obtain the application data represented by application data items 106, application milestones 2005, or both. The application milestones may contain information elements such as 2006 and 2007, representing information for application data items 106 or other information specific to application's processing at the time the milestone was reached. Moreover, application milestone 2005 may contain information correlating it to the behavior represented by behavior specification 109. Each accessed application data items 106, either accessed directly as application data items 106 or as part of application milestone 2005 is represented using access concrete model 119. The additional processor 121 in this embodiment interprets such application data items 106 using access concrete model 119. Additional processor 121 may not require access to all available application information as some information may already be available to additional processor 121.

Additional processor 121 in one embodiment is implemented such that the implementation knows about application structure specification 101, behavior specification 109, access concrete model 119, or any combination thereof. In another embodiment, additional processor 121 uses an implementation configured to obtain a subset of application data items 106 and process them using a special-purpose processing.

Additional processor 121 in one embodiment is implemented as a declarative processing application processed by the same system that runs the declarative processing application whose functionality is augmented by this additional processor. In another embodiment, additional processor 121 is implemented as a declarative processing application that may be processed by a different system than the system that runs the declarative processing application whose functionality is augmented by the additional processor. In yet another embodiment, additional processor 121 may be a special purpose software program, an additional processing implementation that can be loaded into the declarative application system, or a computing machine that directly or indirectly interfaces with the declarative application system and is implemented to add functionality to one or more declarative applications. As should be apparent to those skilled in the art, there are other possibilities for implementing additional processors and interfacing these additional processors with the declarative application system.

The ability to use additional processor 121 greatly enhances the capabilities of a declarative application system by offering functionality that was not designed for the declarative application. It also becomes feasible to have functionality that can be shared across large number of applications. It also becomes feasible to add special functionality that greatly customizes specific aspects of a declarative application.

The FIG. 1 illustrates an embodiment of a declarative application system with general modeler 102 that derives general data model from structure specification 101. General data model 103 may be always interpreted from structure specification 101, explicitly represented in an artifact using a data modeling language or may be an inherent part of an implementation or any combination thereof.

When the general data model is to be represented using a language different than the structure specification language, interpreting a structure specification representing a general data model, in one embodiment, corresponds to an illustrative algorithm of following sequence of steps: obtaining structure specification 101; identifying X data model components defined using constructs supported by the structure specification language; translating the X data model components to Y data model components that are represented using constructs supported by the general data model representation language; forming a complete general data model 103 using data model components Y. General modeler 102 uses such an algorithm and uses structure specification 101 to interpret general data model 103.

Structure specification 101 in another embodiment is interpreted to a specification data model and general data model 103 is derived from this specification data model using a special purpose modeler implementation, optionally guided by a specification to fine tune the interpretation of general data model 103. In another embodiment, structure specification 101 directly represents general data model 103 and hence interpreting a structure specification representing a general data model requires no processing by general modeler 102 to derive general data model 103.

Figure 5:
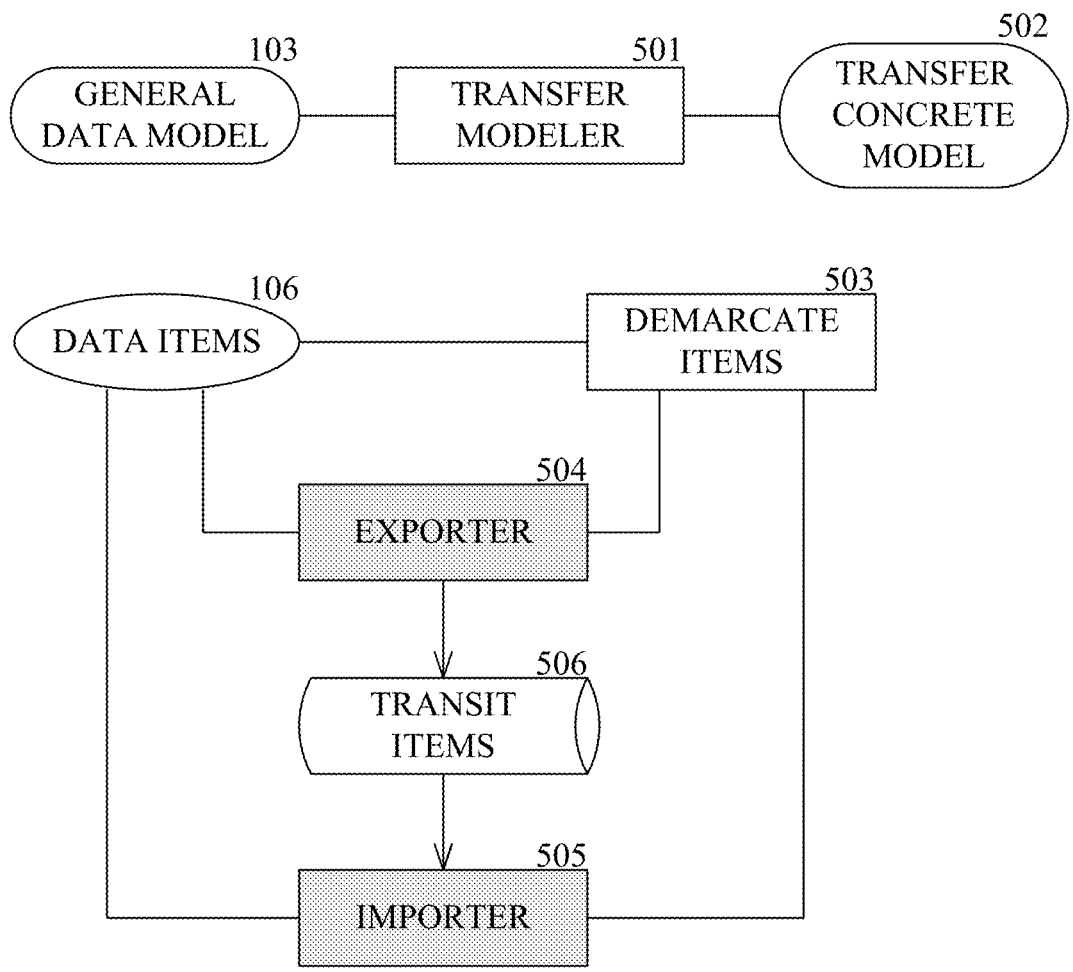
FIG. 5 illustrates block diagram for transferring application data items, all rectangular boxes may refer to data items 106, purpose-oriented data items, purpose-oriented specifications, other specifications and data models as required by their implementation.

General data model 103 or structure specification 101 representing general data model 103 is used to derive various purpose-oriented concrete models illustrated in FIG. 1, FIG. 5 and FIG. 21 such as processing concrete model 105, purpose processing concrete model 2107, persistence concrete model 113, access concrete model 119 and transfer concrete model 502. These concrete models are also referred to as purpose-oriented concrete models. Moreover, these purpose-oriented concrete models may be used by purpose-oriented item processors, like 107, to interpret application data items as purpose-oriented data items, like 108, to be used for a purpose-oriented processing. The purpose-oriented concrete model comprises data model components necessary for the purpose, such data model components being derived from or derivable from general data model 103. A purpose-oriented concrete model is derivable from a general data model if the purpose-oriented concrete model can be derived from the general data model. General data model 103 may comprise additional data model components that may not be represented in the purpose-oriented concrete model.

General data model 103 uses a generalization where a data modeling aspect cannot be a precise data modeling aspect. Generalizations in general data model 103 may be resolved as necessary and suitable for the purpose, thereby deriving a purpose-oriented concrete model. A generalization or an aspect of generalization may be represented for a general data model 103 in various ways in an embodiment. Some examples include a special-purpose specification, explicit specification in the general data model using constructs offered by data modeling language. For a general data model component, a generalization or various aspects of a generalization may be implied without any explicit representation thereof in this embodiment. The resolution of a generalization may involve syntactic, semantic or both transformations of the general data model components. Such transformations may also be domain specific or specific to an application. Moreover, a generalization may be resolved manually—requiring explicit development, or automatically—using techniques such as using domain specific modeler, using rule-based modeler or a special purpose implementation. Therefore, a purpose-oriented concrete model may be derived either manually—requiring explicit development, or automatically.

A purpose-oriented concrete model in another embodiment may interpret a data model component in the general data model as a general data model component and resolve the generalization suitable for its purpose. Unlike most conventional applications, such technique may enable the declarative application system to adapt a general data model for various purposes. For example, a data model component with a time data type may be interpreted as a general data model component and resolved by a processing concrete model to use a UTC time and a timezone. Use of such a processing concrete model enables using a behavior component implementation that uses global time based processing, an aspect not specified by the general data model.

A purpose-oriented concrete model may accommodate changes in the general data model in an embodiment. Some ways of accommodating such changes include altering a general data model component such that the resolution of the changed general data model component still offers similar concrete data model component; and adding, updating or removing general data model components that are not relevant to the concrete data model. Moreover, a purpose-oriented concrete model may change without affecting the general data model. Some ways of accommodating such changes include resolving a generalization in a different way; and adding, updating or removing concrete data model components for purpose-specific processing.

There may be modelers such as 104, 112, 118 and 501, and purpose-oriented item processors such as 107 in one embodiment. The processing within a purpose-oriented modeler or a purpose-oriented item processor may be guided by a purpose-oriented specification and they may use a special implementation.

Generalizations may be resolved statically or dynamically at runtime based on data represented by the application data items in one embodiment. A dynamic generalization resolution may offer a purpose-oriented concrete model which is much more expressive than using only static resolution. For example, for implementations that support polymorphism, a generalized target data type can be resolved at runtime based on the actual data type of the target application data item. Additional data model constraints defined for this actual target data type now become applicable instead of the constraints defined for a base target domain class. A purpose-oriented concrete model may also provide information on resolution of generalization(s) present in general data model 103, thereby enabling implementations to use this information to perform processing suitable for such resolution.

The purpose-oriented concrete model may represent purpose specific information necessary to perform processing for the purpose in one embodiment. Such purpose specific information comprises data modeling aspects in addition to the ones modeled by the general data model. Moreover, such purpose specific information may be the result of resolution of a generalization. For example, to address specific security requirements for sensitive messages, a domain class named message is adapted to carry information necessary to encrypt an instance of message with an appropriate security level. This purpose specific information may be obtained when necessary and used for purpose-oriented processing. This promotes separation of concerns for purpose-oriented processing without propagating these concerns to the general data model.

An implementation of a component in the system operates by using a specific purpose-oriented concrete model in one embodiment. Application data items 106 are interpreted by a purpose-oriented item processor such as 107 using a purpose-oriented concrete model such as 105 so that the implementation can operate on purpose-oriented data item such as 108. It may be necessary to propagate the changes in the purpose-oriented data items to application data items 106. Moreover, such changes may be required to be propagated immediately or progressively at specific times. The purpose-oriented data items such as 108 may be interpreted to application data items 106 using a purpose-oriented concrete model. Such interpretation may be provided by a purpose-oriented item processor such as 107. The purpose-oriented concrete model components of a purpose-oriented data item are interpreted to general data model components and any resolved generalizations in the purpose-oriented data item are interpreted to their generalized form in the corresponding application data item.

An application data item interpreted as a purpose-oriented data item for a purpose X may be interpreted as purpose-oriented data item for a purpose Y in another embodiment. If the purpose-oriented concrete models for purposes X and Y support a direct interpretation from purpose X to purpose Y, the purpose-oriented data items may be directly interpreted from purpose X to purpose Y. Otherwise, it is possible to interpret purpose-oriented data items for purpose X to an application data items 106 and then interpret application data items 106 to purpose-oriented data items for purpose Y. Purpose-oriented concrete models may support direct interpretation between each other when a direct mapping between their data model components exist. As is evident here, a common general data model—with purpose-oriented concrete models derived from this common general data model, offers a common basis to work on application data using many different purpose-oriented concrete models. Unlike conventional applications, this approach may allow using diverse implementation technologies to operate on application data without additional syntactic or semantic mapping of application data.

Unlike the conventional applications introduced in the background of this disclosure, in one embodiment, having the common general data model 103 and application data items 106 alongside with purpose-oriented concrete model and purpose-oriented data items may enable purpose-oriented processing that may not be performed without them. Such technique enables resolving generalization and performing purpose specific processing dynamically as applicable for specific application data items 106 and purpose-oriented data items.

Using a general data model 103 and a purpose-oriented concrete model derived from the general data model, in another embodiment, corresponds to an illustrative algorithm of following sequence of steps: obtaining the common general data model; obtaining one or more purpose-oriented concrete models for the common general data model 103; using the general data model components and their corresponding purpose-oriented concrete model components to interpret data for one or more application data items to, from or both their corresponding purpose-oriented data items. The general data model may be represented by the structure specification 101 or represented by another general model representation language. The embodiment described by FIG. 1 uses a common general data model 103 and various purpose-oriented concrete models such as 105, 113 and 119.

Deriving a purpose-oriented concrete model from structure specification 101, in one embodiment, corresponds to an illustrative algorithm of following sequence of steps: obtaining structure specification 101, identifying X data model components defined in structure specification 101 using constructs supported by the structure specification language; translating the X data model components to Y data model components necessary for the purpose and represented using constructs supported by the purpose-oriented concrete model representation language; resolving necessary generalizations and handling purpose specific information in Y data model components to conform its use for the purpose; forming a complete purpose-oriented concrete model using data model components Y. The step of translating the data model components and resolving generalizations may be performed together or interchanged. Moreover, when structure specification language is same as purpose-oriented concrete model representation language, the step of translating the X data model components to Y data model components may not be necessary as X data model components may be same as Y data model components.

When a general data model 103 is already available, such that the general data model representation language is substantially similar to the representation language of the purpose-oriented concrete model, deriving a purpose-oriented concrete model from general data model 103, in another embodiment, corresponds to an illustrative algorithm of following sequence of steps: obtaining general data model 103; identifying X data model components defined in general data model 103 using constructs supported by the general data model representation language; translating the X data model components to Y data model components necessary for the purpose and represented using constructs supported by the purpose-oriented concrete data model representation language; resolving necessary generalizations and handling purpose specific information in Y data model components to conform its use for the purpose; forming a complete purpose-oriented concrete model using data model components Y. The step of translating the data model components and resolving generalizations may be performed together or interchanged. Moreover, when general data model representation language is same as purpose-oriented concrete model representation language, the step of translating the X data model components to Y data model components is not necessary as X data model components are same as Y data model components.

The resolving of generalizations present in the general data model in one embodiment may be possible using various techniques. The possible generalizations depend on the data modeling language. Examples of some techniques to resolve these generalizations include using a purpose-oriented specification for a data modeling language that specifies how a generalization may be resolved, a syntactic, semantic or both reasoning using components of the general data model as applicable for the target purpose, using a custom implementation for the data modeling language. Such techniques may also be augmented to resolve generalizations specific to an application domain or an application. Other techniques may be used to resolve the generalizations. Similar techniques may also be used for handling purpose specific information.

It may be noted that there may be other possible ways to derive the purpose-oriented concrete models from structure specification 101 or general data model 103. It is possible to have an embodiment where a purpose-oriented concrete model is derived from general data model 103 and a general data model 103 can be derived from structure specification 101. It is also possible to have an embodiment where the purpose-oriented concrete model can be directly derived from structure specification 101. As mentioned earlier structure specification 101 represents general data model 103 and can therefore, unless stated otherwise, structure specification 101 may be used in lieu of general data model 103. Consequently, unless stated otherwise, deriving purpose-oriented concrete model from general data model 103 and deriving purpose-oriented concrete model from structure specification 101 may be considered equivalent and interchangeable.

Item processor 107 uses processing concrete model 105 to interpret application data items 106 as processable data item 108. In one embodiment, such interpreting an application data item using purpose-oriented concrete model corresponds to an illustrative algorithm of following sequence of steps: obtaining general data model 103 and purpose-oriented concrete model; identifying the general data model components and their applicable value(s) for application data item 106; identifying the concrete data model component(s) and their applicable value(s) that correspond to the general data model components and their applicable value(s); resolving any generalizations in the general data model components, handling purpose specific information and representing the resulting resolved concrete data model component(s) with applicable value(s); representing the resulting concrete data model components and their applicable values as a purpose-oriented data item. The step of identifying the concrete data model components and resolving generalizations may be performed together or interchanged. Moreover, general data model 103 may be replaced by structure specification 101 if such interpretation is supported for the structure specification language.

The purpose-oriented concrete models and item processor 107 may be derived from structure specification 101 or general data model 103 in another embodiment using additional techniques that do not necessarily depend on resolving generalization. Such additional techniques meet specific requirements for the purpose or technology that uses the concrete model. For example, a technique used to derive an access concrete model from general data model involve consulting an access-control specification and ignoring data model components to which access is prohibited to any external entity. This technique eliminates any possibility of divulging the prohibited information.

General data model 103 is a representation of the application's underlying data model that may represent all application data items. Purpose-oriented concrete models use general data model 103 and adapt it as necessary for a specific purpose. In one embodiment, an implementation may use one or more implementation technologies. An implementation technology may impose additional constraints on the data model. For example, an implementation technology may not be able to work with a specific generalization and it is necessary to resolve this generalization to derive a concrete model for this purpose. On the other hand, it may not be necessary to represent some constraints for certain purposes or implementation technologies. For example, certain constraints cannot be violated because the purpose does not involve operations that could violate such constraints. Concrete model for the purpose adapts general data model 103 as necessary to implement the purpose. Therefore, one or more concrete models may be derived from general data model 103 for same purpose as needed by the underlying implementation technologies. Moreover, any portion of the general data model may be manipulated, enhanced, substituted or eliminated while deriving the purpose-oriented concrete models.

For certain cases, it may suffice to ensure that a purpose-oriented concrete model is derivable from the general data model. Moreover, general data model 103 or any purpose-oriented concrete model may be obtained, wholly or partly, from a local or a remote component of the system.

It may be appreciated by those skilled in the art that a developer may manually specify some parts or the entire purpose-oriented concrete model. This is a significant advantage as it enables injecting knowledge into the system as necessary and obtains a fine-tuned data model when necessary to fit specific requirements. This enables the declarative application system cope with diverse requirements without significant effort.

Processing using a purpose-oriented concrete model in one embodiment may be performed by an implementation that directly uses the purpose-oriented concrete model without any intermediate interpreters. In another embodiment, processing using a purpose-oriented concrete model may be performed by an implementation that uses the purpose-oriented concrete model with one or more intermediate interpreters.

It may be necessary to ensure that data model components across implementations are equivalent in one embodiment. For example, consider an action primitive implementation selected to perform processing for an action primitive in the behavior specification. It may be necessary to ensure that the implementation uses a data model suitable for processing the matched action primitive. Consider one or more purpose-oriented concrete models that represent application data items using data structures offered by implementation language(s) that lends itself to efficient processing for the purpose. Consider an implementation technology that allows dynamic loading of modules that use concrete class implementations for domain classes. Consider a module that uses a single concrete class C to represent information about a domain class. Consider another module that uses concrete class C' to represent information about the same domain class. Although C and C' are capable of representing information about same domain class, the modules cannot be used together or substituted for each other unless there is a way to establish class equivalence.

Now consider a general data model 103 representing the domain class as D in this embodiment. The two modules implementations can now operate on a common domain class D not on implementation classes C and C'. Each module implementation may choose to use a different purpose concrete model internally to operate on the application data items—one representing general domain class D as implementation class C and another representing general domain class D as implementation class C'. Since both implementations operate on same general domain class D, it is now possible to use the implementations together or interchanged. In such an embodiment, class equivalence may be supported beyond the capabilities of the implementation technology, thereby making it possible to implement systems based on general data model 103 and inter-work implementation modules that are implemented using a specific concrete data model.

General data model 103 and purpose-oriented concrete models may be represented, if necessary, using a data modeling language. It is possible to interpret a structure specification representing a general data model 103 and derive the purpose-oriented concrete models in many different ways of which some are disclosed here. An implementation may use a purpose-oriented concrete model using constructs of the high level programming language used by that implementation. However, processing using a purpose-oriented concrete model may be performed by an implementation that obtains and interprets the purpose-oriented concrete model in an alternative representation.

General data model 103 in one embodiment is never saved but always derived from structure specification 101 when necessary. In such an embodiment, the derived general data model 103 may be temporarily cached. In another embodiment, one or more purpose-oriented concrete models, or artifacts used by an implementation, are saved or derived when necessary from general data model 103. Such an embodiment may temporarily cache the derived purpose-oriented concrete models or artifacts that use the purpose-oriented concrete models. In another embodiment, interpreting a structure specification representing a general data model involves general data model 103 being stored wholly or partially and being derived using the saved information in conjunction with structure specification 101 as necessary. In another embodiment, one or more purpose-oriented concrete models may be stored wholly or partially. The purpose-oriented concrete models in this embodiment are derived using the saved information in conjunction with general data model 103 as necessary. For example, a designer may provide a deviation specification that defines how the actual concrete model deviates from the automatically derived purpose-oriented concrete model. The deviation specification is saved by the system and the specified deviations are applied on top of the automatically derived purpose-oriented concrete models.

It may be appreciated by those skilled in the art that general data model 103 or purpose-oriented concrete models need not be explicitly saved or explicitly represented in one or more artifacts. In one embodiment, the information pertinent to the purpose-oriented concrete model is directly used to develop an implementation. For example, appraised-value attribute of a real-estate domain class having numeric data type may be interpreted as an integer data type in a processing concrete model 105. An implementation of an expression in this embodiment type-casts the appraised-value attribute as an integer value. In this example, processing concrete model 105 is never stored anywhere as an artifact that gets interpreted during application processing. Instead, the processing of application data item is performed using processing concrete model 105 and embedding the effect of such processing in the expression. Such an implementation may be developed by a developer or generated automatically.

Various purpose-oriented concrete models may be derived from general data model 103 by resolving generalizations. However, not all generalizations need to be resolved for all purposes. For example, when an implementation that implements a purpose is tolerant of certain generalizations, there is no need to resolve such generalizations. An implementation that supports polymorphism can select the correct method based on the actual data type of the data item. Therefore, there is no need to resolve the actual data type. This technique ensures that additional data model constraints introduced as a result of implementation constraints are kept to a minimum. A purpose that does not involve certain data model components has no need to address or resolve the generalizations defined for such data model components.

Various components of FIG. 1 are implemented to meet reasonable processing and performance goals. In one embodiment, the declarative application system described in FIG. 1 provides the ability to fine tune certain aspects of application processing. Moreover, various components offer controls that enable fine tuning system behavior and performance. A purpose-oriented specification tunes the implementation to meet requirements for a specific purpose. One or more such specifications may be defined to meet specific application requirements or system requirements. Consider an employee management application, where behavior runner 111 runs a render data item activity that renders information about an employee data item using an HTML view. A view specification can be defined for the sole purpose of customizing and controlling the HTML view for employee data items. The render data item action primitive implementation, that renders the HTML view, interprets this view specification and renders the employee information as defined by this view specification.

Figure 4:
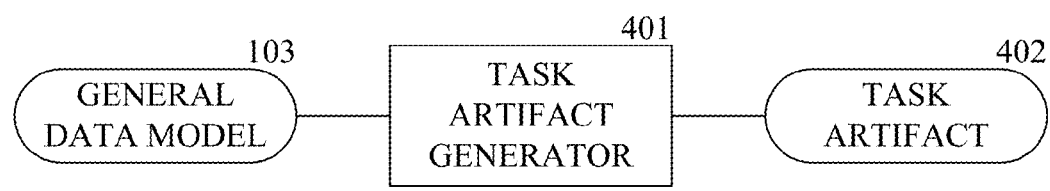
FIG. 4 illustrates block diagram for generating task artifact, where all rectangular boxes may refer to data items 106, purpose-oriented data items, purpose-oriented specifications, other specifications and data models as required by their implementation.

All the components in FIG. 1, FIG. 4 and FIG. 5 represented as rectangular boxes may accept such purpose-oriented specification in this embodiment. The purpose-oriented specification defines requirements specific to the purpose represented by the component in the declarative application system. Moreover, the action primitive implementations used by behavior runner 111 may accept one or more purpose-oriented specifications that define additional requirements for that activity. Such purpose-oriented specifications may be specific to one or more applications or may apply to the entire declarative application system. The purpose-oriented specification is interpreted and used by a processing implementation to adapt the processing in accordance to such specification. Alternatively, a custom implementation may be used to customize such processing. An external service may also be used to perform such purpose-oriented custom processing.

It may be noted by those skilled in art that purpose-oriented specifications enable precise customization and control of a declarative application system. The focus of structure and behavior specifications remains on defining the data model and behavior respectively without being overloaded with other concerns.

Figure 2:
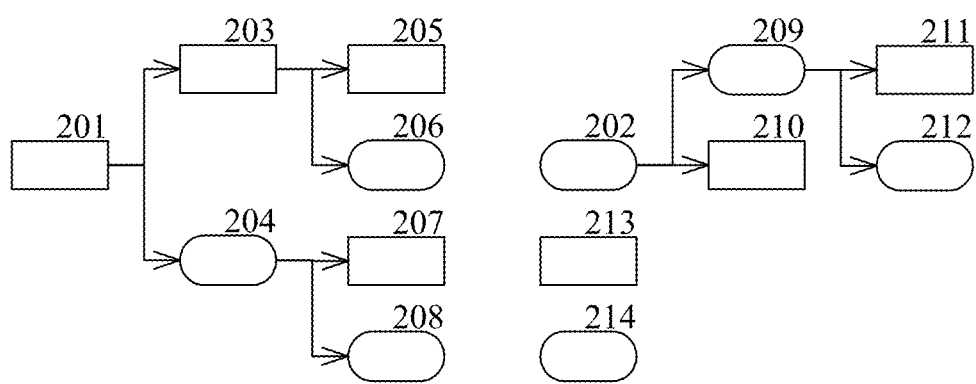
FIG. 2 illustrates an example of general data model organization.

Refer now to FIG. 2, which illustrates an example of general data model 103 used in one embodiment. It highlights some ways in which the precise and general data model components can be mixed to define general data model 103. A structure specification 101, which represents such an example general data model, may be used by this embodiment. It may be noted that the data model described here is one of the many possible data models that may be used by this embodiment.

The data model comprises data model components. Consider each such data model component representing a class of artifacts in application's target domain in this embodiment. A square block represents a precise data model component where every data modeling aspect is ascertained. A block with rounded corners represents a general data model component with one or more generalizations where data modeling aspects cannot be ascertained. The structure specification language typically offers constructs to represent the data modeling aspects. A directed path between two data-components indicates an association between these data-components. The data-component at which the path starts is an association-source. The data-component at which the path ends is an association-target.

It is possible to define precise data model components 201, 203, 205, 207, 213, 210, 211 that coexist with general data model components 204, 206, 208, 202, 214, 209, 212. Both precise and general data model components can be independent: 205, 207, 213, 211 and 206, 208, 214, 212. There can be an association between precise data model components: 201-203, 203-205. There can be an association between general data model components: 204-208. There can be an association between a precise data model component and a general data model component: 201-204, 203-206. There can be an association between a general data model component and a precise data model component: 204-207, 202-210, 209-211. The data model component may be a standalone precise data model component 213, a standalone general data model component 214 or a data model component that participates in one or more associations with other data model components.

It is also possible to have general data model 103, where a data model component may be associated with any other data model component, including itself. Same data model component may participate in any number of associations. A data model component may be an association-source or association-target for any number of associations.

Figure 3:
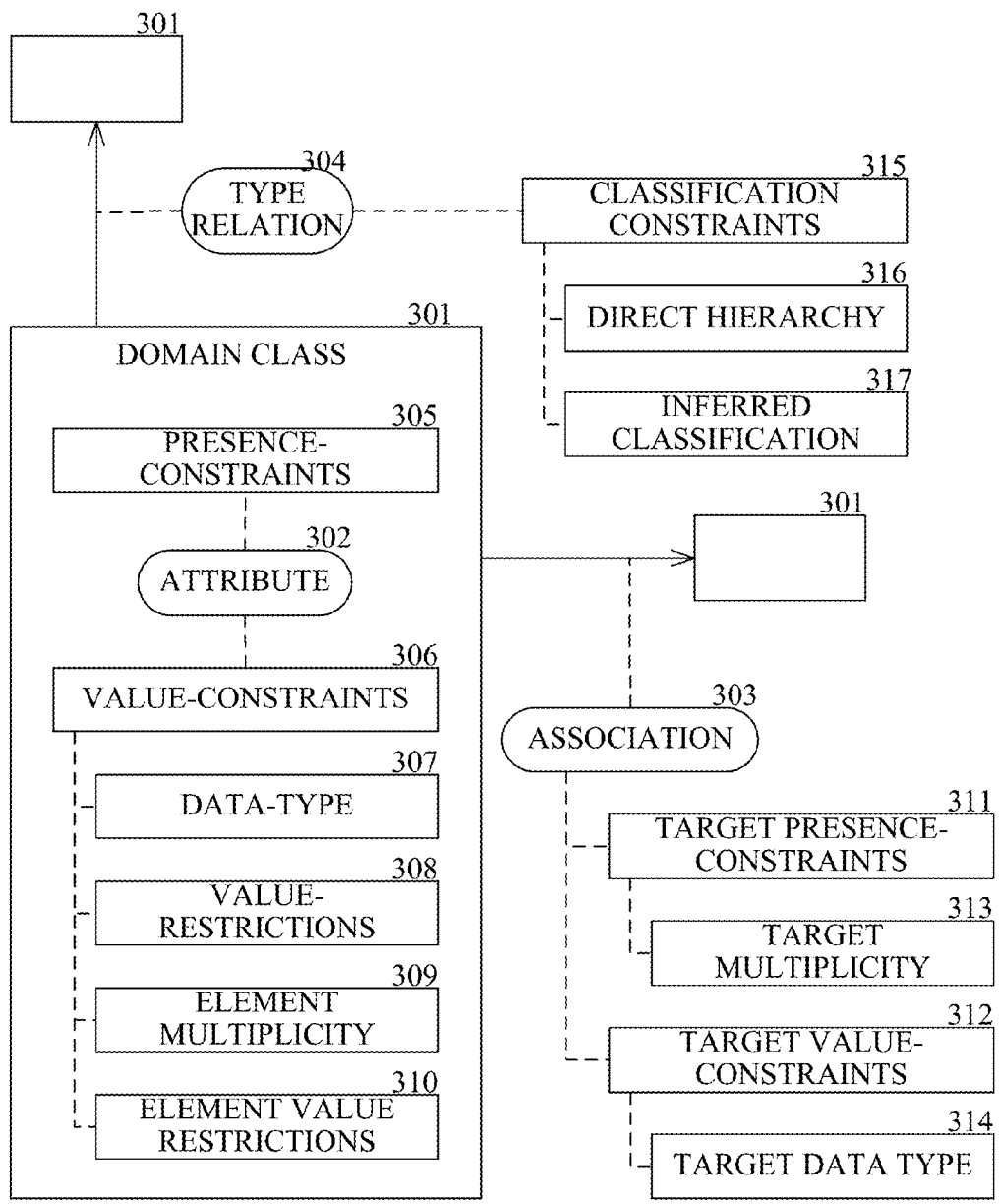
FIG. 3 illustrates components of a explanatory structure specification.

Refer now to FIG. 3, which illustrates components of an explanatory structure specification that can be used by an embodiment. It may be noted that the structure specification and the general data model represented by the structure specification discussed for this embodiment is an example of a structure specification and a general data model supported by the declarative application system. The explanatory structure specification disclosed here and the general data model it represents does not in any way limit the structure specification, data model or scope of this disclosure. The structure specification illustrated in FIG. 3 comprises one or more domain class specification 301. A domain class in this embodiment represents a class of artifacts that share common characteristics and has similar relationships. A characteristic of this domain class is represented by attribute specification 302. A relationship between instances of domain classes is represented by association specification 303. The data model specification language may support relations between domain classes. A relation between domain classes may be represented as a type relation specification 304.

Domain class specification 301 may comprise zero or more attribute specifications 302 in this embodiment. Each attribute specification 302 may further represent additional constraints such as presence constraints 305 and value constraints 306.

There may be zero or more presence constraints 305 for a specific attribute specification 302. Presence constraints 305 describe constraints that specify when the attribute is present in the domain class. Examples of presence constraints 305 supported by some data model specification languages include always present, present only when a specific attribute is present, present only when a specific association is present, present conditionally with the condition defined using attributes, associations or both from own or related domain classes.

There may be zero or more value constraints 306 for a specific attribute specification 302. Value constraints 306 restrict the value of an attribute. The type of value constraints 306, which can be defined for an attribute specification 302, depends on the data model specification language. Some examples of value constraints are discussed here. Data type constraint 307 constraints the data type of a value that can be assigned to the constrained attribute. Value restriction 308 restricts the range of values that can be assigned to the constrained attribute. For example, a US Social Security number is represented using 9 digits. Interpretation of value of an attribute may depend on value of another attribute. For example, a weight property requires a unit of weight measurement in addition to a numeric value. The unit of measurement may be provided as an additional attribute of the class or implicitly embedded in the semantics of the attribute definition.

An attribute may be single valued or may bear values that have one or more elements. For example, a person's age in years is represented by a single integer whereas daily maximum temperature in a month can be represented as an array of integers. A constraint on element multiplicity 309 restricts the number of elements that can be present in the value of the constrained attribute. Also, constraint on element value 310 restricts the range of values that can be present in a specific single element of the constrained attribute.

A domain resource is an instance of a domain class. An association specification 303, in this embodiment, defines how a domain resource relates to other domain resources. The association relations are directional—a source domain resource is related to a target domain resource. Association constraints are specified for domain classes and become applicable to all domain resources that belong to these classes. Each association specification 303 may contain association constraints such as target presence constraints 311 and target value constraints 312. The type of association constraints that can be used to describe an association specification 303 depends on the data model specification language.

Target presence constraint 311 defines constraints on presence of target domain resources for a source domain resource. Target multiplicity constraint 313 defines the number of target domain resources that can be related to the source domain resource, via this association.

Target value constraint 312 defines constraints on type of domain resource, values of such domain resources or both, to be related to the source domain resource. Target data type constraint 314 restricts the data type of target domain resources that can be related to the source domain resource, via this association. Moreover, constraints on target domain resource may also be defined using conditions on its attributes, associations or both. The constraint condition definition may be based on attributes and associations for source domain resource, target domain resource or any resources that are directly or indirectly related to such domain resources.

Type relation specification 304 represents relations between domain classes. The nature of type relations between domain classes 301 depends on the data model specification language. Typical type relations are constrained by classification constraints 315. Direct hierarchy constraints describe a is-a relation between domain classes, whereby one domain class is also an instance of other domain class, with at least all characteristics as the other domain class. Moreover, a is-a relation is transitive. Such is-a relation across domain classes result in a domain class hierarchy. The hierarchy structure of domain classes is defined directly in the specification using data model specification language specific constructs. For example, a laptop is-a computer. The laptop inherits attributes and association specifications describing the computer. Computer is-a electronic device and laptop is-a computer. Therefore, laptop inherits attributes and association specifications of both, electronic device as well as computer.

Inferred classification constraints 317 infer class relationships dynamically. Such classification inference may be based on additional domain knowledge. Moreover, assignment of domain class(es) to the domain resources may also be dynamic. In another embodiment, a class could itself be a resource. This enables reification of domain class, whereby the attribute, association and constraint specifications can be added, removed or updated dynamically for a domain class.

A general data model can be represented by the explanatory structure specification illustrated in FIG. 3. Structure specification 101 can represent general data model 103 that includes one or more generalizations. General data model 103 is a data model that uses a generalization where a data modeling aspect cannot be ascertained. Depending on the structure specification language, there may be different types of generalization.

A generalization for a data modeling aspect of a data model component is representative of semantics of the data modeling aspect as applicable for the data model component in an embodiment. Resolution of the generalization for a purpose may be based on a semantic interpretation of the data modeling aspect of the data model component as required for the purpose. A general data model component is a data model component with one or more generalizations. The general data model component may be represented using a generalization representative of semantics of a data modeling aspect of the general data model component when all data modeling details of the data modeling aspect cannot be ascertained. Use of semantics to represent the data modeling aspect that may not be ascertained enables representing the data modeling aspect in accordance to the semantics, without unduly constraining the general data model component. For a precise data model component, all details of data modeling aspects for the precise data model component are ascertained and therefore, a precise data model component may not need such generalization.

The semantic interpretation in this embodiment may enable resolving a generalization on a data modeling aspect of the general data model component, resulting in a concrete data model component for the purpose that is semantically derivable from the general data model component. A concrete data model component representation may comprise a representation of a data modeling aspect in the general data model component based on a semantic interpretation of the data modeling aspect in the general data model component and may not directly relate to the data modeling aspect represented in the general data model component without such semantic interpretation. Such semantic interpretation in this embodiment may be performed using various techniques such as syntactic component mapping, semantic component mapping, domain specific interpretation, semantic reasoning, special purpose interpretation and combination of such techniques.

To further illustrate the concept of generalization, consider an embodiment with an explanatory structure specification 101, representing a real-estate property domain class 301. The real-estate property has an attribute 302 representing appraised-value of the real-estate property. Based on prior knowledge about value of monetary instruments or an analysis of sample application data items, it becomes apparent that the appraised-value attribute 302 requires a data type constraint 307 describing it as a numeric value. The structure specification language of this structure specification 101 allows numeric values to be represented as numeric value, decimal value, float value or integer value. A small set of sample application data items may indicate that the appraised-value attribute may have an integer data type. However in absence of any other constraints guiding the design, it is desirable to generalize the data type of appraised-value attribute to numeric data type—not integer data type, as numeric data type is a general data type that can represent values that are represented using these other types.

General data model 103 represented in this embodiment by structure specification 101 of real-estate property domain class 301 has appraised value attribute 302 of numeric data type. Consequently, if during the lifetime of this application, an application data item with integer appraised-value is encountered, it is interpreted as a numeric data type. A decision to represent appraised-value attribute 302 with integer data type shall severely limit the possible values that this attribute can assume for the general data model. Moreover, there is no additional constraint or domain knowledge precedence that ascertains that appraised-value attribute 302 may be required to be constrained as integer data type. A future domain constraint may provide further guidance in restricting this data type. While defining structure specification 101, it is desirable that a general data model component is used when an aspect of this data model component cannot be ascertained, thereby preventing constraints that may not be ascertained.

Consider another example of resolving generalization involving semantic interpretation. The value of an attribute or a target domain resource of an association represented in the general data model may be resolved into a domain resource of a data type that is a semantic interpretation of a data modeling aspect of the general data model information such that it is appropriate for the purpose represented by the purpose-oriented concrete model. Thus instead of a numeric attribute data type, an access concrete model of this embodiment may represent the appraised value attribute for the real-estate property as an association with a target domain class. The target domain class represents information such as the value, currency, conversion rate used for the currency and time the conversion rate was obtained. The generalization of local currency based appraised value is resolved using semantic interpretation to allow a global use of this value as intended in the access concrete model. Domain knowledge may also be applied to semantically interpret that the appraised value may also include a conditional update in property value if current liens are released. Additional information specific to conditional update in property value may also be modeled in the target domain class.

Consider another embodiment that illustrates target data type constraint 314 based generalization for a sample e-commerce application. An order domain class 301 has a payment relation 303 to a transaction domain class 301. The target domain class 301 could be one of credit-card transaction, cash transaction or check transaction domain classes 301. However, it cannot be ascertained which transaction domain class 301 is appropriate for any instance of order domain class 301 in this application. The allowed transaction types may depend on application user and business policies of the application. In such cases, it becomes necessary to represent the target data item using a general transaction domain class 301 that has an is-a type relation 304 with more specific transaction domain classes 301. Although a general transaction domain class 301 cannot describe all possible attributes and associations for all possible transactions, it is sufficient to constrain that the actual transaction data item is-a general transaction domain class 301.

In the explanatory structure specification 101 of this embodiment illustrated in FIG. 3, generalizations are possible using techniques such as avoiding specifying constraints or relaxing the information being constrained when such constraint cannot be ascertained. Type of generalizations may depend on the data modeling language. Some generalizations for a general data model represented using explanatory structure specification components of FIG. 3 are described here.

Generalizations related to attribute specification 302 in this embodiment include: a generalization on data type of an attribute such as using a more general data type in a data type constraint 307 instead of a precise data type; a generalization on attribute value constraint such as allowing a larger range of values than expected for a value restriction constraint 308, allowing a larger range of values than currently expected for an element value restriction constraint 310, not specifying a value restriction constraint 308, not specifying an element value restriction 310, substituting a required value by another value that represents a bigger set of domain resources for a value restrictions 308 and substituting a required value by another value that represents a bigger set of domain resources for a element value restrictions 310; a generalization on attribute presence constraint such as not specifying a presence constraint, ignoring the condition and loosening the definition of condition when presence constraint is conditional; a generalization on element multiplicity when attribute may have multiple elements such as allowing a larger range for multiplicity than currently expected in an element multiplicity constraint 309 and ignoring an element multiplicity constraint 309; a generalization on attribute being part of domain class such as not including the attribute in domain class, ignoring the condition and loosening the definition of condition when attribute is included conditionally in domain class.

Generalizations related to association specification 303 in this embodiment include: a generalization on data type of an association target such as ignoring a target data type constraint 314 and using a general data type in a target data type constraint 314 instead of a precise data type; a generalization on presence constraint such as ignoring target presence constraints 311; a generalization on target multiplicity constraint such as using larger range than currently expected for target multiplicity constraint 313 and ignoring a target multiplicity constraint 313; a generalization on target value constraint such as ignoring a target value constraint 312, substituting a required value by another value that represents a bigger set of domain resources for a target value constraints 312 and loosening the definition of condition when target value constraint 312 is conditional; a generalization on presence of association for the domain class such as association always allowing the domain class as association source or association target, ignoring the condition or loosening the definition of condition when association conditionally allows the domain class to be association source or association target.

One or more components of general data model 103 such as attribute, association or their constraints can be added or updated dynamically in one embodiment. In such a general data model 103, absence of such a component is also a generalization. In another embodiment, one or more components of general data model 103 are specified along with a mechanism to determine the degree of probability with which such components shall exist in a domain resource, making the generalization probabilistic. Resolution of such generalization may cause domain resource to participate in additional domain class, thereby resulting in a type relation generalization.

Refer now to FIG. 4 which illustrates a block diagram for generating a task artifact 402 using general data model 103. A task artifact 402 specifies how to perform a task based on general data model 103 in the declarative application system. Task artifact 402 is derived from general data model 103. In one embodiment, such a task artifact may be used as purpose-oriented specification by various components of the declarative application system. Task artifact generator 401 uses general data model 103, represented by structure specification 101, defined in FIG. 1 to generate task artifact 402 for a specific purpose. Task artifact generator 401 is a special purpose implementation meant for generating task artifact 402 using general data model 103.

Consider an embodiment where an activity renders information represented by application data items to a user using an HTML based view. Such a view is generated by using a view-specification that is based on a domain class represented in general data model 103. View-specification is task artifact 402. A view-specification generator is task artifact generator 401. View-specification generator 401 generates a view-specification 402 that can be used to generate a view that renders information for an application data item 106. View-specification generator 401 generates view-specification 402 automatically or interactively in consultation with a view designer so that the data model components and generalizations in general data model 103 are rendered appropriately.

It is possible to generate an artifact that aids an application processing operation in another embodiment, using structure specification 101 and a purpose-oriented declarative specification. The generation of such an artifact corresponds to an illustrative algorithm of following sequence of steps: obtaining a purpose-oriented declarative specification for generating the artifact; identifying the general data model components relevant to the application operation using the declarative specification; generating artifact components using the relevant general data model components and the purpose-oriented declarative specification; representing the generated artifact components using constructs supported by the artifact specification language. Task artifact generator 401 in this embodiment generates such an artifact.

Refer now to FIG. 5 which illustrates a block diagram for transferring application data items 106. It is possible to conduct a transfer operation on one or more transfer items, whereby a transfer item is an application data item 106, other application data or both. The other application data is data other than specified application data items 106 and comprises data specific to the application such as application milestones and data critical to manage various aspects of application processing. It is possible to transfer the transfer items outside the declarative application system. This capability is henceforth termed as exporting application data. It is possible to transfer the transfer items into the declarative application system. This capability is henceforth termed as importing application data. In one embodiment, it is possible to export and import application data. In another embodiment, it is possible to only export application data. In another embodiment, it is possible to only import application data. In another embodiment, it is not possible to export or import application data.

Transfer modeler 501 derives transfer concrete model 502 from general data model 103 in one embodiment. Transfer concrete model 502 provides information essential for transferring application data items 106. Demarcate items 503 identifies the transfer items that are demarcated to participate in the transfer operation.

The demarcation of transfer items in another embodiment is performed by identifying the application data items, other application data and any application data items related to these application data items and other application data. Application data items may be related to other application data items, and can be conceptually visualized as a graph of interconnected data items. Although it may be possible to transfer the entire graph of application data items, it may be noted by those skilled in the art that such a transfer may not always be practical. Therefore, in may be necessary to have a mechanism to limit the related application data items for the transfer operation by effectively specifying relevant portions of the graph. In an embodiment that uses a structure specification such as the one illustrated in FIG. 3, demarcate items 503 may use a mechanism based on constraints expressed using application data item attributes and associations.

Application milestones are demarcated in another embodiment based on milestone specific information that describes the application status, application operations or both for which application milestones are sought. For example, transfer all milestones that involve successfully receiving payment from a customer during the current year.

Demarcating a transfer item, in another embodiment, corresponds to an illustrative algorithm of following sequence of steps: specifying demarcation criteria that represents one or more application data items, other application data or both; determining the application data items and other application data that matches the demarcation criteria specified. Demarcate items 503 in this embodiment demarcates the transfer items.

Exporter 504 extracts the transfer items demarcated by demarcate items 503 in an embodiment. These extracted transfer items may then undergo optional processing such as encoding and made available as transit items 506 as described by transfer concrete model 502. The export processing may include sending the extracted data to one or more receiving systems. It may be noted that the receiving system and sending system may be the same system in which case, the extracted data is consumed locally.

Extracting the demarcated data, in another embodiment, corresponds to an illustrative algorithm of following sequence of steps: obtaining data for the demarcated transfer items; interpreting the demarcated application data items and application data items in other application data using the transfer concrete model; processing the data for these interpreted application data items as necessary to make it available as transit items 506. Exporter 504 in this embodiment extracts the demarcated data.

The extracted data may be transferred to a receiving system in another embodiment. Sending the demarcated data to a receiving system corresponds to an illustrative algorithm of following sequence of steps: Obtaining transfer items to be sent; preparing a data transfer mechanism to send the demarcated data to the receiving system if necessary; sending the demarcated data using the data transfer mechanism. Exporter 504 in this embodiment sends the demarcated data to the receiving system(s).

In an embodiment of a declarative application system that is capable of importing application data, the data to be imported is received as transit items 506. It is possible to conduct an import transfer operation on one or more incoming transfer items, whereby an incoming transfer item represents an application data item 106, other application data or both. Importer 505 imports transit items 506 as incoming transfer items and uses transfer concrete model 502 to interpret the received data. The received data may undergo optional processing such as decoding. Importer 505 correlates and merges the received application data items and other application data with corresponding artifacts at the receiving system.

The received data in one embodiment is correlated using application data item identities and identities used to represent other application data. An identity mapping mechanism may be used between sending and receiving system. In another embodiment, a correlation mechanism based on value of information elements in the received data is used to correlate the incoming data with the artifacts at the receiving system. In another embodiment, a special correlation mechanism assisted by the data transfer mechanism is used to correlate received data to the artifacts at the receiving system.

The merging at receiving system may be conditional and may further be constrained by the user using demarcate item 503 or by the system to meet the purpose for which the merging is being attempted. In an embodiment that uses a structure specification such as the one illustrated in FIG. 3, the merged data items include merged attributes and associations, and can be conceptually interpreted as merging the incoming data graph onto the graph at the receiving system. Moreover, such merging may involve semantic analysis of the data model components, an analysis of the data being merged or both. Such semantic analysis may further be assisted by a purpose-oriented specification.

Receiving an incoming transfer data item, in another embodiment, corresponds to an illustrative algorithm of following sequence of steps: using a data transfer mechanism that enables receiving incoming transfer items; receiving the incoming transfer data items using the data transfer mechanism. Importer 505 in this embodiment receives incoming transfer items. In another embodiment, it is possible to optionally filter a subset of incoming transfer data items as part of receiving the incoming transfer data item. Such filtering may be performed assisted by a user or automatically based on criteria suitable for the purpose the data is imported.

Importing and merging the incoming transfer items, in another embodiment, corresponds to an illustrative algorithm of following sequence of steps: identifying set M as the application data items and other application data at receiving system that corresponds to the received application data items and other application data represented by the incoming transfer items; identifying set I as application data items and other application data that is not a member of set M and that may be added as new data at the receiving system; importing members of set I by adding them as new data at the receiving system; merging members of set M with their corresponding existing application data items and other application data at the receiving system. The steps of identifying the sets M and I may be interchanged or combined. The steps of importing and merging may also be interchanged or combined. Importer 505 in this embodiment imports and merges the incoming transfer items.

In another embodiment, the exporting system is any system, including declarative application system and non-declarative application system that has the ability to represent application data items using a transfer concrete model, thereby providing demarcated data to the receiving system. Moreover, the import and export of transfer data items may occur while one or both the exporting and importing systems is processing corresponding declarative application(s). In another embodiment, the receiving system receives incoming transfer item from a system that creates the incoming transfer items so as to affect the application processing at the receiving system by creating, updating, or deleting or any combination thereof the application data. Unlike most conventional applications, a transfer concrete model may enable the exporter and importer to adapt a general data model with a transfer specific aspect not specified by the general data model. The exporter and importer may alter the transfer concrete model provided it remains derivable from the general data model. In another embodiment, the exporter and importer may use special-purpose implementations that handle various types of generalizations suitable for transferring application data items.

It may be noted by those skilled in the art that the ability to export and import application data items and additional application data enhances the utility of declarative application system of this embodiment. Among the many uses of this ability, it is possible to selectively demarcate information for special processing and export it out of the system. Such exported data may be imported in other systems of this embodiment to offer application specific functions processed outside the exporting system. Such application specification function may be part of the declarative application or additional processing outside the declarative application functionality. Such processing may be attempted to meet technology or business constraints that are otherwise not attainable in a single system solution. Selective information may be merged back to the exporting system as necessary by switching the roles of exporting and receiving systems. In one embodiment, the exporting and importing of such information may be conducted in real-time alongside the main application processing, thereby allowing distributed application processing.

Figure 6:
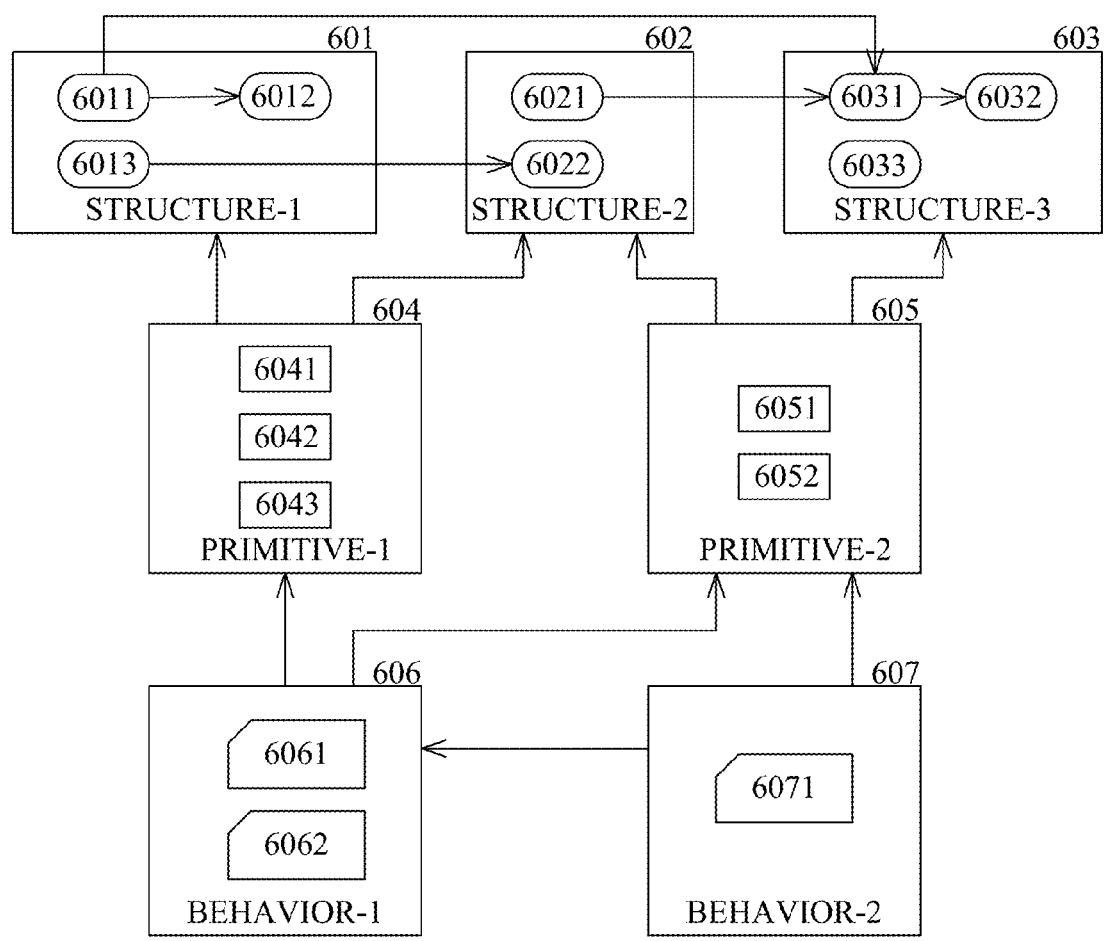
FIG. 6 illustrates an explanatory packaging of structure specification components, action primitives and behavior specification components.

Refer now to FIG. 6 which illustrates an explanatory packaging of structure specification components, action primitives and behavior specification components in an embodiment. Structure specification 101 and behavior specification 109 in FIG. 1 are vital declarative components that define an application. The explanatory packaging in FIG. 6 represents one possible representation of application structure specification 101 and behavior specification 109. Additional purpose-oriented specifications used by the application may also be packaged alongside their respective specifications. This explanatory packaging portrays a method to modularize structure specification 101 and behavior specification 109 in this embodiment. Such modularization of structure and behavior specifications promotes reuse of specification components within and across declarative applications. Moreover, it enables management of implementations that support handling these specification constructs, necessary for application processing.

The structure specification 101 in FIG. 1 comprises multiple structure packages such as 601, 602, and 603, each structure package representing a partial structure specification in this embodiment. Each structure package may specify one or more data model components. Each structure specification language provides various constructs to define a data model component. For example, in an embodiment that uses a structure specification such as the one illustrated in FIG. 3, a single domain class may be modeled as a data model component. A data model component X may depend on other data model component Y when X has at least one definition that would be incomplete without Y. The defining partial structure specification may define such dependency as a list of the other partial structure specifications on which it depends, and optionally the data model components on which the data model components in the defining partial structure specification depends. Alternatively, such dependency may be represented using construct(s) offered by the structure specification language.

Such modular structure specification promotes a structure specification organization that allows reuse of partial structure specifications and enables determining all the partial structure specifications required to use a specific partial structure specification. The structure packages in this embodiment are organized, such that data model components in a defining structure package may depend on data model components in the defining structure package, some other structure package or both provided it is possible to determine complete list of other structure packages on which the defining structure package depends. As a result, all data model components that are defined in a set of partial structure specifications may depend only on data model components defined in this set of partial structure specifications. Therefore, when any partial structure specification is used from this set, it is enough to ensure that all partial structure specifications in this set are accessible.

Data model component 6011 in structure package 601 depends on data model component 6012 and data model component 6031. This causes structure package 601 to depend on structure package 603. When an application uses structure package 601, it is necessary to ensure that structure package 603 is also accessible, and that data model component 6031 is available.

Dependency between data model components may be constrained in another embodiment such that any dependency across the data model components always result in a strictly ordered set of partial structure specifications. Such constraint on dependency between data model components may be used when structure specification language uses constructs that prevent a deterministic computation of partial structure specification dependencies.

Behavior specification 109 in FIG. 1 specifies activities that constitute a behavior. Such activities may be defined in a behavior specification using constructs supported by the behavior specification language. As discussed earlier, many behavior specification languages define a construct that is used to specify a predefined unit of work, referred as an action primitive. The action primitive represents unit of work that may be performed whereas the action primitive implementation performs the work. In one embodiment, one or more action primitives and optionally their corresponding action primitive implementations may be packaged together as a primitive package.

As illustrated in FIG. 6, primitive packages 604 and 605 contain action primitives and artifacts necessary to process these action primitives. A behavior specification 109 may describe an activity using action primitive such that it specifies action details using general data model 103. The action details may include a specification that specifies an application data item 106 that participates in the action and additional details describing the action using the general data model 103. In this representation, the data model components are organized to reside in specific structure package(s). The action primitive implementation that supports primitive package 604 also requires structure packages 601 and 602. Similarly, implementation that supports primitive package 605 also requires structure packages 602 and 603. When behavior specification 109 uses an action primitive 6041, it is necessary that action primitive package 604 that contains action primitive 6041, the action primitive implementation for 6041 and structure packages 601 and 602 on which action primitive package 604 depends, are accessible.

In an embodiment as illustrated in FIG. 19, an activity 1901 represents a unit of work and such unit of work is represented as an action primitive, with details specified using a general data model. It is possible to represent a large unit of work 1903 using small units of work like 1904 and 1905. Many behavior specification languages provide constructs for defining a large unit of work using small units of work. For example, BPMN provides support for defining a global process using BPMN primitives. This global process such as 1903 can then be invoked from another process that need to perform the large unit of work represented by the global process using an action primitive such as 1902.

A large unit of work in one embodiment is created using a behavior specification that uses other available primitives, henceforth called small units of work. A behavior primitive such as 1902 represents using this large unit of work, and can be used in same way as an action primitive to define an application's behavior specification. The behavior primitive such as 1902 is an action primitive that is implemented by executing the small units of work such as 1904 and 1905 as specified in the behavior specification of the behavior component such as 1903. The primitives available to the behavior specification for large unit of work include the action primitives and behavior primitives representing large units of work.

As illustrated in FIG. 6, such behavior primitives and their corresponding behavior component specifications are packaged into behavior packages 606 and 607 in another embodiment. The behavior packages depend directly on action and behavior primitives, that were used to specify the behavior and indirectly on the structure packages, used by their action primitive packages. Criteria for packaging the structure, action primitive and behavior component include modularization goal and package management.

Such large unit of work, henceforth represented as a behavior component, represents a reusable functionality in the application, or similar applications in the domain, and their invocation is represented by a behavior primitive.

Since the behavior specification uses a general data model, the details for using the behavior component are defined using the general data model. This enables a user to use this behavior component provided the user's concrete model is derivable from the general data model used by the behavior component. Unlike some conventional applications, the user may use the behavior component even when user's concrete model may not match syntactically but match based on generalizations in the general data model concrete model used to represent the behavior component.

Building a behavior component specified by a component behavior specification, wherein the component behavior specification uses one or more action primitives, in one embodiment, corresponds to an illustrative algorithm of following sequence of steps: obtaining a general data model that describes data model for a large unit of work; obtaining a component behavior specification that describes a large unit of work using the corresponding general data model and one or more action primitives. This builds a behavior component representing a large unit of work.

The behavior component is represented as an action primitive that causes the behavior specified by this behavior component to be processed in another embodiment. Representing the behavior component as such an action primitive corresponds to an illustrative algorithm of following sequence of steps: obtaining the behavior component; defining an action primitive that corresponds to this behavior component such that the action primitive specification describes details required to process the behavior component.

Representing an action primitive package, in one embodiment, corresponds to an illustrative algorithm of following sequence of steps: identifying action primitives that can be packaged together; identifying the action primitive implementation(s) that correspond to the action primitives; representing the action primitives and optionally their action primitive implementation in an action primitive package.

Representing a behavior package, in another embodiment, corresponds to an illustrative algorithm of following sequence of steps: identifying behavior components representing large unit of work that can be packaged together; representing the action primitive corresponding to the behavior components and optionally the behavior component specifications in a behavior package. In one embodiment, a behavior component implementation to process a behavior component, representing the large unit of work, loads the component behavior specification and processes the behavior specified in this component behavior specification in accordance to the rules of the behavior specification language and as part of the declaratively computer application.

Figure 18A:
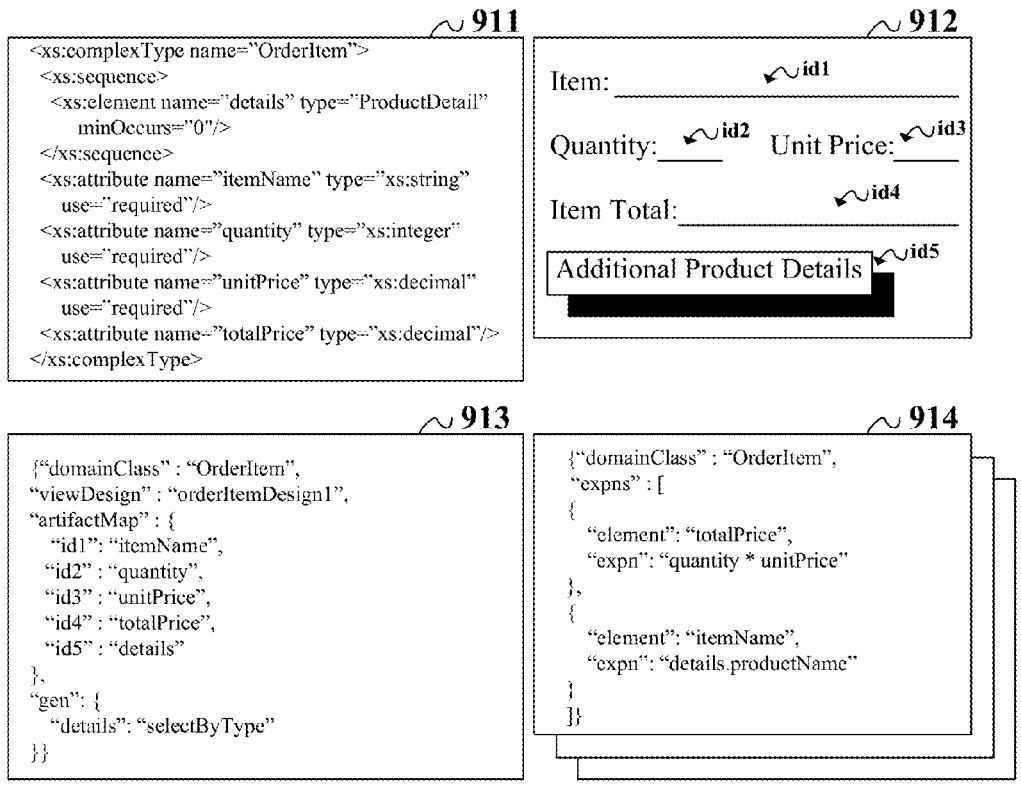
FIG. 18A illustrates explanatory artifacts pertinent to declarative generation of a view.
Figure 18B:
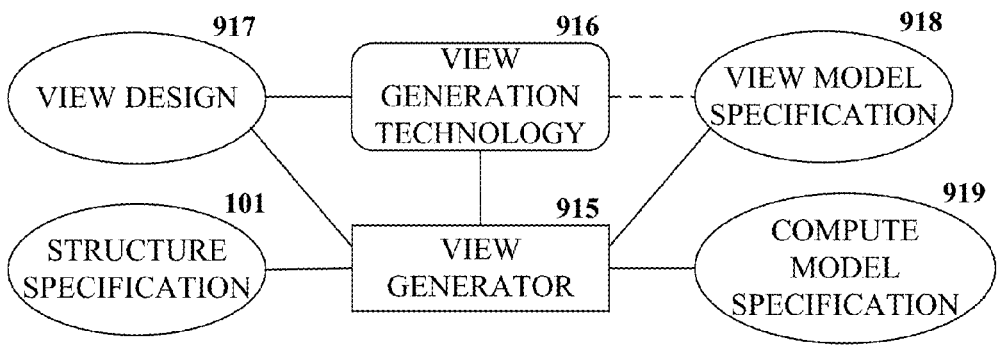
FIG. 18B illustrates block diagram for declarative generation of a view.

Refer now to FIG. 18B that illustrates block diagram of a declarative view generation for application data items 106. View generator 915 generates view for one or more application data items. In one embodiment, an action primitive implementation may use a declarative view generation to render information related to one or more application data items 106. In another embodiment, such a view enables a user to view information for application data items 106, whose data model is represented by general data model 103. In another embodiment, a user may interact using such a view to perform operations such as view, create, update or delete application data items 106, and its related information. Moreover, one or more such generated views may be navigated and rendered together. In yet another embodiment, interactive views representing related application data items 106 are managed such that updates in one view cause updates in related view(s), and may result in updating these application data items 106.

View design 917 provides information about various aspects of a view generation, suitable for generating a view for application data items, using a view generation technology. In one embodiment, the generated views may be rendered on various devices using suitable view rendering technology. It may become apparent to those skilled in the art that there are many possible view generation technologies that can be used, each generating a view as described by view design 917. A view design may be designed by a view designer who uses mechanisms supported by the view-generation technology to perform this view design. Moreover, such a view design may be designed manually, completely automatic or partly automatic, whereby the automatic designer mechanism uses the general data model represented by structure specification 101 to derive the view design that can be handled by the view-generation technology.

When view design 917 is designed completely by a designer or a previously saved view design is used, obtaining view design 917, in another embodiment, corresponds to an illustrative algorithm of following sequence of steps: obtaining a specification for a view design, henceforth referred as view design specification; interpreting the view design components as described by the view design specification constructs.

In another embodiment, when view design 917 is automatically generated using the general data model, obtaining view design 917, in another embodiment, corresponds to an illustrative algorithm of following sequence of steps: resolving any generalizations in the general data model for purpose of generating a view; identifying the general data model components relevant for generating a view design; generating view design components using the relevant general data model components; saving a representation of the generated view design components for subsequent use if necessary. It is also possible to assist the view design generation by a purpose-oriented specification that guides this view design generation. The steps of resolving generalizations and identifying general data model components may be interchanged or combined. The step of saving the view design representation is optional and it is possible to use a mechanism to generate, cache and manage the generated view design.

An HTML form and Javascript based view in one embodiment is represented using a view design that defines visual aspects of layout, label, content rendering and dynamic user interaction actions corresponding to the HTML form elements. In another embodiment, a view technology based on a template-engine, like Apache Velocity template engine, uses a template suitable for the template-engine. In yet another embodiment, the view design comprises an implementation that may generate some or all visual artifacts of a view, based on the general data model. Such an implementation may further be augmented by a purpose-oriented specification that fine tunes generation of the view. In another embodiment, it is possible to customize view design using a purpose-oriented specification; such customizations enable generating views for a specific view technology, for specific device or for specific group of devices.

View model specification 918 specifies a mechanism to provide data and controls in the generated view. This mechanism is based on a general data model component of the general data model enabling a mapping of data model components to view constructs in the generated view. View model specification 918 represents a view model which provides information about correlating the generated view's data and controls to the generated view artifacts. In one embodiment, view model specification 918 enables a view designer to specify presentation and controls using the general data model. In another embodiment, some or all parts of such view model specification may be conditional, thereby generating views dependent on a context of usage of generated view, such as view for a specific activity in a behavior specification.

The view designer specifies how a generalization in the general data model is handled in another embodiment. The type of generalization to be handled, and the handling method for a generalization, may also depend on the context of usage of generated view. Some examples of handling the generalization include customizing presentation attributes of view artifacts, populating view artifacts with additional data and controls that offer guidelines to resolve generalization or enables resolving the generalization or both. In one embodiment, a single view model specification 918 can be used to generate views that can be suitable for various view technologies. In another embodiment, a custom view model specification may be used to define customizations necessary to generate a custom view, such as a custom view for a specific view technology, for specific device or for specific group of devices. It may become apparent to those skilled in the art that the view model information may be obtained and organized in different ways.

When the view model specification is designed completely by a designer or a previously saved view model specification may be used, obtaining a view model specification 918, in another embodiment, corresponds to an illustrative algorithm of following sequence of steps: interpreting the view model components as described by the view model specification constructs.

When the view model is automatically generated using the general data model and a view design, obtaining a view model specification 918, in another embodiment, corresponds to an illustrative algorithm of following sequence of steps: resolving any generalizations in general data model for purpose of generating a view; identifying the general data model components relevant for generating a view model specification; identifying view design components relevant for generating a view model specification; generating view model components using the relevant general data model components and view design components; combining generated view model components to a view model representation. It is also possible to assist the generation of view model specification 918 by a declarative specification that guides this view model generation. It is possible to generate, cache and manage the generated view model specification in different ways.

The view model specification describes how data and controls related to application data items can be populated in generated view in another embodiment. View model specification's mechanism to provide data and controls in generated view corresponds to an illustrative algorithm of following sequence of steps: mapping a general data model component to a view design construct; mapping general data model components having generalization(s) to how generalization(s) may be resolved; obtaining data, controls or both applicable for the generated view and putting corresponding data and controls in the generated view.

View generator 915 uses view design 917, view model specification 918 and application data items in one embodiment to generate a view that is suitable for rendering information related to these application data items. View generator 915 uses an appropriate view generation technology 916 that generates a view for a target view rendering technology. In another embodiment, creating view for application data item using a view generation technology 916 corresponds to an illustrative algorithm of following sequence of steps: updating the view design constructs using view model as necessary for the application data item(s); using the view-generation technology to generate view using updated view design, view model and a representation of data in application data item(s); updating the generated view using view model to put data and controls not directly supported by the view-generation technology. The step of updating the view design may result in a view design same as the original view design. The step of updating the generated view is optional when view-generation technology 916 handles all aspects of view generation in this embodiment. Such a view is generated by view generator 915.

In addition to generating the view for a snapshot of information represented by an application data item in one embodiment, it is possible to use a compute-model specification 919 to provide an interactive view that can automatically populate and update information presented in the view based on information rendered in the view. Compute-model specification 919 provides information on how an element related to an application data item depends on elements related to same application data item or other application data items. Such an element that depends on other elements shall henceforth be called dependent element. The syntax of an expression and semantics of various operators and operands of expression that can be used in the compute-model specification 919 depends on the specification language(s) to be used for defining the compute-model specification.

View-generator 915 and view-rendering technology 916 in one embodiment enable modifying information presented in a view such that when a user changes information in a view, the effect of such change is propagated to the dependent elements that depend directly or indirectly on the changed information. In another embodiment, such changes may propagate across one or more views as it is possible to have dependent elements that depend on elements of related application data items, such application data items may be rendered using separate view(s) or part of a single view. These changes may further be temporarily or permanently assigned to the corresponding application data items.

The dependent element may not directly exist in the data model representation of the application data item but used in the view design of such application data item in another embodiment. For example, the total discount on all order items may not be in an order application data item but may be represented in a view design, view model, compute-model specification and generated view for order summary.

Providing a compute-model specification 919, in one embodiment, corresponds to an illustrative algorithm of following sequence of steps: obtaining the compute-model specification; identifying compute-model components. In another embodiment, detecting a need to compute dependent element corresponds to an illustrative algorithm of following sequence of steps: determining relevant application data items involved in computation; determining the dependent application data items that involve one or more dependent elements; determining elements on which the dependent elements depend; determining which dependent elements got updated due to a direct or indirect update in element(s) on which it depends.

Computing value for dependent element, in another embodiment, corresponds to an illustrative algorithm of following sequence of steps: identifying expressions that defines the dependent element or any element on which the dependent element directly or indirectly depends; computing dependent elements starting from least dependent to most dependent elements; assigning value of dependent element to a data model component of the application data item, if applicable.

Updating view with data and controls, in another embodiment, corresponds to an illustrative algorithm of following sequence of steps: identifying updates to the general data model components of updated application data item; identifying view data and control constructs affected by the update; updating view data and control constructs using updated data.

Presenting views and updating views as a result of updating information represented in at least one view, in another embodiment, corresponds to an illustrative algorithm of following sequence of steps: presenting views for related application items; obtaining information about updates to one or more views; computing updates for these application data items using compute-model specification(s); updating views as a result of updating application data items; presenting updated views.

The general data model may have generalizations that lead to more than one definition for computing a dependent element in a compute-model specification. Such generalizations may therefore lead to more than one possible alternative for computing a dependent element value. In one embodiment, such alternatives are represented as alternate sections of compute-model specification, each section becomes applicable depending on how generalizations get resolved or the context in which the view for application data item(s) gets used or both. For example, a target data type 314 based generalization may require a separate section of compute-model specification 919, one for each possible actual target data type. The actual data type of target item determines the actual section that is applicable.

Refer now to FIG. 18A that illustrates various artifacts of an embodiment, where declarative generation of a view is shown for an example domain class, the domain class being defined by a structure specification 101 such as the one illustrated in FIG. 3. Artifact 911 illustrates part of a structure specification 101, describing a domain class OrderItem, which represents a single item ordered by a customer in an e-commerce order management application. The OrderItem domain class has a details association that represents a generalization for target data type constraint 314. Consequently, an instance of OrderItem can be associated with many application data items, each such application data item belongs to a domain class that has an is-a relation with ProductDetail domain class.

Artifact 912 illustrates part of an example view designed to render an application data item that belongs to the OrderItem domain class. The view contains visual artifacts used for presenting application data item information to a user of the application. The view generation technology implementation in this embodiment uses a view design based on HTML form where a form input element is represented by a view design placeholder identifier like id1, id2, id3, id4 and id5 are similar view design placeholder identifiers.

Artifact 913 illustrates part of a view model specification. The view model specification in this embodiment defines a mechanism to provide data and controls in a generated view; the mechanism specifies a mapping between attributes and associations of OrderItem domain class and view design placeholder identifiers illustrated in artifact 912. For example, the value represented by quantity attribute in an application data item, whose domain class is OrderItem, shall be populated as value of HTML input element with id2 HTML identifier. Moreover, it is necessary to resolve the details generalization by adding a selectByType control in the generated view. Such a control enables the user to select and operate on the target application data items of this association, based on the actual target data type.

Artifact 914 illustrates part of a compute-model specification that is used by an embodiment to provide an interactive view for application data items that belong to the example OrderItem domain class. This compute-model specification can be used to automatically populate and update information in views for application data items that belong to OrderItem domain class. The HTML form element identified by id4 in 912 is populated with a value that is automatically computed by using the expression defined for totalPrice in 914, the totalPrice being mapped to id4 in 913. Moreover, any changes in values associated with form elements id2 or id3 may result in updating value in form element id4. Such updates may cause the corresponding attributes to be updated in the application data item whose view was presented to the user. This compute-model specification has more than one section, illustrated as multiple rectangles in 914, due to the target data type constraint 314 generalization for details association.

Figure 7A:
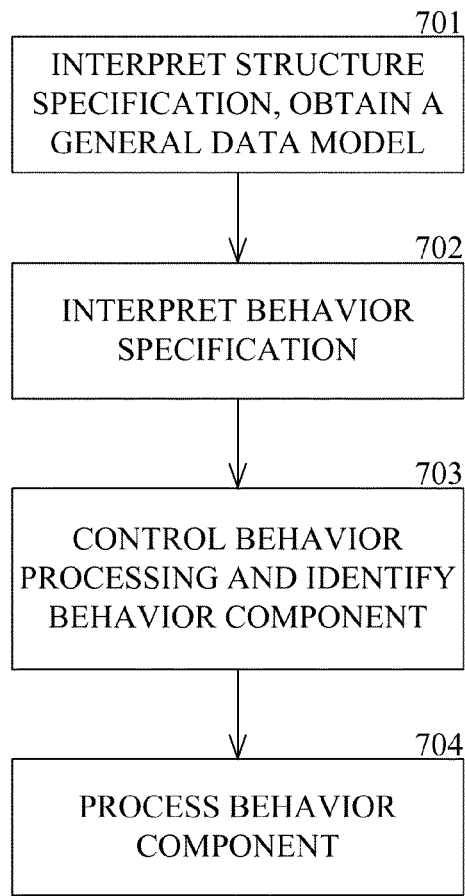
FIG. 7A illustrates flowchart of a method for processing declarative applications using behavior components.

Refer now to FIG. 7A which illustrates flowchart of an explanatory method for declarative applications using behavior components consistent with an embodiment of the disclosure. The explanatory method of FIG. 7A can be used in combination with the declarative application system, such as those presented in FIG. 1.

In stage 701, the structure specification of the application is interpreted to derive a general data model. The general data model is a data model used to represent the application data items and may use a generalization where a data modeling aspect cannot be ascertained.

In stage 702, the behavior specification of the application is interpreted to obtaining the behavior components specified in the behavior specification. Such behavior components are specified using constructs supported by the behavior specification language. The details of the behavior component are interpreted using the general data model.

In stage 703, the application behavior processing is performed such that the behavior processing is controlled as defined by the behavior specification. The behavior specification language(s) defines a set of constructs and rules for interpreting these constructs. In this stage, the behavior processing constructs are interpreted, behavior components are identified and behavior processing is controlled, as per the rules defined by the behavior specification language(s). A behavior component that is ready for processing is identified in accordance to the rules of the behavior specification language(s). In one embodiment, it may be necessary to use an application data item for controlling the application behavior. In another embodiment, a processing concrete model is derived using the general data model or the structure specification. The processing concrete model is used to obtain processable data items from application data items. The behavior specification, the processing concrete model and processable data items are used to control behavior processing in this embodiment.

In stage 704, the behavior component identified as ready for processing in stage 703 is processed. The behavior component has a specific purpose in the behavior specification and a purpose-oriented processing of this behavior component may be performed as further illustrated in the explanatory flowchart of FIG. 7B. This stage may perform tasks by processing the behavior component. In one embodiment, that uses a processing concrete model in stage 703, the behavior component processing may be performed using the processing concrete model and the processable data items.

Stages 703 and 704 may cycle through as necessary, to process the behavior components that participate in the required behavior and as specified by the application behavior specification. Moreover, an application may involve multiple such behavior components that may be processed simultaneously. The stage 704 may be active for multiple behavior components along with stage 703 as necessary to control processing for such behavior components in this explanatory flowchart.

Figure 7B:
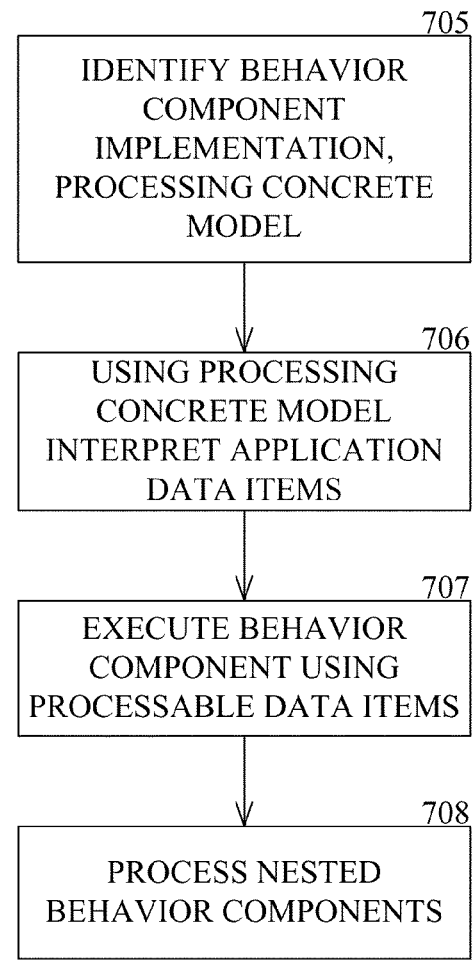
FIG. 7B illustrates flowchart of a method for purpose-oriented processing of a behavior component.

Refer now to FIG. 7B which illustrates flowchart of a method for purpose-oriented processing of a behavior component such as at stage 704 of explanatory flowchart illustrated in FIG. 7A and consistent with an embodiment of the disclosure. The explanatory method of FIG. 7B may be used to perform a purpose-oriented processing for a behavior component in combination with the declarative application system, such as those presented in FIG. 1.

In stage 705, a behavior component implementation is identified to process the behavior component such that it is based on a processing concrete data model that is derivable from the structure specification or the general data model. Various criteria may be used to match the behavior component implementation, some examples of such criteria being criteria for purpose of behavior component, criteria based on details of the behavior component, criteria for the required processing concrete model of the behavior component implementation, criteria for resolution of generalizations in the general data model to derive the required processing concrete model of the behavior component implementation, criteria for conditional matching using the application data items, criteria for a parent behavior component implementation processing a nested behavior component, platform criteria, technology criteria, performance criteria, policy criteria, business criteria, special criteria defined in a declarative specification, etc.

In stage 706, processable data items are obtained from the application data items using the processing concrete model as needed for processing the behavior component in one embodiment. The processable data items represent application data items for processing within the behavior component implementation. In one embodiment, the processable data items are represented using data-structures offered by high-level programming language(s) used to implement the behavior component implementation of this method. In another embodiment, the processing concrete model uses other representations amenable to implement this method. In another embodiment, such transformation is attempted when the processable data item is actually needed. Moreover, it is possible to have embodiments where the processable data items have no explicit storage or require explicit representation. In another embodiment, a processable data item obtained from processing another behavior component may be used to obtain a processable data item for the behavior component if their processing concrete models support such interpretation. In another embodiment, the processing concrete model may be such that no processing is necessary to interpret the application data item to processable data item. As disclosed in an embodiment of this disclosure, the behavior component implementation may also use an internal processing concrete model.

In stage 707, the behavior component implementation is executed to process the behavior component. The processable data items may be used to perform this processing. The execution of the behavior component implementation causes tasks to be performed as specified by the behavior component. These tasks may perform various things such as manipulate processable data items, perform real-world actions, produce outputs and triggers, causing the application to offer the designed functionality to its users.

In stage 708, the behavior component implementation identifies nested behavior components that is part of the behavior component and performs purpose-oriented processing defined in the explanatory method of FIG. 7B for the nested behavior component. This enables processing behaviors specified using a behavior specification language that supports nesting a behavior component under another behavior component.

The stage 706 may be visited again from stage 707 when behavior component implementation requires interpretation of an application data item during stage 707. Moreover, such multiple and simultaneous interpretations may cause multiple simultaneous active visits to stage 706. Stage 708 is optional and is executed for processing a nested behavior component as per the rules of the behavior specification language(s). Moreover, multiple nested behavior components may become active simultaneously, causing the stage 708 to be active simultaneously, for such nested behavior components.

Figure 8:
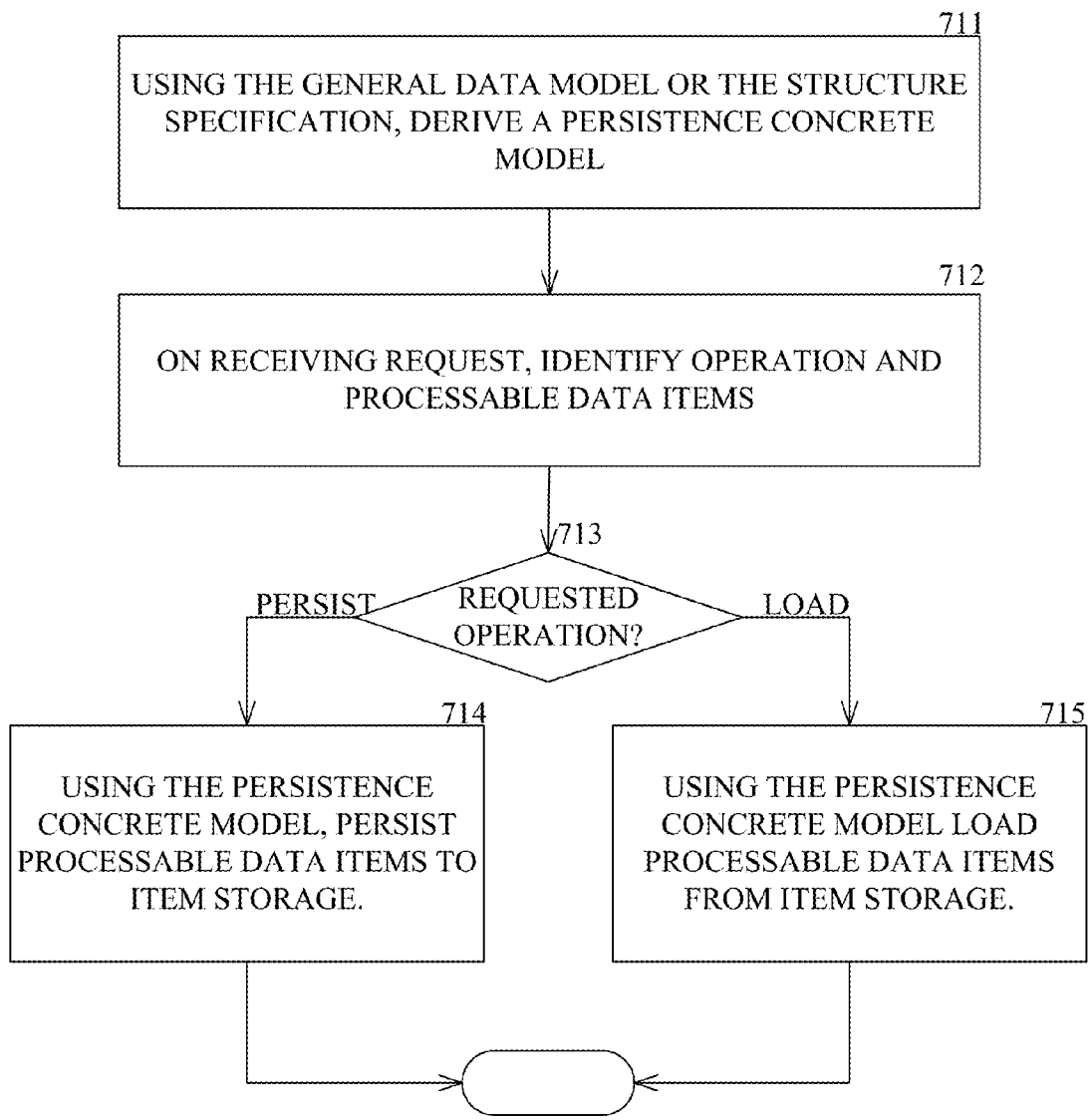
FIG. 8 illustrates flowchart of a method for persisting application data.

Refer now to FIG. 8 which illustrates flowchart of an explanatory method for persisting application data items consistent with an embodiment of the disclosure.

In stage 711, the general data model or the structure specification is used to derive a persistence concrete model. The persistence concrete model represents a data model essential for performing persistence related operations for application data items.

In stage 712, a request to perform a persistence operation is received. The request specifies type of operation to be performed and data items involved in this operation. The request to perform a complex persistence operation may involve performing multiple simple operations and therefore may be interpreted similar to multiple individual requests for simple operations for this illustration.

In stage 713, the requested operation type is analyzed. If the requested operation requires persisting data item(s), processing moves to stage 714. If the requested operation requires loading data item(s), processing moves to stage 715.

In stage 714, the required processable data items are persisted. The persistence concrete model may be used to provide the necessary information to transform information elements of the required processable data items to persistence related components used by persistence implementation.

In stage 715, the required processable data items are loaded. The persistence concrete model may be used to provide information necessary for transforming information elements obtained from persistence related components, to information elements used in processable data item.

In one embodiment, stage 711 serves as an initialization stage that may not be necessary to repeat for each subsequent request. Moreover, it is possible to have an embodiment where the flowchart illustrated in FIG. 8 uses application data items instead of processable data items in steps 712, 714 and 715.

Figure 9:
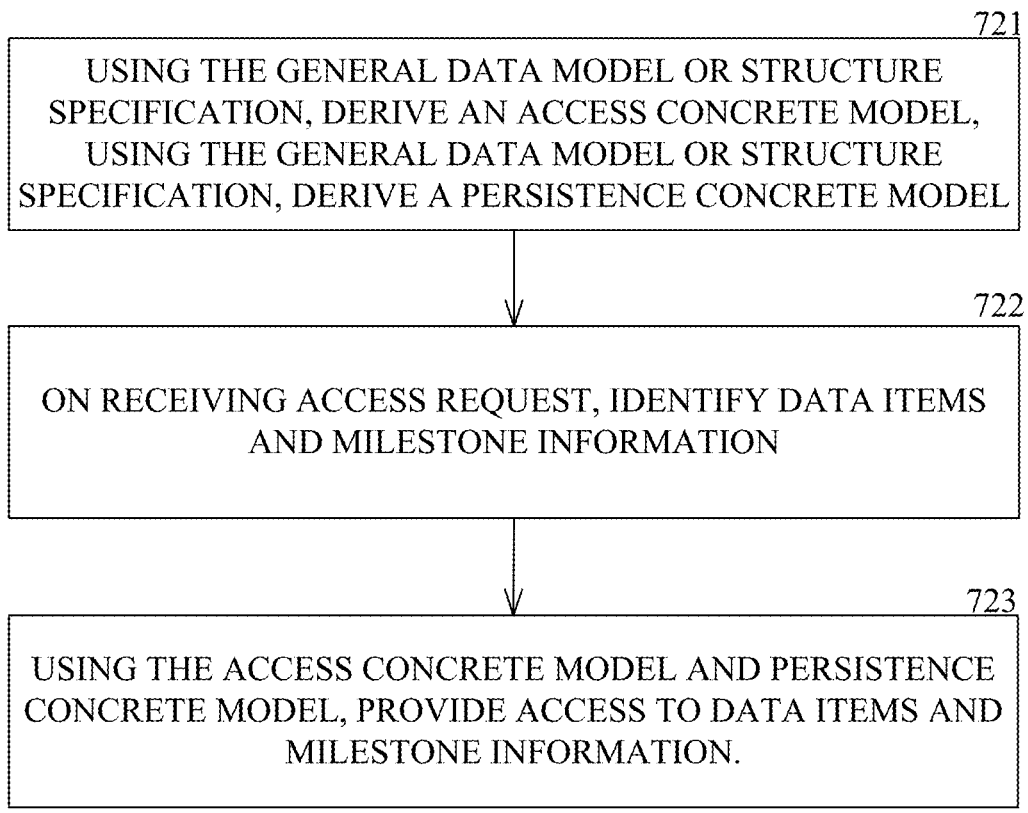
FIG. 9 illustrates flowchart of a method for accessing application data.

Refer now to FIG. 9 which illustrates flowchart of an explanatory method for accessing application data items.

In stage 721, the general data model or the structure specification is used to derive an access concrete model. The access concrete model represents a data model for communicating with an entity requesting data item, milestone information or both, henceforth referred to as an accessor. Moreover, the general data model is used to derive a persistence concrete model. The persistence concrete model represents a data model essential for performing a persistence operation related to data items, milestone or both.

In stage 722, a request to perform an access operation is received. The request specifies access operation information such as type of operation to be performed, any application data items and milestone information to be accessed.

In stage 723, the requested access operation is performed. The persisted data items and application milestone information are fetched, if necessary, from storage. The persistence concrete model may be used to interpret the persisted data items and milestone information. The access concrete model may be used to transform the obtained data items, if necessary, so that it can be understood by the accessors.

In one embodiment, stage 721 serves as an initialization stage that may not be necessary to repeat for each subsequent request.

Figure 10:
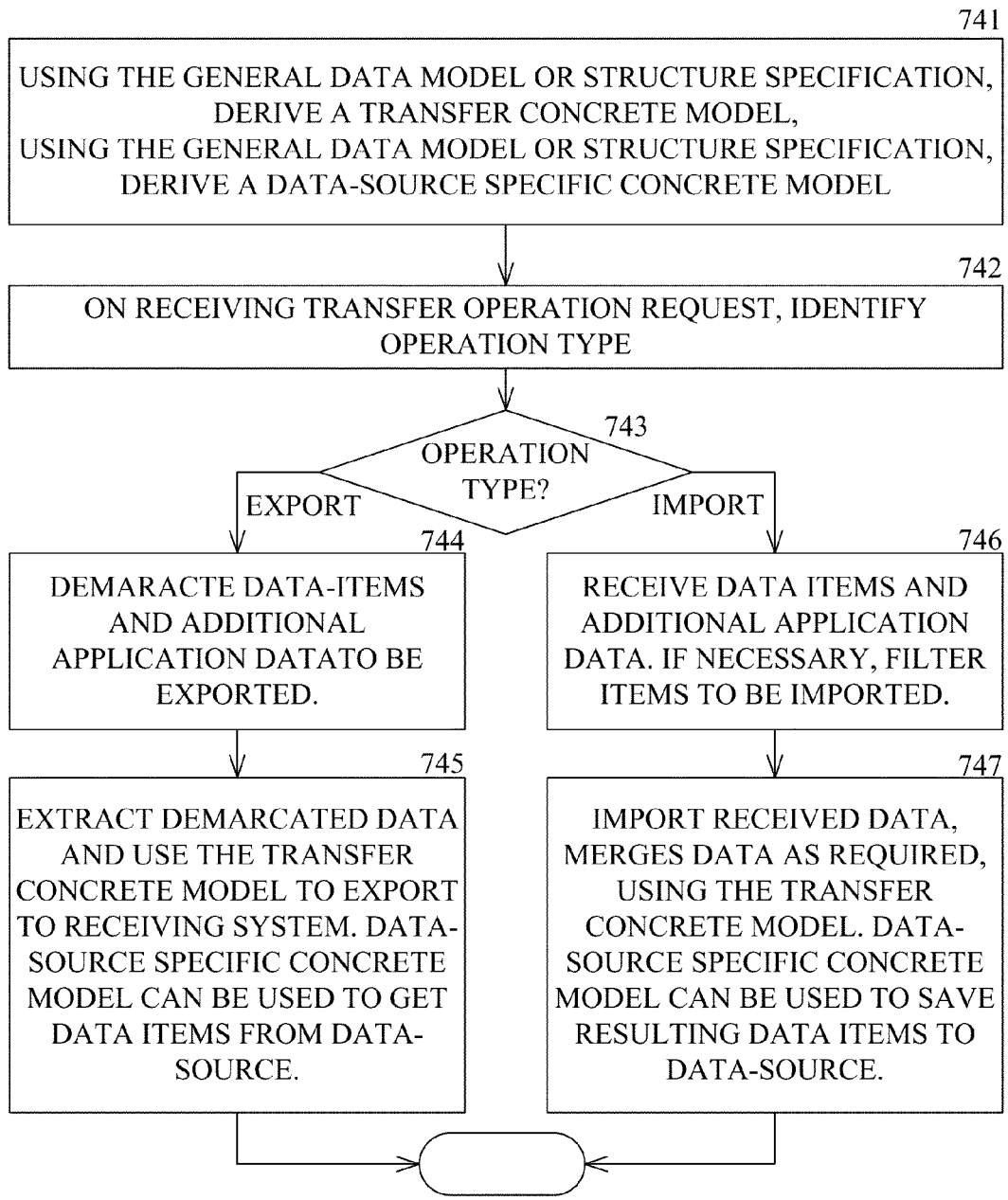
FIG. 10 illustrates flowchart of a method for transferring application data.

Refer now to FIG. 10 which illustrates flowchart of an explanatory method for transferring application data items In stage 741, the general data model or the structure specification is used to derive a transfer concrete model. The transfer concrete model represents data model essential for transferring application data items. A data-source manages data items involved in this transfer. Obtain a data-source concrete model that is suitable for the data-source. For example, if the data-source manages data items as processable data items, use a processing concrete model and if the data-source manages data items as persisted data items, use a persistence concrete model. The data-source concrete model represents a data model for the data-source, to implement data item storage and retrieval operations.

In stage 742, a request to perform transfer operation is received. Obtain the type of operation to be performed.

In stage 743, if the type of operation is export, move to stage 744. If the type of operation is import, move to stage 746.

In stage 744, demarcate the transfer items comprising application data items and additional application data to be exported. The other application data is data other than the specified application data items and comprises data specific to the application such as application milestones and data critical to manage various aspects of application processing. In one embodiment, such demarcation is interactive and may be conducted in user consultation. In another embodiment, such demarcation is non-interactive, specified using a declarative specification or derived automatically for a specific underlying purpose. Demarcation identifies the transfer items. In another embodiment, application milestones are demarcated based on milestone specific information that describe the application status, application operations or both for which application milestones are sought.

In stage 745, extract the information for transfer items. The data-source specific concrete model can be used, if necessary, to interpret this information. The extracted information may then be formatted, if necessary, to adhere to the transfer concrete model. The resulting information may now be exported.

In stage 746, data to be imported is received. The received import data comprises data items and additional application data that adhere to the transfer concrete model. In one embodiment, an optional filter may be used to import a subset of the received data.

In stage 747, the received data is interpreted using the transfer concrete model, and the required data items and additional application data received in the imported data, is saved and if necessary, merged with any corresponding artifacts on the receiving system. The data-source concrete model is used, if necessary, to transform the received data so that it can be saved by the data-source.

In one embodiment, stage 741 serves as an initialization stage that may not be necessary to repeat for each subsequent request.

FIG. 11 to FIG. 16 illustrates various aspects of an explanatory embodiment that is capable of running a sample declarative application, henceforth referred to as the sample application. These figures use specific specification language(s) to illustrate various aspects of this explanatory embodiment such as representing a general data model, representing behavior in a behavior specification using structure specification, representing various data model components of general data model and purpose-oriented concrete models, representing generalizations in general data model and result of resolution of such generalizations in purpose-oriented concrete models. The sample application is a real-estate property auction application that enables customers to bid for a listed real-estate property.

In this embodiment, the sample application is based on a structure specification similar to the explanatory structure specification illustrated in FIG. 3. Various purpose-oriented concrete models are illustrated for the sample application. It may be noted that in this embodiment, these purpose-oriented concrete models are derived from the general data model using a component similar to 104, 112 and 118 in FIGS. 1 and 501 in FIG. 5. Furthermore, these purpose-oriented concrete models may be derived manually, automatically or under guidance of a user. Such guidance may involve one or more additional purpose-oriented specifications that define customizations and controls necessary to derive the required purpose-oriented concrete models. It may be noted that the sample application and these drawings illustrate some aspects of the embodiments of this disclosure using examples, are explanatory only and are not restrictive of the disclosure.

Refer now to FIG. 11 which illustrates part of a structure specification example of the sample application. This structure specification is packaged into two XML schema modules 801 and 802. This structure specification uses modularization similar to the structure packages described by the explanatory packaging illustrated in FIG. 6. Module 801 represents data model components related to real-estate property location and module 802 represents data model components related to the property listing and bidding.

Address complexType 8011 defines an address of a real-estate property. The street-number could be an integer but data type generalization is used to represent street-number attribute using string data type. Address is an independent domain class. InternationalAddress complexType 8012 extends Address 8011 to include country information.

Listing complexType 8021 represents information about a real-estate property listed in the system for which customers can place bids. The Listing 8021 is related to an Address 8011 via an address association. This association has a presence constraint of being mandatory. Moreover, association target data type generalization is used to allow an Address or an InternationalAddress to be a target of this association. The minPrice attribute in 8021 is generalized to a decimal data type without any constraints on the total number of digits. This prevents restricting representation to only real-estate properties that fall within a specific price range. A Listing 8021 domain resource is addressable by its listId attribute that is unique across all possible domain resources that belong to Listing 8021 domain class. The listId attribute in 8021 also uses a data type generalization. The listId is an identifier of listed property and typically implemented as a numeric identifier. However, the general data model does not restrict it to a numeric data type by using a string data type to accommodate a different identifier data type in the future.

Bid complexType 8022 represents a bid put by a customer for a real-estate property listed in the system. Bid 8022 is related to Listing 8021 via a listId association. Since Listing 8021 has a unique listId attribute across all instances, it can be addressed by other domain classes using its listId identifier. This association has a presence constraint of being mandatory. The bidPrice attribute in 8022 is also generalized to a decimal data type without any constraints on the total number of digits or number of digits in fraction. This prevents restricting bids whose bidPrice fall within a specific range or precision. The contact attribute in 8022 has generalized string data type so that it can represent any contact information that can be used to contact the customer. Such information however is not mandatory and not constrained to be formalized for automatic processing. Note that Bid complexType may be addressable using an identifier. However, it is not essential to have such unique identity especially for a new bid but such identity can be used during subsequent bid processing. Therefore, Bid domain class 8022 is generalized by not including such identifier attribute.

BidResponse complexType 8023 represents a response sent to a customer who placed the bid. BidResponse 8023 includes bidId attribute that identifies the bid placed by the customer for the Listing identified by listId attribute. The status attribute in 8023 uses a generalized string data type to carry various processing status information during the lifecycle of this bid.

Figure 12:
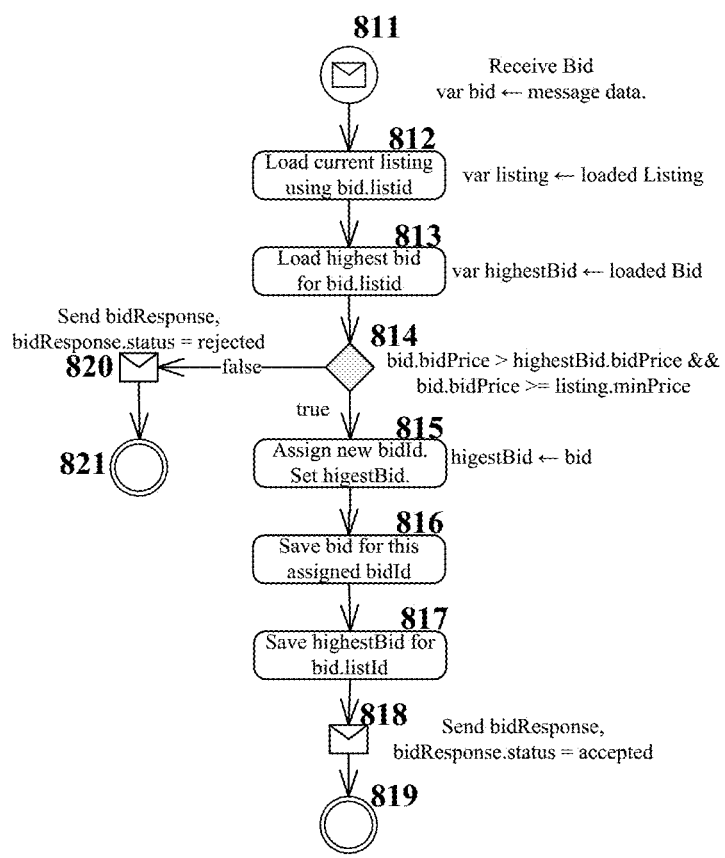
FIG. 12 illustrates part of a behavior specification example.

Refer now to FIG. 12 which illustrates a part of a behavior specification of the sample application. The FIG. 12 illustrates a behavior specified as a high-level BPMN process representation that enables a customer to place a bid for a real-estate property in the sample application processed in this embodiment. The textual descriptions in the FIG. 12 are meant to informally describe the work to be done at corresponding steps of the specified behavior. A corresponding BPMN executable model for this behavior can be processed by this embodiment. On receiving a bid from customer in 811, the process described by this behavior specification is started by an embodiment of the declarative application system processing the sample application. The bid is represented by an application data item of domain class Bid 8022 defined in FIG. 11. An action primitive implementation for BPMN catch message event 811 assigns the received bid application data to a BPMN process data object named bid.

The BPMN sequence flow causes next activity 812 to become active. The action primitive implementation for this BPMN task 812 results in loading a Listing identified by the listId attribute of the received bid. In this embodiment, the application data items are stored and retrieved using a persistence mechanism similar to the one described in FIG. 1. The expressions such as the one illustrated in the BPMN event gateway 814 are based on the general data model represented by the structure specification illustrated in FIG. 11. An embodiment similar to the one illustrated in FIG. 1 interprets and processes this behavior specification in accordance to standard BPMN execution semantics.

Refer now to FIG. 13 which illustrates a part of a processing concrete model example derived from the general data model represented by the structure specification in FIG. 11. In this processing concrete model, Java programming language is used to represent the data model components. A Java class represents a single complexType defined in the structure specification. The FIG. 13 illustrates important member variables of such a Java class while omitting additional Java class member variables and methods that are not necessary to understand the concepts disclosed herein. The processing concrete model resolves generalizations that are necessary to provide a data model amenable to the processing technology. The listId attribute of Listing complexType 8021 is resolved to a Long listId class member in Listing class 8221. A Long value represents a large range of numeric identities that can be also effectively indexed in database storage. Similar generalizations are used in 8222 and 8223.

Appropriate Java data types are used to represent the values represented by the general data model. For example, a java.math.BigDecimal is used to represent decimal values and java.util.Date class is used to represent dataTime values. The complexType extension of Address complexType 8011 by InternationalAddress complexType 8012 is represented by InternationalAddress class 8212 derived from base Address class 8211.

Refer now to FIG. 14 which illustrates part of a persistence concrete model example derived from the general data model represented by the structure specification in FIG. 11. As is apparent from tloc_address table 8311, the string attributes are constrained in this persistence concrete model to a fixed maximum length. This is necessary as the persistence technology used by this embodiment requires such data to be of a fixed maximum length. In this embodiment, a developer may choose pragmatic values for each attribute, thereby injecting developer's knowledge into the system to optimize application processing. In another embodiment, the persistence concrete model may be automatically derived without the need for explicit developer intervention. The generalization of decimal data type is resolved by adding constraint (38, 2) specifying that maximum 38 total digits and maximum 2 fraction digits be used in 8321 and 8322. Foreign key constraints are added to ensure that a target domain resource does not exist without a source domain resource. This is necessary as the persistence implementation technology in this embodiment has capabilities for enforcing data integrity but does not support automatic garbage collection.

Refer now to FIG. 15 which illustrates part of a transfer concrete model example derived from the general data model represented by the structure specification in FIG. 11. The transfer concrete model represents data that can be exported and imported. The generalization for listId attribute of Listing in 8021 is resolved to a long data type in 8421 to reflect that the transfer technology implementation manages domain resource identification using long values. Moreover, the decimal values are constrained to have maximum 38 total digits and maximum 2 fractional digits.

Refer now to FIG. 16 which illustrates part of an access concrete model example derived from the general data model represented by the structure specification in FIG. 11. Bid complexType 8522 contains a listing element that associates to Listing complexType 8521. The listId generalization in the complexType 8022 of FIG. 11 is resolved by the Bid complexType 8522 by containing entire associated listing element 8521 as a listing element. Furthermore, no application data items of BidResponse 8023 domain class shall ever be accessed and therefore, this concrete model does not represent BidResponse. Consider that the contact information for a Bid is sensitive information that cannot be divulged outside the system. This is accomplished by eliminating the contact attribute in 8522. No domain resource which is an instance of Listing 8521 shall ever be referenced using its identifier and therefore the listId generalization is resolved by eliminating the listId attribute in Listing 8521.

The minPrice generalization in complexType 8021 and bidPrice generalization in complexType 8022 of FIG. 11 is resolved to an association with target data type Valuation of complexType 8531. This enables accessors to obtain the price, currency, currency conversion rate and time of currency conversion rate and therefore allow global handling of real-estate properties in accessors, although rest of the application processing may use a specific currency.

Figure 17:
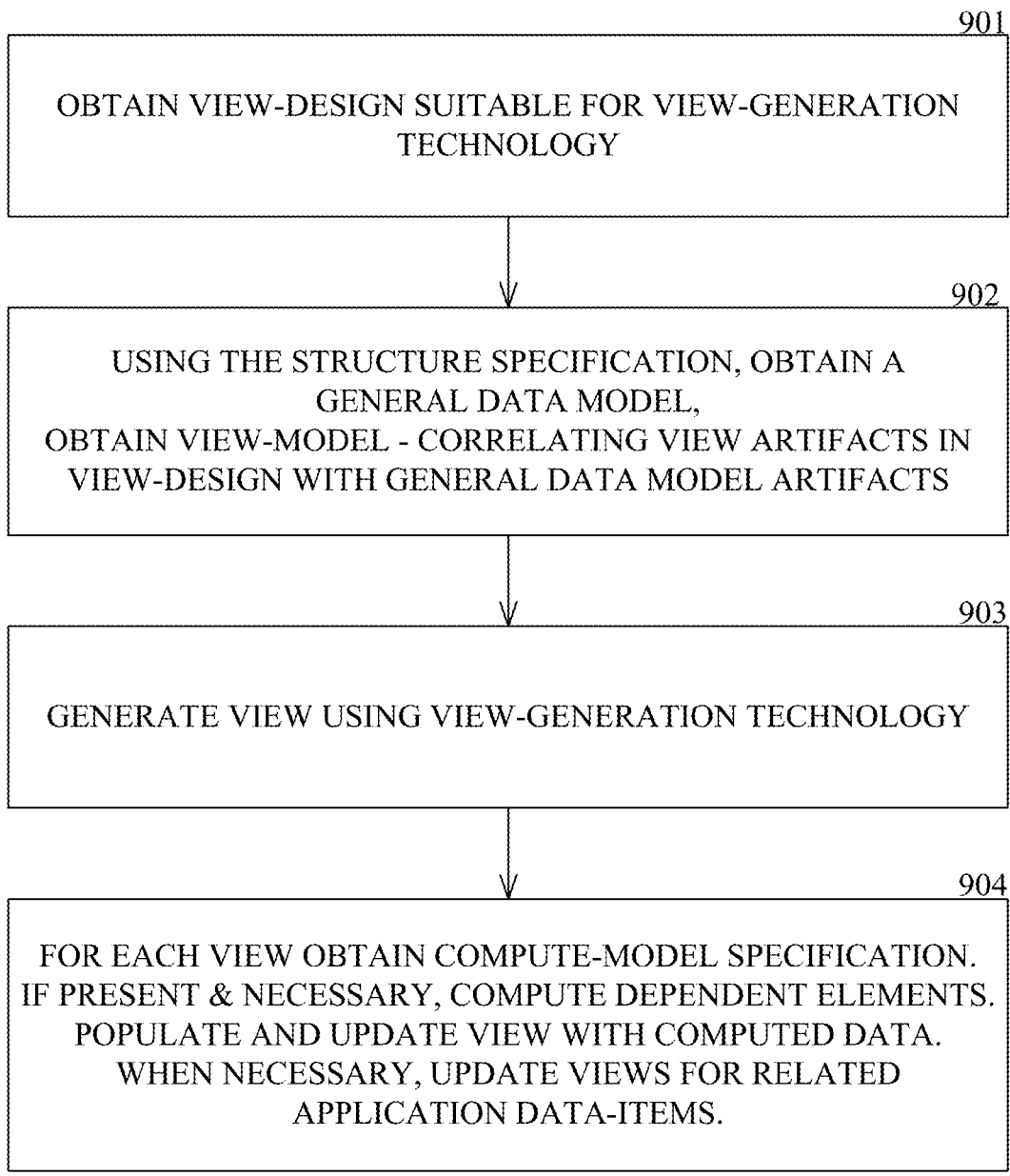
FIG. 17 illustrates flowchart of a method for declarative generation of a view.

Refer now to FIG. 17 that illustrates flowchart of an explanatory method for declarative view generation for application data items 106. The explanatory method of FIG. 17 can be used in combination with a view generator, such as those presented in FIG. 18B.

In stage 901, a view design is obtained for a view generation technology. The view design provides information about various aspects of a view generation, suitable for generating a view for application data items, using a view generation technology. Such a view design may be designed manually, completely automatically or partly automatically.

In stage 902, a general data model represented by the structure specification is obtained. Moreover a view model specification that specifies a mechanism to provide data and controls in the generated view is also obtained. Such a mechanism represented by the view model specification may correlate the view artifacts in view design with components of the general data model.

In stage 903, a view is generated by the view generator using a view generation technology. The view generation technology may use the view design, view model specification and application data items to generate a view that is suitable for rendering information related to these application data items. The view generator may augment the functionality of view generation technology if the view generation technology is incapable of completely generating the view.

In stage 904, an interactive view is generated that can automatically populate and update information presented in the view based on information rendered in the view. This stage is optional and available when a compute-model specification can be obtained. A compute-model specification provides information on how a dependent element related to an application data item depends on elements related to same application data item or other application data items. The affected dependent elements are computed and their value is used to generate and update the view. Moreover, multiple views of related application data items may be generated and updated such that an update in a view causes information in other views to be updated.

Thus methods and systems for processing a declaratively specified computer application have been described. An embodiment that use the techniques introduced above can simultaneously process one or more declarative applications. An embodiment that uses the techniques introduced above may process a declarative application using one or more processors. Moreover, one or more processors may simultaneously process one or more declarative applications.

The techniques introduced above can be implemented by using programmable circuitry programmed by software, firmware or both, or by using special-purpose hardwired circuitry, or by using a combination of such embodiments. Special-purpose hardwired circuitry may be in the form of, for example, one or more application-specific integrated circuits (ASICs), programmable logic devices (PLDs), field programmable gate arrays (FPGAs) etc.

Implementations described in this disclosure may be made in hardware, firmware, middleware, software, or various combinations thereof. The technology disclosed herein may also be implemented as machine-readable instructions stored on a tangible machine-readable medium which may be read and executed by one or more general purpose or special-purpose programmable processors. A tangible "machine-readable medium", as the term is used herein, includes any mechanism that can store information in a form accessible by a machine (a machine may be for example, a computer, network device, cellular phone, personal digital assistant (PDA), smart-phone, manufacturing tool, any device with one or more processors, etc). For example, a tangible machine-readable medium includes recordable/non-recordable media (e.g. read-only memory (ROM); random access memory (RAM); magnetic disk storage media; optical storage media; flash memory devices; solid state storage devices; medium accessible across network; etc.), etc. Further, firmware, software, routines, or instructions may be described in the above disclosure in terms of specific aspects and implementations of the technology, and performing certain actions. However, it will be apparent that such descriptions are merely for convenience, and that such actions may in fact result from computing devices, processors, controllers, or other devices executing firmware, software, routines or instructions.

Although the present disclosure has been described with reference to specific embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

The systems described herein are embodiments of system configurations. Other configurations may exist. Those having skill in the art will appreciate that the disclosure herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more or less of the described operations may be used.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Javascript, Python, Ruby and Groovy, style sheet language such as Cascade Style Sheets (CSS), or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Other implementations, uses, and advantages of the disclosed technology will be apparent to those skilled in the art from consideration of the specification and practice of the disclosure herein. The specification should be considered exemplary only, and the scope of the technology disclosed herein is accordingly intended to be limited only by any associated claims.

Some embodiments of present disclosure are further described hereunder:

Embodiment 1

A system to process a declaratively-specified computer application, the declaratively specified computer application being specified using a structure specification that represents a general data model and a behavior specification that specifies a behavior of the application using the general data model represented by the structure specification. The system comprising a processor to provide a functionality of the declaratively-specified computer application, the processor configured to interpret the structure specification and behavior specification; process the behavior specified by the behavior specification by identifying a behavior component in the behavior specification and performing a purpose-oriented processing of the behavior component as specified by the behavior specification. The purpose-oriented processing of the behavior component comprises identifying a behavior component implementation, wherein the behavior component implementation is based on a processing concrete data model such that the processing concrete data model is derivable from the structure specification or the general data model; interpreting an application data item using the processing concrete data model; and executing the behavior component implementation to process the application data item using the processing concrete data model and as specified by the behavior component.

Embodiment 2

The system of embodiment 1, wherein the purpose-oriented processing of the behavior component further comprises identifying a nested behavior component in the behavior component; and performing a purpose-oriented processing of the nested behavior component.

Embodiment 3

The system of embodiment 1, wherein a representation of the structure specification comprises a precise data model component describing an ascertained data modeling aspect, a general data model component describing at least one data modeling aspect that cannot be ascertained, or both.

Embodiment 4

The system of embodiment 3, wherein the processor is further configured to derive a persistence concrete data model from the structure specification or the general data model; use the persistence concrete data model to perform a persistence operation related to the application data item; and perform a persistence operation related to an application milestone, the application milestone representing an application status related with the behavior specification, using the persistence concrete data model for application data items that are part of the application milestone.

Embodiment 5

The system of embodiment 4, wherein the processor is further configured to derive an access concrete data model from the structure specification or the general data model; interpret the application data item using the access concrete data model; and present a view for an access item, wherein the access item comprises the application data item, the application milestone or both, wherein the application data item in the access item is represented by the access concrete data model.

Embodiment 6

The system of embodiment 5, further comprising an additional processor that uses the access item to conduct an additional processing to provide an added functionality which is not specified by the behavior specification, the structure specification, or both, of the declaratively-specified computer application.

Embodiment 7

The system of embodiment 6, wherein the additional processing is performed using an additional declarative application operatively associated with the system, an additional declarative application operatively associated with a different system, a software program that interfaces with the system, an additional processing implementation that can be loaded into the system, or a computing platform that directly or indirectly interfaces with the system, or any combination thereof.

Embodiment 8

The system of embodiment 1, wherein the structure specification is defined using a standard data model specification language, a proprietary data model specification language, an extension to the standard data model specification language, a result obtained from a software program, or a result obtained using an application programming interface, or any combination thereof.

Embodiment 9

The system of embodiment 1, wherein the behavior specification is defined using a standard processing specification language, a proprietary processing specification language, an extension to the standard processing specification language, a result obtained from a software program, or a result obtained using an application programming interface, or any combination thereof.

Embodiment 10

The system of embodiment 1, wherein the behavior specification comprises a processing specification representable using a standard processing language, a processing specification defining a procedural behavior specification in which a procedure specifies a procedural logic to process a portion of the application behavior, a processing specification defining a cause-effect specification in which a cause specifies a trigger to conduct processing and an effect specifies a processing logic to perform application processing as a result of the trigger, a processing specification defining a rule-based specification in which a rule specifies conditional processing of a behavior component, a processing specification defining an adaptive behavior for adapting current and future processing related to a specific objective of the application, a processing specification to infer application data and process a behavior component aided by a knowledge base, or a processing specification to process a behavior component using a probabilistic reasoning technique, or any combination thereof.

Embodiment 11

The system of embodiment 3, wherein the general data model represents a domain class such that a representation of the domain class comprises an attribute representing a characteristic of a domain resource, the domain resource being a member of the domain class; a constraint on the attribute, wherein the constraint comprises an attribute presence constraint, an attribute value constraint or both; an association representing a relation of a domain resource of the domain class to a target domain resource of a target domain class, the target domain class being a domain class in the general data model; a constraint on the association, wherein the constraint comprises a target presence constraint, a target multiplicity constraint or both; a target value constraint on the association constraining the value of the target domain resource; or a type relation of the domain class with another domain class, the type relation representing propagation of a general data model component, precise data model component or both to the domain class from another domain class, the another domain class being a domain class in the general data model other than the domain class; or any combination thereof.

Embodiment 12

The system of embodiment 11, wherein the general data model component defines a generalization on a data type of the attribute, a data type of the target domain class of an association, the attribute value constraint on the attribute, the attribute presence constraint on the attribute, a multiplicity constraint on the attribute when the attribute value comprises more than one attribute value element, the target presence constraint on the association, the target multiplicity constraint on the association, the target value constraint on the association, the attribute as part of the domain class, or presence of the association for the domain class, or any combination thereof.

Embodiment 13

The system of embodiment 1, wherein the processor is further configured to derive a transfer concrete data model from the structure specification or the general data model; demarcate a transfer item, wherein the transfer item comprises the application data item, other application data or both, the other application data being data specific to the declaratively-specified computer application other than the application data item; and transfer the demarcated transfer item to a receiving system, wherein the system further comprises the receiving system, or the receiving system is external to the system.

Embodiment 14

The system of embodiment 13, wherein to transfer the transfer item, the processor is further configured to extract the demarcated transfer item; send the demarcated transfer item to the receiving system; receive an incoming transfer item comprising the application data item, the other application data or both; or import and merge the incoming transfer item; or any combination thereof, wherein the ability to transfer the transfer item enables the system and the receiving system to collectively provide distributed application processing.

Embodiment 15

The system of embodiment 1, wherein the processor is further configured to customize an aspect of declarative application processing using an implementation to interpret a purpose-oriented specification and perform processing in accordance to the purpose-oriented specification, a custom implementation to perform custom processing, or an external service to perform custom processing, or any combination thereof.

Embodiment 16

The system of embodiment 3, wherein the processor is further configured to generate an artifact using the structure specification or the general data model, wherein the generated artifact aids an application processing operation, and is generated using a declarative specification meant for the purpose of generating the artifact.

Embodiment 17

The system of embodiment 1, wherein behavior component implementation is identified and made available for processing the behavior component based on a default implementation for the behavior component within the system; a matching operation using a criterion for the behavior component, the behavior component implementation being loadable from a location known and accessible to the system; a dynamic search using a criterion for the behavior component, the behavior component implementation being loadable from a location accessible to the system; or any combination thereof.

Embodiment 18

The system of embodiment 3, wherein the structure specification is represented as at least one partial structure specification, the at least one partial structure specification being a defining partial structure specification comprising a data model component which does not depend on another data model component; a data model component that has a dependency on another data model component that belongs to the defining partial structure specification or a partial structure specification other than the defining partial structure specification, the dependency allowing identifying the partial structure specifications used by the defining partial structure specification; or any combination thereof.

Embodiment 19

The system of embodiment 1, wherein the processor is further configured to represent a unit of work specified in the behavior specification by an action primitive, the action primitive being specified using the general data model; and extend the behavior processing capability of the system by identifying and using an action primitive implementation,

Embodiment 20

The system of embodiment 19, wherein the processor is further configured to build a behavior component specified by a component behavior specification, wherein the component behavior specification uses the action primitive to specify the behavior of the behavior component; and represent the behavior component itself as an action primitive, wherein processing of this action primitive representing the behavior component involves processing the behavior specified by the behavior component represented by this action primitive as part of the declaratively-specified computer application.

Embodiment 21

The system of embodiment 20, wherein the processor is further configured to represent an action primitive package comprising the action primitive and optionally the action primitive implementation, wherein the action primitive is specified using an action primitive data model represented using a partial structure specification; and represent a behavior package comprising the behavior component, wherein the behavior component uses an action primitive from another behavior package, an action primitive from the action primitive package or both.

Embodiment 22

The system of embodiment 4, wherein the processor is further configured to reason current behavior, past behavior or both of the declaratively-specified computer application using the structure specification, the behavior specification and the application milestone.

Embodiment 23

The system of embodiment 1, wherein the processor is further configured to use the general data model and a purpose-oriented concrete model derived from the general data model to interpret the application data item to a purpose-oriented representation of the application data item, interpret the application data item from the purpose-oriented representation of the application data item, interpret the purpose-oriented representation of the application data item from one purpose-oriented representation to another purpose-oriented representation and allow processing applications when an aspect of the data model is not ascertained.

Embodiment 24

A system to declaratively generate a view for an application data item, the system comprising a processor configured to interpret a structure specification representing a general data model; obtain a view design, the view design used by a view generation technology to generate the view; obtain a view model specification specifying a mechanism to provide data and controls in the view, wherein the mechanism is based on a general data model component of the general data model and the view design; and create the view for the application data item using the view generation technology based on the view design and the view model specification.

Embodiment 25

The system of embodiment 24, wherein the processor is further configured to provide a compute model specification defining an expression to compute a value assignable to a dependent element related to the application data item, the expression using at least one element related to the application data item, another application data item related to the application data item or both; detect a need to compute the dependent element; and compute a value for the dependent element.

Embodiment 26

The system of embodiment 25, wherein the processor is further configured to update the dependent element using the compute model specification before using data represented by the dependent element in the view.

Embodiment 27

The system of embodiment 26, wherein the processor is further configured to update the view in accordance to the view model specification and the view design.

Embodiment 28

The system of embodiment 27, wherein the processor is further configured to present a plurality of the views; and update the plurality of views as a result of updating information represented in at least one view of the plurality of views.

What is claimed is:

1. A system to declaratively generate a view for a first application data item, said view is usable in an application behavior, the system comprising a memory and a processor configured to:
   interpret a structure specification representing a general data model;
   obtain a view design, wherein said view design is usable by a view generation technology to generate said view;
   obtain a view model specification specifying a mechanism to provide data and control said view, wherein the mechanism is based on said general data model and said view design;
   interpret said first application data item, wherein said first application data item is transferable to the system, wherein a transfer of the first application data item to the system comprises:
      deriving a transfer concrete data model from said structure specification or said general data model, wherein the transfer concrete model represents data model essential for transferring application data items;
      obtaining a type of transfer operation to be performed;
      demarcating the first application data item if the type of transfer operation is export;
      transferring the demarcated first application data item to a receiving system, wherein the receiving system is external to the system; and
      importing the first application data item to be interpreted using the transfer concrete model if the type of transfer operation is import, and, optionally, to be merged with any corresponding artifacts on the system; and create said view for said first application data item using said view generation technology as well as said view design and said view model specification.

2. The system of claim 1, wherein the view model specification comprises:
   a mapping of a general data model component in said general data model to a view design construct in said view design;
   a specification to provide presentation and controls for a general data model component, a construct used in general data model, or both;
   a specification of a view artifact to be used on resolution of a generalization in said general data model, relevant to a context of usage of said view, or both;
   a specification of customization specific to target use of said generated view; or
   e. any combination thereof.

3. The system of claim 1, wherein the processor is further configured to:
   provide a compute model specification defining an expression to compute a value assignable to a first dependent element, said first dependent element related to said first application data item, said expression using at least one element related to a second application data item which comprises said first application data item or a third application data item related to said first application data item;
   detect a need to compute said first dependent element; and
   compute a value for said first dependent element.

4. The system of claim 3, wherein the processor is further configured to update said first dependent element using said compute model specification before using data represented by said first dependent element in said view.

5. The system of claim 4, wherein the processor is further configured to update said view in accordance to said view model specification and said view design.

6. The system of claim 5, wherein the processor is further configured to present a plurality of views; and update said plurality of views as a result of updating information represented in at least one view of the plurality of views.

7. A method to declaratively generate a view for an application data item, said view is usable in an application behavior, the method executed by a processor configured to perform a plurality of operations, the method comprising:
   interpreting a structure specification representing a general data model;
   obtaining a view design, said view design is usable by a view generation technology to generate said view;
   obtaining a view model specification specifying a mechanism to provide data and control said view, wherein the mechanism is based on said general data model and said view design;
   interpreting said first application data item, wherein said first application data item is transferable for processing, wherein transferring of the first application data item comprises:
      deriving a transfer concrete data model from said structure specification or said general data model, wherein the transfer concrete model represents data model essential for transferring application data items;
      obtaining a type of transfer operation to be performed;
      demarcating the first application data item if the type of transfer operation is export;
      transferring the demarcated first application data item for processing by a receiving processor, wherein the receiving processor is other than said processor; and
      importing the first application data item to be interpreted using the transfer concrete model if the type of transfer operation is import, and, optionally, to be merged with any corresponding artifacts; and
   creating said view for said first application data item using said view generation technology as well as said view design and said view model specification.

8. The mentor of claim 7, wherein the view model specification comprises:
   a mapping of a general data model component in said general data model to a view design construct in said view design;
   a specification to provide presentation and controls for a general data model component, a construct used in general data model, or both;
   a specification of a view artifact to be used on resolution of a generalization in said general data model, relevant to a context of usage of said view, or both;
   a specification of customization specific to target use of said generated view; or
   e. any combination thereof.

9. The method of claim 7, further comprising:
   providing a compute model specification defining an expression to compute a value assignable to a first dependent element, said first dependent element related to said first application data item, said expression using at least one element related to a second application data item which comprises said first application data item or a third application data item related to said first application data item;
   detecting a need to compute said first dependent element; and
   computing a value for said first dependent element.

10. The method of claim 9, further comprising updating said first dependent element using said compute model specification before using data represented by said first dependent element in said view.

11. The method of claim 10, further comprising updating said view in accordance to said view model specification and said view design.

12. The method of claim 11, further comprising presenting a plurality of views; and updating said plurality of views as a result of updating information represented in at least one view of the plurality of views.

13. A computer program product comprising:
   a non-transitory computer readable storage medium comprising computer-readable program code embodied therewith executable by a processor to process a declaratively-specified computer application, the computer readable program code comprising:
      computer readable program code configured to interpret a structure specification representing a general data model;
      computer readable program code configured to interpret a behavior specification, wherein the behavior specification uses said general data model represented by said structure specification and specifies a behavior of the application; and
      computer readable program code configured to process the behavior specified by said behavior specification, wherein said computer readable program code configured to process the behavior comprises:
         computer readable program code configured to identify a behavior component in said behavior specification; and
         computer readable program code configured to perform a purpose-oriented processing of said behavior component as specified by the behavior specification, wherein said computer readable program code configured to perform the purpose-oriented processing comprises:
  computer readable program code configured to identify and make available for processing said behavior component based on:
    a default implementation of said behavior component within the system,
    a matching operation using a criterion for said behavior component, said behavior component implementation being loadable from a location known and accessible to the system, or
    a dynamic search using a criterion for said behavior component, said behavior component implementation being loadable from a location accessible to the system, or
    any combination thereof;
  computer readable program code configured to interpret an application data item, the application data item is transferable to the processor, wherein a transfer of the application data item to the processor comprises:
    deriving a first transfer concrete data model from said structure specification or said general data model, wherein the first transfer concrete model represents data model essential for transferring application data items;
    obtaining a type of transfer operation to be performed;
    demarcating the application data item if the type of transfer operation is export;
    transferring the demarcated application data item to a first receiving processor, wherein the first receiving processor is external to the processor; and
    importing the application data item to be interpreted using the first transfer concrete model if the type of transfer operation is import, and, optionally, to be merged with any corresponding artifacts on the processor; and
  computer readable program code configured to execute said behavior component implementation for processing the application data item as specified by said behavior component.

14. The computer program product of claim 13, wherein said computer readable program code configured to perform the purpose-oriented processing of said behavior component further comprises:
  computer readable program code configured to identify a nested behavior component in said behavior component; and
  computer readable program code configured to perform a purpose-oriented processing of said nested behavior component.

15. The computer program product of claim 13, wherein a representation of said structure specification comprises:
  a precise data model component describing an ascertained data modeling aspect,
  a general data model component describing at least one data modeling aspect that cannot be ascertained, or both.

16. The computer program product of claim 15, further comprising:
  computer readable program code configured to derive a persistence concrete data model from said structure specification or said general data model;
  computer readable program code configured to perform a persistence operation related to said application data item using said persistence concrete data model; and
  computer readable program code configured to perform a persistence operation related to an application milestone, said application milestone representing an application status related with said behavior specification.

17. The computer program product of claim 15, further comprising:
  computer readable program code configured to derive an access concrete data model from said structure specification or said general data model;
  computer readable program code configured to interpret the application data item using the access concrete data model; and
  computer readable program code configured to present a view for an access item, wherein the access item comprises said application data item, said application milestone or both, said application data item in said access item represented by said access concrete data model.

18. The computer program product of claim 17, further comprising computer readable program code configured to use said access item to conduct an additional processing to provide an added functionality which is not specified by the behavior specification, the structure specification or both of said declaratively-specified computer application.

19. The computer program product of claim 13, further comprising:
  computer readable program code configured to derive a second transfer concrete data model from said structure specification or said general data model;
  computer readable program code configured to demarcate a transfer item, wherein the transfer item comprises said application data item, other application data or both, said other application data being data specific to said declaratively-specified computer application other than said application data item; and
  computer readable program code configured to transfer the demarcated transfer item for processing by a second receiving processor, wherein the second receiving processor is said processor or a processor other than said processor.

20. The computer program product of claim 19, further comprising, to transfer the transfer item:
  computer readable program code configured to extract said demarcated transfer item;
  computer readable program code configured to send said demarcated transfer item to said second receiving processor;
  computer readable program code configured to receive an incoming transfer item comprising said application data item, said other application data or both; or
  computer readable program code configured to import and merge said incoming transfer item; or
  any combination thereof,
  wherein said processor and said second receiving processor collectively perform distributed application processing.

* * * * *